(12) United States Patent
Tai et al.

(10) Patent No.: US 11,501,297 B1
(45) Date of Patent: Nov. 15, 2022

(54) BLOCKCHAIN AGNOSTIC TOKEN NETWORK

(71) Applicant: Block, Inc., San Francisco, CA (US)

(72) Inventors: Ryan Tai, Menlo Park, CA (US);
Madeeha Ghori, Fremont, CA (US);
Daniel Barrett, Kirkwood, MO (US)

(73) Assignee: Block, Inc., San Francisco, CA (US)

(*) Notice: Subject to any disclaimer, the term of this patent is extended or adjusted under 35 U.S.C. 154(b) by 0 days.

(21) Appl. No.: 17/722,118

(22) Filed: Apr. 15, 2022

(51) Int. Cl.
G06Q 30/00 (2012.01)
G06Q 20/40 (2012.01)
G06Q 20/20 (2012.01)

(52) U.S. Cl.
CPC .......... G06Q 20/401 (2013.01); G06Q 20/20 (2013.01); *G06Q 2220/00* (2013.01)

(58) Field of Classification Search
CPC ... G06Q 20/401; G06Q 20/20; G06Q 2220/00
See application file for complete search history.

(56) References Cited

U.S. PATENT DOCUMENTS

2022/0114600 A1* 4/2022 Blackburn ............. G16H 20/10

* cited by examiner

*Primary Examiner* — Patrick McAtee
*Assistant Examiner* — Nakia Leffall-Allen
(74) *Attorney, Agent, or Firm* — Polsinelli PC

(57) ABSTRACT

A blockchain agnostic token network is described. In an example, a request to purchase a non-fungible token (NFT) minted on a blockchain from a seller is received. Based at least in part on context data associated with at least one of the user, the seller, or a digital asset associated with the NFT, a plurality of available blockchains is determined for holding the NFT. Information associated with the plurality of blockchains is surfaced and one of the plurality of blockchains is determined for holding the NFT. Based at least in part on the determined blockchain, the NFT is transferred to the determined blockchain and associated with a user account for subsequent viewing.

20 Claims, 21 Drawing Sheets

US 11,501,297 B1

BLOCKCHAIN AGNOSTIC TOKEN NETWORK

TECHNICAL FIELD

Tokens, such as non-fungible tokens (NFTs), represent cryptographic assets on blockchains. NFTs are unique, in that they are associated with unique identification codes, and non-interchangeable, in that they cannot be traded or exchanged at equivalency.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1A:
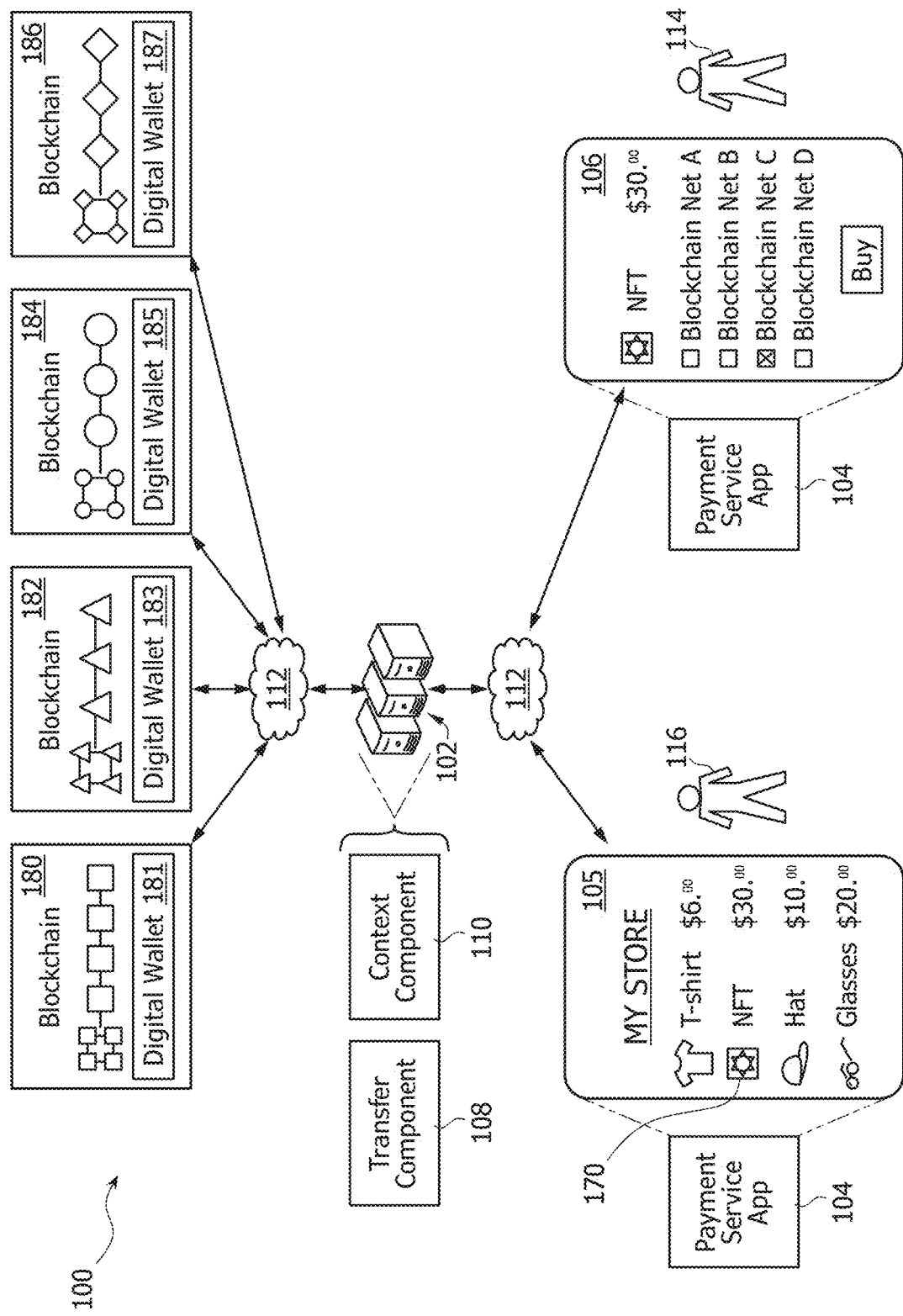
FIG. 1A is a schematic diagram illustrating a system for facilitating a blockchain agnostic non-fungible token ("NFT") transaction between a buyer and a seller in accordance with various embodiments of the disclosure.

Techniques described herein relate to a network-connected computing system, associated with a payment service, that enables real-time minting, purchasing, selling, and/or maintenance of digital assets and cryptographic tokens, such as non-fungible tokens (NFTs) representing such digital assets, across a variety of available blockchains. In at least one example, such techniques relate to blockchain "agnostic" transactions. That is, techniques described herein can ensure mobility between one or more blockchains (and associated networks). For example, the network-connected computing system can enable the generation, transfer, storage, and/or the like of NFTs on one or more blockchains by employing one or more networks and/or protocols to enable different blockchains to be interoperable, without regard to differences in standards and/or formats associated with different blockchains (and associated networks). In at least one example, the network-connected computing system employs any suitable network and/or protocol that enables different blockchains to interoperate, e.g., by minting "mirror" NFTs on different blockchains. In some examples, techniques described herein can utilize context data and/or machine-learning mechanisms to contextually and/or intelligently determine which blockchain(s) to mint NFTs on, for example, when generated, transferred, or maintained.

A blockchain is a peer-to-peer, immutable electronic ledger, which is implemented as a decentralized and distributed computer-implemented network of computing devices, to record transactions and track assets. In some examples, the network of nodes or computing devices with which a blockchain is associated is called a "blockchain network." The data within a blockchain comprises discrete units called blocks that record a variety of transactions (e.g., an individual payment transaction, update to a data structure, a contract, etc.) that have occurred. The blocks detail the movement (e.g., transfer of control) of a digital asset between participants in the blockchain computer-implemented network. The blocks form an irreversible chain of data as a digital asset moves from place to place or ownership changes hands. The blocks confirm the exact time and sequence of transactions, and the blocks link securely together to prevent any block from being altered or a block being inserted between two existing blocks. Each block within the blockchain includes a hash (i.e., unique and verifiable data) of the previous block in the chain rendering the blockchain tamper-evident. Because blocks in the blockchain are copied to each node within a blockchain, a permanent, verifiable, and unalterable record of transactions is generated.

An area of blockchain-related technology relates to the use of "tokens" to represent and transfer assets via blockchains. A cryptographic token serves as an identifier that allows a real-world asset or digital asset to be referenced from a blockchain. Similar to physical assets, the tokens that represent assets may be differentiated on the basis of "fungibility" or "non-fungibility." "Fungibility" refers to the equivalence or interchangeability of each unit of an asset with other units of the same asset. For example, fungible tokens (FTs) are tokens that can be exchanged for any other token with the same value. Fungible tokens are uniform, that is, FTs of the same type are identical in specification, each FT is identical to another FT of the same type. Consequently, FTs are divisible into smaller amounts. Similar to currency, where bills can be divided into coins of an equivalent value, FTs are divisible. As such, a fraction of an FT can be transferred between users. Cryptocurrency (e.g., Bitcoin, Ether, etc.) is an example of a blockchain-related FT, wherein each unit of cryptocurrency is identical in specification and interchangeable with other units of the same asset.

"Non-fungibility" refers to the uniqueness or non-interchangeability of individual units of an asset. For example, NFTs cannot be replaced with other tokens of the same type. An example format for an NFT on the Ethereum blockchain is a token standard referred to as ERC-721. The ERC-1155 standard offers semi-fungibility. Unlike ERC-721, where the unique identifier represents one asset, the unique identifier of the ERC-1155 token represents a whole class of fungible assets, any number of which the user can transfer to others. Components based on the ERC-998 standard are the templates according to which NFTs can be either non-fungible or fungible assets. While Ethereum is a popular choice for NFT marketplaces, there are non-Ethereum NFT marketplaces as well, belonging to other blockchain networks like Cosmos, Polkadot, International Blockchain Consulting (IBC), Interledger, Binance Smart Chain, etc. Each of the NFT marketplaces operates slightly differently and has its specific instructions, standards, formats, and/or the like. For example, some of the NFTs are curated while others are self-service based. Creating NFTs on some platforms have substantial transaction fees to mint, while some marketplaces do not support specific file formats or sizes of assets. Some platforms are user-friendly, while others have a complex user interface that takes significant training.

In many examples described herein, the transfer of NFTs across a plurality of blockchains can occur through the use of a payment service or other service provider. For the purpose of this discussion, "transfer" can refer to transferring an NFT between users on a same blockchain or different blockchains. In some examples, a transfer from a first blockchain to a second blockchain can necessitate minting, or otherwise creating, the NFT on the second blockchain. Users of the payment service can generate new NFTs for sale, trade, transfer, or the like, or list pre-existing NFTs for sale, trade, transfer, or the like. NFTs listed for sale, trade, transfer, or the like can be sold through a variety of marketplaces. For example, a seller of an NFT may operate a digital marketplace provided by the payment service, which lists NFTs for sale, trade, transfer, or the like, in some examples, alongside non-NFT inventory. In some examples, sellers can sell, trade, transfer, etc. NFTs via online stores, brick-and-mortar stores, in peer-to-peer (P2P) transactions, in point-of-sale (POS) transactions, or the like.

As described above, in some examples, techniques described herein can ensure mobility between the various blockchains (and associated networks). In some examples, the payment service can provide a buyer and/or seller the choice of what blockchain an NFT should be made available on or otherwise minted to. Techniques described herein refer to an NFT being "held" on a blockchain. For the purpose of this discussion, such "holding" can refer to an NFT being minted on or otherwise made available on a particular blockchain. In some examples, NFTs can be "held" in a digital wallet associated with the blockchain on which the NFT is held.

In some examples, a seller may be provided a listing of multiple blockchains on which to mint an NFT. In some examples, buyers may be provided a listing of multiple blockchains on which to mint an NFT. In some examples, a seller or buyer selection of a blockchain can be used to determine which blockchain an NFT is minted on. As described above, techniques described herein, can enable the generation, transfer, storage, and/or the like of NFTs on one or more blockchains by employing one or more networks and/or protocols to enable different blockchains to be interoperable, without regard to differences in standards and/or formats associated with different blockchains and associated networks. That is, techniques described herein can enable users (e.g., buyers and/or sellers) to select which blockchain(s) to generate, transfer, and/or maintain NFTs without regard to different standards and/or formats. As such, techniques described herein enable blockchain "agnostic" transactions.

In some examples, the payment service can select, without user input, an optimal (i.e., most desirable or satisfactory) blockchain on which to mint an NFT. As described below, in some examples, such a selection can be "contextual," based on context data associated with a buyer, a seller, a transaction, an NFT, one or more blockchains, or the like. That is, in certain examples, the selection of which blockchain should be utilized for minting and/or transferring the NFT can be made entirely without input from any user. In some examples, such selection can be "intelligent," in that the payment service may utilize one or more machine learning model(s) to determine, analyze, and/or select an optimal blockchain based on various context data. These machine learning model(s) can be configured to be deployed with or develop a model based on a sample, or training data. The machine learning model(s) can provide results such as predictions or decisions based on this model and subsequently update the model based on feedback received from previous results.

Existing NFT transaction options for users wishing to buy, sell, or trade NFTs can be limited by the complexity and cost of their current structure. This may stem from the limitation that many existing NFT transactions may use an additional escrow service to facilitate NFT transfers. Often, a third-party escrow service is used by existing NFT service providers which requires a first transfer of the NFT from the current blockchain to the escrow service. Once this step of the transaction is verified, a second transfer of the NFT from the escrow service to the buyer on a new blockchain can occur. However, this method presents problems as the third-party escrow service often requires that they be added to the transaction, which adds a layer of cost and risk to the transaction. This added transaction with the escrow service increases the necessary transaction costs of the transfer/sale and can be prohibitive, especially at scale. These increased risks and costs generate a prohibitive barrier to transferring NFTs between users and between blockchains.

Techniques described herein eliminate those added risks and costs by utilizing a payment service to facilitate the transfer of an NFT from one user to another and between one blockchain and another. This can be accomplished by covering aspects of the listing, sale, trade, and/or transfer of NFTs between various blockchains within the operations of the payment service alone. The payment service can allow makers and sellers of NFTs to list their NFTs for sale within a marketplace operated by the payment service. The payment service can collect various context data to determine available blockchains for minting or transferring an NFT, as described above. In some examples, the payment service can utilize this context data to select an optimal blockchain for generating or transferring an NFT. In additional examples, the payment service can surface available blockchains suitable for hosting an NFT and allow the user to select which blockchain they would like to mint or offer their NFT for sale on. That is, techniques described herein can leverage intelligence to determine optimal blockchains for generating and/or transferring NFTs. This can provide improvements to existing NFT transactions by optimizing based on, among other context data, network and/or resource availability. Techniques described herein therefore enable improvements over existing one-size-fits-all technology as is available in existing NFT service providers.

The payment service can also provide buyers of NFTs the ability to mint or otherwise transfer a purchasable NFT to another blockchain. The selection of an optimal blockchain may also be done automatically by the payment service, for example, through the use of one or more machine learning model(s). In further examples, the payment service may surface options of suitable blockchains based on determined context data associated with the NFT sale/trade. The payment service may surface various transaction costs for both purchasing the NFT from the seller, and the transfer costs of moving the NFT to an optimal blockchain. This transaction cost data can be automatically generated by the payment service outside of user view by searching for available blockchains and determining the current transaction costs associated with minting, or otherwise embedding, the NFT on that network. As those skilled in the art can recognize, these transaction costs can change often and as such, a non-static method of determining these costs can be in place to verify upon each transaction. This can be done in a variety of ways including, but not limited to, accessing current minting costs on one or more exchange networks. By facilitating the entire NFT transaction on both ends, the techniques described herein provide an improvement on NFT transaction technology by reducing risk and costs while increasing the ease of surfacing final cost options to the user attempting to make an NFT transaction decision.

Some existing NFT transfers require that all NFTs available for sale be minted, prior to being offered for sale, on a blockchain. This requirement stems from an NFT marketplace not allowing sale of items that are not currently in the possession of the seller. This can be a technique used by existing NFT marketplaces to prevent or mitigate fraud. This requires NFT sellers to pay an upfront cost to mint each NFT that they wish to list for sale. For sellers that wish to offer a large number of NFTs for sale at once, these costs can become prohibitive as the market for the proposed NFTs may not even be suitable enough to make up those costs. Further, minting a large number of NFTs at the same or nearly the same time can require a significant amount of computing resources.

Techniques discussed herein can allow for the payment service to offer one or more "lazy minting" processes (i.e., a "just in time" minting system). This minting process allows for the listing of an NFT for sale without the need to mint the NFT first. Instead, the process can wait to mint the NFT until a later time, for example when a purchase request is received or a condition is satisfied. By allowing the use of lazy minting processes, the payment service can, in some examples, lower the cost of minting NFTs and in turn lower the barriers to entry for many potential sellers of NFTs, thus improving the technological field by granting access to a wider audience than would have been previously priced out of the market. Further, in using lazing minting processes, the payment service can leverage the volatility of cryptocurrency value for determining when to mint an NFT (e.g., at a time when a gas fee is low or below a threshold). In some examples, the payment service can wait to mint an NFT until a certain condition (e.g., availability of computing resources, security metric, risk metric, etc.) is satisfied. That is, by utilizing lazy minting processes, the payment service can enable the conservation of computing resources, improve security, and/or mitigate risk associated with existing computing devices.

In some examples, lazy minting is a service that a payment service can provide because it can establish a direct relationship with the seller and offer safeguards against fraud. For example, a seller can offer an NFT listing for sale, a buyer purchases the NFT in the listing, but the seller waits to mint and transfer the NFT to the buyer. This is the equivalent of selling a product not in hand. However, as the payment service can have a relationship with the seller, such a relationship can be relied upon for completion of the minting and transferring. That is, the payment service/seller relationship can serve as an indication of trust (or lack thereof), risk (or lack thereof), or the like to enable a delayed minting and transfer, while still mitigating fraud or risk. This payment service/seller relationship can be achieved through a variety of methods. In some examples, a payment service provides an online storefront or other point-of-sale networks to the seller. The seller delegates authority to the payment service to automatically mint the NFT upon sale. With this arrangement, the payment service can verify that the NFT was successfully minted before completing the transaction, thus removing the need to transfer funds until the item is successfully ready for transfer.

In existing technologies, once an NFT is minted on a blockchain, the NFT remains associated with the blockchain. However, multiple blockchains exist that can store NFTs, as described above. Over time, users may acquire a collection of NFTs that are stored across a plurality of blockchains. Existing NFT service providers may be limited in which blockchains may be serviced. An existing NFT service provider may be configured to service a single associated blockchain, or may be limited to a single type of blockchain (e.g., Ethereum-based blockchains). This limitation may require owners and potential buyers of NFTs to manage and search multiple NFT service providers.

In some examples, a blockchain can contain metadata within one or more transactions that link the assets of the NFT with a particular owner. In existing technologies, when an NFT is associated with a single blockchain, such metadata regarding ownership of the NFT can be "locked" within the associated blockchain. However, this metadata does not always need to be locked within that initial blockchain and can in fact be transferred to another blockchain as desired. Thus, an additional transfer service may be required which adds another party into a transaction to transfer the NFT, adding to the cost and risk of transferring NFTs between blockchains. Additionally, the cost for each transfer may change moment to moment due to the fluctuating costs of the associated cryptocurrencies necessary for transfer between blockchains. In some cases, it may be desired to mint a single NFT to multiple blockchains while costs are low in case a transfer is desired in the future. However, such minting is not currently available in existing NFT service providers.

Techniques herein can provide a single location to search, shop, and otherwise manage NFTs. This can be accomplished by configuring the payment service and any associated payment service application utilized by users to be blockchain agnostic, meaning that no one type of blockchain is preferred over another. In this way, multiple blockchains and associated NFTs may be searched, read, written to, and otherwise transacted within a single service. By providing users a single location to store, manage, or otherwise transact with their NFTs, the payment service and associated payment service application can improve the field by reducing search times and switching costs between various existing NFT networks.

Techniques described herein can allow for the transfer of an NFT from one blockchain to another. The payment service may have data related to a large plurality of available blockchains that can host an NFT. Each blockchain can be evaluated to determine whether it is suitable for hosting various types of NFTs. When a minting, sale, or other transaction is being performed, the payment service can evaluate blockchains for suitability. In addition, context data and other machine learning model(s) can be considered to automatically select an optimal blockchain or present available blockchains for selection by the user. This can take place during the course of an NFT transaction, but may also be conducted at any time based on an NFT owner's desires. For example, the NFT owner may desire to have all of their NFTs under a centralized repository (e.g., for storing NFTs on a single blockchain for easier management), avoiding blockchains that may seem to be compromised or are otherwise vulnerable to hackers, avoiding blockchains with higher transaction costs, availing a different or improved use of an NFT, or the like. By providing increased blockchain mobility, the examples herein can improve the field of NFTs by avoiding increased risk, improve blockchain management, and/or increase the available market between NFTs on different blockchains.

Existing NFT service providers typically require the use of external parties to complete sales, and often have no mechanisms to enforce sales. This often means that a buyer and a seller have only a cursory relationship with the NFT service provider and can thus break ties easily if accused of fraud. This typically invites increased fraudulent activity as there are no other ties between the parties of an NFT transaction. Techniques described herein attempt to lower the risk of fraud by leveraging preexisting relationships between the users and the payment service. Often, a payment service has access to each user beyond just the NFT transaction. For example, a seller of NFTs may have a digital marketplace operated in some part by the payment service. Buyers of NFTs may utilize one or more of the payment services additional businesses or services. For example, the payment service may provide access to other accounts the user owns such as stocks, retirement accounts, cryptocurrencies and other assets.

Existing NFT service providers may provide for the creation of various NFTs. However, these NFTs are often generated one at a time and are often tied to the initial blockchain that they were minted to. This can limit the potential market for NFTs as sellers and other users who mint NFTs are only able to mint based on the time available for minting. However, techniques described herein can provide for the bulk creation and management of NFTs. For example, NFTs may be generated in batch operations, which in some examples can be across different blockchains, based on the selection of a certain set of criteria such as NFT name, asset involved, and/or cost. In further examples, a user may wish to transfer a large batch of NFTs at one time. This transfer can be to another user or between a first blockchain and a second blockchain. This can be possible utilizing techniques herein by providing a user interface to provide various criteria (e.g., cost, new owner/blockchain, etc.) and selection of a large number of owned NFTs. By providing bulk inventory management, the field of NFTs is improved because more NFTs may be generated and managed with decreased required resources.

In some examples, the generation and/or transfer of NFTs can require fees. In at least one example, the payment service can determine necessary fees to generate an NFT and/or transfer an NFT, present them to a user as a single cost in a selected currency, and facilitate a transaction based thereon. As an example, for a seller, the payment service can determine fees necessary to mint an NFT and any other fees related to generating the NFT and can present the fees to the seller in a single, integrated cost. In some examples, that cost can be presented in cryptocurrency (e.g., based on the blockchain(s) selected for minting the NFT) or in another currency, such as fiat currency or the like. In some examples, if individual fees are associated with different types of currency, the payment service can handle conversions automatically. As an additional or alternative example, for a buyer, the payment service can determine fees necessary to transfer an NFT and can present such fees to the buyer in a single, integrated cost. In some examples, that cost can be presented in cryptocurrency (e.g., based on the blockchain(s) selected for minting the NFT) or in another currency, such as fiat currency or the like. In some examples, if individual fees are associated with different types of currency, the payment service can handle conversions automatically. As such, techniques described herein enable improvements to existing NFT marketplaces and associated technology.

For example, a user may be required to pay a variety of fees and other transaction costs to facilitate the creation, sale, and/or purchase of an NFT. The creation or transfer of an NFT may require the payment of some amount of cryptocurrency, which may or may not be available to the user. The seller of an NFT may also desire payment in the form of some other currency, such as a fiat currency. Existing NFT transaction networks may also require payment of one or more fees that may be in yet another currency. These existing processes may require a buyer or seller to acquire cryptocurrency and/or another one or more currencies to complete a transaction. The disclosure herein provides for conducting transactions through a payment service across different blockchains, for example, with a consolidated cost and in a single currency. The payment service can provide functionality to allow for conversion of one or more currencies into other currencies to facilitate a transaction. This functionality can be done automatically without user input or knowledge. The transaction can be initiated on a payment service application that can present the buyer or seller with a single cost in their selected currency for minting, selling, and/or buying NFTs. For example, the payment service may determine data related to a potential NFT transaction such as current cryptocurrency conversion rates, fiat currency conversion rates, and/or any other available marketplace data that may alter the cost of the NFT transaction. The payment service can then modify or surface a listing of NFTs to show a single cost to a user that can be formatted in the user's desired currency. By providing NFT buyers and sellers with a single cost to conduct their transaction, friction in the market is reduced and increased access to NFTs can be facilitated. The reduced friction in the presentation of NFT transactions provides for improved functionality when interacting and conducting transactions with one or more NFT networks.

It should be noted that cryptocurrency transactions require compliance with, among other regulations, anti-money laundering and anti-terrorism financing regulations. Techniques described herein are to be performed in compliance with such regulations and any other regulations relevant to cryptocurrency or other transactions as applicable. Furthermore, techniques described herein are to be performed in compliance with any other regulation relevant to cryptocurrencies, stablecoins, or any other type of digital assets as described or contemplated herein.

It should be understood that the term "blockchain" as used herein includes all forms of electronic, computer-based, distributed ledgers. These include consensus-based blockchain and transaction-chain technologies, permissioned and un-permissioned ledgers, shared ledgers and variations thereof. While Bitcoin and Ethereum may be referred to herein for the purpose of convenience and illustration, it should be noted that the disclosure is not limited to use with the Bitcoin or Ethereum blockchains and alternative blockchain implementations and protocols fall within the scope of the present disclosure.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1A is a schematic diagram illustrating a system 100 for facilitating a blockchain agnostic NFT transaction between a buyer 114 and a seller 116 in accordance with various embodiments of the disclosure. In one embodiment, the system 100 comprises payment service servers 102, which can comprise one or more computing devices associated with a payment service. While shown as centralized servers, in some examples, the payment service servers 102 can be decentralized. In at least one example, the payment service servers 102 can have one or more functional components that can perform operations as described herein. In at least one example, the payment service servers 102 can include a transfer component 108 and a context component 110. In at least one example, the transfer component 108 can facilitate data transfers, for example, between computing devices (e.g., 105, 106) and/or blockchains (e.g., 180, 182, 184, 186), via one or more networks 112. As an example, the transfer component 108 can facilitate the transfer of an NFT from the seller 116 to the buyer 114. As described above, a "transfer" of an NFT can comprise the movement of the NFT between users and/or blockchains, which may or may not involve a purchase or sale (e.g., transfer of funds or other assets). In at least one example, the context component 110 can determine context data, as described below, and can determine one or more optimal blockchains for hosting NFTs, as described below. In some examples, such determinations can be based at least in part on using one or more heuristics. In some examples, such determinations can be based at least in part on using one or more machine-learning mechanisms. Additional details are provided below.

In some examples, the payment service can provide a payment service application 104 to one or more computing devices 105, 106. That is, each of the computing devices 105, 106 can have an instance of the payment service application 104 executing thereon. The payment service application 104 can enable users, such as the buyer 114 and the seller 116, to access services of the payment service. In some examples, the seller 116 can interact with an instance of the payment service application 104 to generate an NFT, add an NFT to the seller's 116 inventory, offer an NFT for sale, trade, transfer, or the like via an online store or marketplace, or the like. In some examples, the buyer 114 can interact with an instance of the payment service application 104 to purchase, or otherwise acquire, an NFT. An example transaction between the buyer 114 and seller 116 is provided below with reference to FIG. 1B. While the term "sale" is used throughout, in some examples, "sale" can refer to any transfer of an NFT, whether exchanged for another asset (e.g., fiat currency, cryptocurrency, another NFT, etc.) or not.

In at least one example, the system can comprise one or more blockchains, such as a first blockchain 180, a second blockchain 182, a third blockchain 184, and an Nth blockchain 186. In at least one example, each of the blockchains can be associated with a blockchain network that can be communicatively coupled to the payment service servers 102 via the network(s) 112. Blockchain networks, such as those associated with the first blockchain 180, the second blockchain 182, the third blockchain 184, and the Nth blockchain 186, utilize consensus mechanisms for getting nodes associated therewith to help guarantee that all nodes are synchronized and transactions are legitimate before being added to a blockchain. In one example of "proof of work" consensus mechanisms, transactions written to the blockchain can be "validated." Nodes in a blockchain network (i.e., "miners") solve energy-intensive computational problems to validate individual transactions, and invalid transactions are rejected from being added to the blockchain. The first node that receives a new transaction validates it and then, if validated, relays that transaction to the other nodes in the blockchain. Thereafter, the validated transaction can be added to a newly designed block, which is added to the blockchain. As another example, "proof of stake" consensus mechanisms utilize a network of validators who contribute, or "stake," their own cryptocurrency in exchange for getting to validate new transactions, update blockchains, and earn rewards. When a selected validator has validated a most recent block of transactions associated with a blockchain, other validators can attest that the block is accurate and, when a threshold number of attestations have been made, a cryptocurrency network can update the blockchain.

As described above, in some examples, blockchains can embed data and/or transactions within blocks as they are minted or added to the blockchain. In many blockchains configured for NFT usage, such as with proof-of-work blockchains, adding transactions on the blockchain incurs a fee (which is often called a "gas" fee) which can be paid to the miners operating on the blockchain. These fees are most often paid as portions of the cryptocurrency associated with the blockchain. These fees are eventually transferred to the miners within the blockchain as a form of payment for providing the computational resources of facilitating the blockchain and any associated transactions. In some examples, proof-of-stake systems can use cryptocurrency for rewarding or paying validators. This often requires at least some purchase and/or possession of a cryptocurrency that is usable to add new NFTs (i.e., "mint" an NFT).

Blockchains can be used to implement smart contracts or chaincode (e.g., such as system chaincode available in Hyperledger Fabric 1.0), for example, that execute when certain predetermined conditions are met. Smart contracts are computer programs designed to automate the execution of the terms of a machine-readable contract or agreement. Unlike a traditional contract which would be written in natural language, a smart contract is a machine executable program which comprises rules that can process data and/or inputs to produce one or more results and/or outputs. This automated contract processing can then cause actions to be performed dependent upon those results derived from terms within the smart contract. That is, smart contracts have numerous uses and may require more than one set of inputs to trigger a transaction. Smart contracts may be written in any suitable programming language, such as the programming language "Solidity" on the basis of If-This-Then-That (IFTTT) logic. In at least one example, identifying information of an asset represented by an NFT can be embedded within the smart contract associated with the blockchain on which the NFT is minted.

In at least one example, each blockchain (e.g., the first blockchain 180, the second blockchain 182, the third blockchain 184, and the Nth blockchain 186) can be associated with a NFT marketplace operating on a particular standard that may be specific to the particular blockchain. In at least one example, each blockchain (e.g., the first blockchain 180, the second blockchain 182, the third blockchain 184, and the Nth blockchain 186) can have a digital wallet (e.g., a first digital wallet 181, a second digital wallet 183, a third digital wallet 185, and an Nth digital wallet 187) associated therewith for holding NFTs. For example, the first blockchain 180 may have an embedded NFT marketplace operating on standard A and may be configured to hold an NFT in a first format (e.g., size, type, expiration date, etc.) in a first digital wallet 181 and the second blockchain 182 may have an embedded NFT marketplace operating on standard B and may be configured to hold an NFT in a second format (e.g., size, type, expiration date, etc.) in a second digital wallet 183. In at least one example, the payment service servers 102 can ensure mobility between the various blockchains (and associated networks). In at least one example, the payment service servers 102 employ any suitable network and/or protocol that enables different blockchains to interoperate, e.g., by minting "mirror" NFTs on different blockchains. For example, a smart contract may be employed to determine whether predetermined conditions, associated with buyer preferences, seller preferences, or the like, are satisfied. In at least one example, the smart contract may be employed in a computer-implemented method for blockchain agnostic exchange, such as disclosed below with regard to FIG. 1B. In another example, the payment service servers 102 employ any suitable network and/or protocol that executes smart controls to enable different blockchains to interoperate, e.g., by transferring the NFT between blockchains, depending on the context data, e.g., expiration time, user's preferences, user's location (e.g., if it is detected that a user is operating in a wallet on a different blockchain. In yet another example, the payment service servers 102 may receive a transaction to be processed on one blockchain, but route to another or a plurality of blockchains.

Figure 1B:
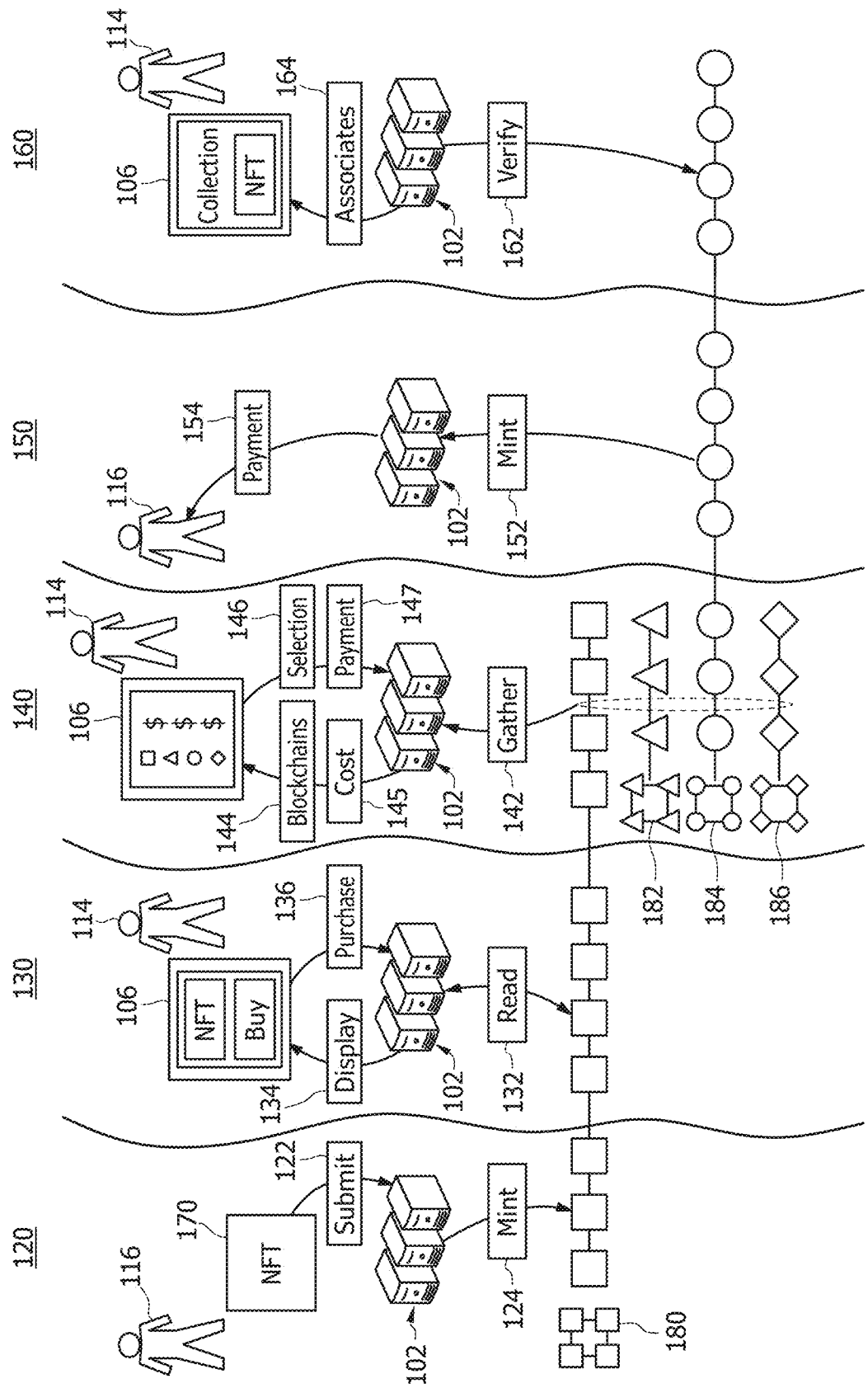
FIG. 1B is a schematic diagram illustrating additional details associated with the blockchain agnostic NFT transaction between the buyer and the seller of FIG. 1A in accordance with various embodiments of the disclosure.

Referring to FIG. 1B, a schematic diagram illustrating a blockchain agnostic transaction in accordance with various embodiments of the disclosure is shown. FIG. 1B illustrates five periods 120, 130, 140, 150, 160 where one or more events occur. However, one or more periods 120, 130, 140, 150, 160 may be optional, combined, or omitted. Further these periods may occur in any order, or in parallel. Operations described with respect to FIG. 1B can be performed by the transfer component 108 and/or the context component 110, or additional or alternative functional components, as described herein.

In one embodiment, a seller 116 can generate an NFT 170 using payment service servers 102, as illustrated in the first period 120. In at least one example, the seller 116 can identify a digital asset to use for creating the NFT 170. In at least one example, the payment service servers 102 can prompt the seller 116 to capture, upload, or otherwise provide the digital asset to the payment service servers 102. In at least one example, the seller 116 can provide a name for the NFT, a description of the NFT, a cost of the NFT (e.g., a fixed price, a timed auction, or the like), a blockchain on which to base the NFT on, or the like. In some examples, the seller 116 can configure one or more royalties if the NFT gets sold again later on. Such royalties can be enforced via a smart contract, as described above.

In at least one example, the payment service servers 102 can mint 124 the NFT 170 to at least one blockchain 180. In some examples, the blockchain 180 on which the NFT 170 is minted can be designated by the seller 116. In some examples, the seller 116 can select the blockchain 180 from a set of blockchains identified by the payment service servers 102, for example, using context data. In some examples, the payment service servers 102 can select an optimal blockchain on which to mint the NFT 170, for example, without input from the seller 116. As described below, in some examples, such a selection can be based, at least in part on, context data.

In at least one example in response to a selection of the blockchain 180 (e.g., by the seller 116 or the payment service servers 102), the NFT 170 can be minted on the blockchain 180. In some examples, minting the NFT 170 to the blockchain 180 may require one or more fees, which may be determined by the blockchain 180 and/or payment service servers 102. In some examples, the NFT 170 can be minted on more than one blockchain. That is, a duplicate or "mirror" of the NFT 170 can be minted on more than one blockchain such that each of the NFTs is associated with the same digital asset and a format particular to the blockchain on which each NFT is minted. In such an example, each of the blockchains on which the NFT is minted may be associated with a different fee. Nevertheless, the seller 116 can mint NFTs on multiple blockchains regardless of the standards or formats associated with each. That is, the seller 116 can utilize the payment service servers 102 to generate NFTs that are "agnostic" to a particular blockchain. In some examples, the payment service servers 102 can store, in a data store, a pointer or other indication indicating which blockchain(s) a particular NFT has been minted on. In at least one example, after the NFT 170 has been minted, the NFT 170 can be listed for sale by the seller 116, for example, in an NFT marketplace, on the seller's 116 online store, or the like.

In some examples, the seller 116 may list the NFT 170 for sale before the NFT 170 has been minted. That is, the seller 116 may list the digital asset for sale and the minting can occur at a later time (e.g., the NFT 170 is purchased or another event occurs). In some examples, the payment service servers 102 can lock or otherwise hold a digital asset that is associated with the NFT 170 to prevent tampering prior to the sale. In certain embodiments, NFTs may be batch minted, for example, upon the cost of minting falling below a predetermined threshold. In an example, where the NFT 170 is not minted prior to being offered for sale, the seller 116 may submit the digital asset and associated metadata for sale and provides approval for the payment service servers 102 to mint the NFT 170 on the blockchain selected by the buyer 114. In this way, the risk of the buyer 114 failing to properly mint the NFT 170 upon purchase, for example due to authorization or other reasons (e.g., insufficient funds to pay minting fees, blockchain congestion, known risk, or the like), is removed. Further, by delaying minting, the payment service servers 102 can utilize contextual intelligence, as described herein, to determine an optimal blockchain for minting the NFT 170, which can take into account buyer preferences and/or blockchain availability.

While the NFT 170 described above is associated with a digital asset, in some examples, NFTs can be associated with physical assets. When an asset associated with an NFT is not digital and the NFT 170 is not minted prior to sale, the payment service servers 102 may attempt to extract an assurance from the seller 116 that the associated asset should remain available until the sale of the NFT 170 has been finalized. This assurance can be in the form of a digital confirmation or may be upheld through one or more financial mechanisms including, but not limited to, funds withholding, account restrictions and/or terminations, among others. In some examples, such an assurance can be provided by a legal contract or other mechanism within the scope of this disclosure. Nevertheless, for the purpose of this discussion, while the transfer of an NFT is described as the transfer of ownership of a digital asset between users and/or blockchains, in some examples, transferring can include transfer of ownership of a physical asset owned by a seller. That is, in some examples, the NFT can represent a physical asset owned by a seller.

During the second period 130, the NFT 170 can be listed for sale, trade, or the like, via a user interface, which can be presented via an instance of the payment service application 104. In some examples, the user interface can be associated with a marketplace, an online store, a peer-to-peer (P2P) transaction, or a point-of-sale (POS) transaction, for example, at a brick-and-mortar store. That is, in some examples, the seller 116 can be a merchant (e.g., selling the NFT via an online store or brick-and-mortar store), a peer (e.g., in a P2P transaction), the payment service, or the like. In some examples, one or more application programming interfaces (API(s)) or other systems can be provided by the payment service servers 102 to support integration with other entities, such as third-party marketplaces, social networking platforms, messaging platforms, or the like.

In an example, the computing device 106 can execute an instance of the payment service application 104 that can load and display 134 NFTs from one or more sellers. That is, the instance of the payment service application 104 can display 134 the NFT 170 on the computing device 106. The buyer 114 can select and begin to purchase 136 the NFT 170 by making a selection within the instance of the payment service application 104 executing on the computing device 106. In some examples, if the NFT 170 is already minted on the blockchain 180, and the buyer 114 desires to receive the NFT 170 on the blockchain 180, the payment service can transfer the NFT 170 to the buyer 114. Such a transfer can be recorded on the blockchain 180.

As described previously, when the seller 116 utilizes a lazy minting process, the NFT 170 is not minted on a blockchain when generated by the seller 116. Instead of the NFT 170 being stored on the blockchain, the data associated with the NFT 170 can be read or otherwise retrieved from the payment service servers 102 which may store the data instead of on the blockchain 180. In an example where the NFT 170 is not yet minted or the buyer 114 provides an indication that they want to transfer the NFT 170 to another blockchain, the payment service servers 102 can initiate a process to select or determine an optimal blockchain on which to mint the NFT 170.

During the third period 140, the payment service servers 102 may determine what blockchains 180, 182, 184, 186 may be suitable for hosting the NFT 170. In at least one example, the payment service servers 102 can utilize context data, as described below, to identify an optimal blockchain for hosting the NFT 170. In some examples, the payment service servers 102 can therefore select a blockchain without involvement from the seller 116 and/or buyer 114. In another example, the buyer 114 may be prompted to make a selection of a blockchain they would like their to-be-purchased NFT 170 to be associated with (i.e., reside on). In some examples, a plurality of blockchains suitable to host the NFT 170 can be determined and presented to the buyer 114. In the depicted example, the payment service servers 102 determine 142 a plurality of blockchains 180, 182, 184, 186 which can host the NFT 170 or may be optimal for hosting the NFT 170. In some examples, the "suitable" blockchain(s) presented for selection can be determined by the payment service servers 102 based at least in part on context data as described below.

Determining which NFT blockchain can host the NFT 170, or one or more optimal blockchains for hosting the NFT 170, can involve analyzing a variety of context data. Context data can include, but is not limited to, user data, preference data determined from the user data (e.g., seller preference data, buyer preference data, etc.), transaction trend data determined from user data and/or transaction data, asset data (e.g., associated with the NFT 170), blockchain data, which can be used to determine one or more suitable blockchains for holding NFTs, social connection data, expiration time, or the like. In some examples, such determinations can be based at least in part on using one or more heuristics. In some examples, such determinations can be based at least in part on using one or more machine-learning mechanisms (e.g., "intelligence"). Additional details are provided below.

User data can be data associated with users, such as the buyer 114 and the seller 116. In some examples, user data can be stored in user profiles, such as merchant profiles, customer profiles, or the like.

User profiles can store user data indicative of user interactions with the payment service. In some examples, user profiles, which can be associated with user accounts, can indicate balances, point-of-sale transactions and associated transaction data, peer-to-peer transactions and associated transaction data, asset inflows, asset outflows, purchased assets, linked payment instruments, linked payment accounts, restrictions, conditions, preferences, or the like. In some examples, user profiles can include indications of NFTs or other assets purchased by users, NFTs offered for sale or trade by the users, or the like.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, accepted currency(s), preferred currency(s), transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a balance of the merchant, such as a balance maintained in a ledger by the payment service. In some examples, merchant profiles can be associated with user accounts that store balances. Such balances can be associated with one or more currencies, as described herein.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc. In some examples, customer profiles can be associated with user accounts that store balances. Such balances can be associated with one or more currencies, as described above.

In some examples, user preferences can be determined from user data. In some examples, such user preferences can indicate behaviors, trends, patterns, or the like of an individual user. In some examples, such preferences can indicate which balance(s) a user prefers to use for making payments. When aggregated user data is analyzed, for example, across a plurality of users of the payment service, such preferences can indicate behaviors, trends, patterns, or the like of a plurality of users. In some examples, the plurality of users can be determined to be similar (e.g., using a similarity metric) or otherwise have an existing relationship (e.g., using a social graph or other indicia of a relationship).

Seller preferences can include explicit selections made in real-time, near-real-time, or the past (e.g., as indicated in historical data or event data associated with the payment service), inferences generated by one or more machine learning model(s) based on a pattern of historical usage (e.g., as learned from historical data or event data associated with the payment service), indications given based on questions posed to the seller, etc. Seller preferences may also be focused on costs such that choices can be generated based on the current market conditions and other metrics and/or thresholds that have been previously established or inferred from past usage. In some examples, seller preferences can be particular to an individual seller 116, a group of sellers (e.g., similar to the seller 116), or all of the sellers associated with the payment service.

Buyer preferences can include explicit selections made in real-time, near-real-time, or the past (e.g., as indicated in historical data or event data associated with the payment service), inferences generated by one or more machine learning model(s) based on a pattern of historical usage (e.g., as learned from historical data or event data associated with the payment service), indications given based on questions posed to the buyer, etc. Buyer preferences may also be focused on costs such that choices can be generated based on the current market conditions and other metrics and/or thresholds that have been previously established or inferred from past usage. In some examples, buyer preferences can be particular to an individual buyer 114, a group of buyers (e.g., similar to the buyer 114), or all of the buyers associated with the payment service.

In some examples, the seller 116 may have a predetermined list of approved blockchains that they have approved for minting, holding, or otherwise associating with NFTs. In some examples, the buyer 114 may have a predetermined list of approved blockchains that they have approved for minting, holding, or otherwise associating with NFTs. These predetermined lists of approved blockchains can be utilized as context data for determining an optimal blockchain.

Transactions processed or otherwise facilitated by the payment service can be associated with transaction data. Such transaction data can include item(s) being purchased in the transaction, parties involved in the transaction, a total cost of the transaction, an indicated currency for payment of the transaction, a date of the transaction, a time of the transaction, a geolocation associated with the transaction, payment data received in association with the transaction, blockchain(s) selected for the transaction, and so on. In some examples, transaction data associated with a plurality of transactions can be aggregated and trends or patterns can be determined from transaction data. In some examples, such trends or patterns can be representative of an individual user, a group of users, or all users of the payment service and/or payment processing service, depending on which user(s) the transaction data analyzed is associated.

In at least one example, context data can comprise trend data. That is, the context data may also be generated by examining recent trends made by either or both of the seller 116 and buyer 114. Trends may be determined in a variety of ways. Local usage data associated with the actions of the buyer 114 and/or seller 116 that indicate a pattern. Other examples may utilize global usage data to generate trend-based context data. Trends can include any data determined over a period of time or across a grouping of users (e.g., from historical data or event data associated with the payment service) such that future choices may be inferred from this data. These inferences can often be generated by processing trend data through one or more machine learning model(s). In some examples, one or more machine learning methods may be applied that can analyze, parse, and/or generate usage data to identify and generate one or more trend-based context data. Trends may occur when a certain number of similar actions or patterns emerge over a predetermined period of time or occur a predetermined number of times. The thresholds relating to trend data may vary based on different market conditions. The exact dynamics of these threshold values can be set by the payment service or can be derived by one or more machine learning model(s).

In a non-limiting example, the buyer has been selecting the same one or two blockchains for the last dozen or so NFT purchases. As a result, the payment service application 104 on their computing device 106 can prioritize, highlight, or otherwise limit the selection of available blockchains to those one or two previously selected options. Similarly, when purchasing from a seller 116, the list of available blockchains may include, highlight, or otherwise limit the available selections to those that have been previously utilized or that are trending based on one or more predefined metrics. In some examples, the payment service may select one of the two blockchains as an "optimal" blockchain for a particular transaction based on the observed pattern or trend.

Other transaction data may be utilized as context data as well. In a non-limiting example, a buyer 114 finds an advertisement or other communication associated with the NFT 170 within a particular blockchain, chat or messaging network, social networking network, forum network, or similarly associated network. As described in more detail below, the transaction may be commenced by clicking on a hyperlink (i.e., accessing an address associated with a hyperlink presented to a user), or interacting with another interactive element (e.g., a quick response (QR) code, barcode, etc.) that directs the buyer 114 to the seller's online sale network or other point-of-sale. In this example, the hyperlink, or other interactive element, may have embedded data within it that may be parsed by the seller 116 or the payment service through payment service servers 102 or a payment service application 104 executing on the computing device 105 to indicate that the sale was commenced within a particular blockchain. Thus, when the selection of blockchains is provided for selection to either the buyer 114, seller 116, or other decision-making user, it may be manipulated to prioritize, highlight, or otherwise limit the selection of available blockchains to the one associated with the initial hyperlink. It is contemplated that other hyperlink or transaction data may be utilized to generate context data as well.

In more examples, context data may be generated from recent interactions that have occurred between or concerning the buyer 114 and seller 116. For example, the buyer 114 may have purchased many previous NFTs from the seller 116 and selected the same blockchain(s). Similarly, the buyer may have also selected particular blockchain(s) across multiple sellers and/or purchases. This transaction history can be utilized to generate context data that can be utilized to prioritize, highlight, or otherwise limit the selection of available blockchains without having to externally search for options. In some examples, blockchains themselves may provide context data indicative of transactions or interactions between users.

Another source of context data can include asset data, which can indicate the type of asset associated with the NFT 170. For example, video game-based digital assets may typically be associated with one particular blockchain, while artistic-based digital assets may be associated with a different particular network. By analyzing these trends or generating a known list of suitable networks, context data can be generated that may prioritize, highlight, or otherwise limit the selection of available blockchains when purchasing the NFT 170. Similar associations can be generated based on other similar NFT characteristics such as, but not limited to, overall purchase value, location of the sale, etc.

In still more examples, context data can include asset data related to the NFT within the transaction. In some examples, a NFT may be part of a similar set. In these examples, context data may be generated by examining previous sales of other related NFTs. For example, if a family of similar NFTs is put up for sale, and most of the previous sales used a particular blockchain for transferring the NFT to, that blockchain may be presented as a primary option or selected as an optimal blockchain for future purchases. Further, certain NFTs may perform better on particular blockchains. Such performance can be used for context data. Moreover, in some examples, particular NFTs can be for use in particular virtual environments (e.g., video games, virtual stores, etc.) that can be associated with particular blockchains. In some examples, such virtual environments and associated blockchains can be used as context data.

In at least one example, context data can include blockchain data, which can indicate data related to the plurality of available blockchains. The number of available blockchains can change rapidly and moment to moment. New blockchains may be initialized, therefore becoming "available," while other blockchains may become corrupted and fail, therefore becoming "unavailable." Some blockchains may also become unsafe if certain security-related issues arise such as breaches in the blockchain code security, or a substantial portion of the blockchain being operated by bad actors. Such blockchains may be determined to be "unavailable" based at least in part on a security metric or other indication indicating that the blockchains are "unavailable." Additionally, the costs related to conducting transactions with these blockchains can also vary from moment to moment. Moreover, in some examples, certain features may be available on some blockchains but not on others. For example, some blockchains may use zksnarks to allow certain data to be private to an owner, whereas other blockchains may not have that capability. As such, context data can be generated that examines the currently available blockchains along with the costs associated with conducting a transaction and/or features availed on those blockchains. The payment service may compile data of all available blockchains and/or their current statuses or may refer to a third-party service that provides such data. Such data can comprise context data that can be used for determining which blockchains to present or select for a particular NFT.

As previously described, NFTs may have a set of minimum requirements that may be required to be hosted on a particular blockchain. Typically, this may be verifying that the blockchain follows or otherwise comports with a standard. However, this is not always the case. The determination of context data can allow for additional methods of determining whether a blockchain is suitable. For example, a seller 116 may be a merchant that is selling a plurality of similarly configured NFTs, such as digital art pieces. These NFTs may have been previously minted to one or more blockchains upon generation or sale. This may be formatted as context data that can be utilized to determine that the previously used blockchains may be suitable for future minting, negating any subsequent analysis over their suitability when selling one or more other similar NFTs.

Context data may also be generated by analyzing any available social media connections between either or both of the buyer 114 and seller 116. In a non-limiting example, the buyer 114 may have available social media links to friends who have purchased similar NFTs on a particular blockchain. In some examples, this data is available to the payment service via one or more integrations between the payment service and third-party services, such as social networking platforms. Such integrations can be facilitated by one or more APIs, software development kits (SDKs), or the like. It may be desired by the buyer 114 to have their NFT on the same blockchain as their friends as some NFTs may provide specific utility that may only be utilized with others on the same blockchain. Thus, upon determining that a particular threshold of friends have a similar NFT on one blockchain, context data can be generated that prioritizes, highlights, or otherwise limits the selection of available blockchains to those used by their friends or other social contacts. Similarly, the seller 116 may have a social media presence with various available connections. A threshold amount of previous purchasers who are connected to the seller 116 may have all selected the same or similar blockchains. Context data may also be generated from this determination to prioritize, highlight, or otherwise limit the selection of available blockchains to those that other buyers of this type of NFT have selected.

As stated above, context data may be generated internally based on previously captured data stored within the payment service or available on blockchains. However, additional context data may be generated by utilizing external networks or repositories to, for example, determine what blockchains are available. In the depicted example, the payment service servers 102 determine 142 the originally associated blockchain 180, a second blockchain 182, a third blockchain 184, and a fourth blockchain 186 together as a plurality of available blockchains. Each of these blockchains 180, 182, 184, 186 may require a fee to either mint the NFT 170 to the blockchain, or to transfer ownership of the NFT 170 if the NFT 170 is staying on the originally associated blockchain 180. The payment service servers 102 can determine current fees associated with each blockchain and generate additional context data.

As described above, context data can be used to select, or otherwise determine, an optimal blockchain or set of blockchains to which an NFT is to be minted. In some examples, context data can be used to determine a set of blockchains to surface to a user (e.g., the buyer 114 or the seller 116), wherein the user selects one or more blockchains from the set of blockchains surfaced. In some examples, information associated with the blockchain(s) (e.g., costs, blockchain data, performance data, etc.) can be surfaced to the user to, for example, provide the user with additional context relating to each of the blockchains. As described above, in some examples, heuristics, machine learning, or other techniques can be used to analyze context data and select, or otherwise determine, one or more blockchains. In at least one example, a blockchain selected or determined to be optimal for a user can be the blockchain onto which an NFT is minted. In some examples, an NFT can be minted on more than one blockchain, at the same or different times. In some examples, user selections can be used to update and/or retrain the machine learning model(s) to improve accuracy.

In at least one example, a cost of the NFT 170 can include a purchase cost of the NFT 170 itself and one or more transaction fees, for example, for minting and/or transferring ownership. As those skilled in the art can recognize, the fees for minting and/or transferring ownership are conventionally paid in cryptocurrency, and usually a cryptocurrency associated with that particular blockchain. In some examples, a cost of the NFT 170 can be presented in cryptocurrency and paid in cryptocurrency. In some examples, a cost of the NFT 170 can be presented in fiat currency and paid in fiat currency. In some examples, the payment service may convert at least a portion of the fiat currency into cryptocurrency. In at least one example, a seamless transaction can occur to the user by presenting a cost 145 on the computing device 106 in fiat currency, which is then accepted and converted by the payment service into the necessary cryptocurrency to facilitate the transfer and/or minting. In some examples, user data can be used to determine the currency in which to present the cost of the NFT 170 to the user. For example, if, per the user data, the user has an extensive NFT collection or is otherwise determined to be a more sophisticated cryptocurrency user, the cost of the NFT 170 can be presented in cryptocurrency. As another example, if, per the user data, the user does not have an extensive NFT collection or is otherwise determined to be new to using cryptocurrency, the cost of the NFT 170 can be presented in fiat currency to lower the barrier to entry for new or less sophisticated cryptocurrency users.

However, as cryptocurrency costs fluctuate continuously, the exact costs for transferring ownership or minting an NFT 170 are not fixed and cannot typically be presented to the user without first verifying the current conversion rate. In a non-limiting example, the payment service (acting through the payment service servers 102) can reach out to one or more exchanges or other sources of up-to-date cryptocurrency valuation and generate a fiat currency equivalent of the necessary fees. That is, in some examples, the payment service can utilize conversion rates determined by one or more external entities for converting between currencies. In some examples, the payment service can track payments using one or more ledgers and can perform conversions, for example, at a time after the purchase or transfer of the NFT 170, for example, in bulk, at optimal times (e.g., based on computing resource availability, exchange rates, etc.), or the like.

Additional fees in the form of a royalty to a creator associated with the NFT 170 may be associated with the purchase or transfer of the NFT 170. Often, NFTs include artwork or other copyrightable content. In at least one example, an NFT 170 can be configured such that a royalty is paid to at least one creator of the NFT 170 upon at least an initial minting. In additional examples, the royalty fee can be paid upon each transaction, change in ownership, and/or new minting 152 of the NFT 170. In this way, creatives can be compensated for their copyrighted work automatically through the payment service.

In the illustrated example, which is a non-limiting example, once the buyer 114 has submitted a selection of which NFT 170 they want to purchase, the payment service can generate or utilize context data to display the available blockchains 144. Each displayed blockchain of the plurality of blockchains 180, 182, 184, 186 is associated with a set of costs 145 that can be displayed to the buyer 114, for example, as a purchase cost and associated fees with each blockchain option. It should be appreciated that the set of costs 145 can vary based on each respective blockchain's cost. It is contemplated that the set of costs 145 may be displayed in numerous ways, including with or without reference to fiat currencies or any other type of exchange without limitation. Upon selection 146 of the blockchain that is desired by the user, payment can be received by the payment service.

In at least one example, the selection of which blockchain to mint the NFT 170 on is done automatically without buyer input. In these examples, one or more machine learning model(s) can be utilized to automatically select or otherwise determine an optimal blockchain. This selection or determination can be based on context data and can aid the buyer in speeding up the purchase process. Additionally, some users may not recognize or understand blockchains or which blockchains would be best suited to host their purchased NFT 170. In this way, automatically selecting an optimal blockchain can reduce barriers to entry for new NFT purchasers. In one example, the payment service servers 102 manage a ledger storing hash-linked chains of blocks of how data is stored on different blockchains, e.g., related to the NFT, or the user's wallet storing such NFT. Through a plurality of smart contracts or chain code, the payment service servers 102 can maintain a consensus between different blockchains with relation to user's wallets and underlying NFTs, route an incoming transaction to one of the blockchain(s), e.g., based on context data, and then enable processing of the transaction on the blockchain.

During the fourth period 150, the payment service servers 102 can tender payment 154 to the seller 116 for the NFT 170 purchased. While the depicted example shows payment 154 being tendered to the seller 116 immediately upon payment 147 by the buyer 114, it should be understood that the payment 154 to the seller 116 may be delayed or otherwise pooled with other payments for a later dispersal into one or more accounts associated with the seller 116. Likewise, payment 154 to the seller 116 may be delayed until the transaction is completed by either the completion of minting, transferring of ownership, or expiration of a return window.

The payment service servers 102 may mint 152 the purchased NFT 170 to the selected blockchain 184. While the depicted example mints 152 the NFT 170 to a different blockchain, in other examples, the buyer selected blockchain 184 can be the same as the original associated blockchain 180 which would necessitate a transfer of ownership, and not a new minting, as described above. A transfer of ownership may include changing the record of ownership on the blockchain hosting the NFT 170. The minting 152 may also be done upon confirmation of payment received by the seller 116. In one example, such transfer can be initiated through atomic swaps to prevent the parties from unilaterally withholding, or withdrawing from, the execution of the transfer operations. For example, a hashed time lock contract is a type of smart contract that uses a hash lock and a time lock to require that the receiving party of a transferred asset, e.g., a payment, to either acknowledge the receipt of the transfer prior to a deadline by generating cryptographic proof of the transfer, or forfeit the ability to claim the asset transferred, thereby returning the asset to the transferring party. Hashed time lock contracts may be utilized to implement atomic swap protocols.

In at least one example, the payment service may mint the NFT 170 to multiple blockchains during the time of the transaction. In some examples, such minting on multiple blockchains can result in "mirrors" of the NFT 170 being associated with each of the blockchains. In some examples, the NFT 170 may be minted to all available blockchains that fall within a certain threshold, such as cost or compatibility. By minting the NFT 170 to a plurality, or all, available blockchains, the payment service can later easily offer a service to transfer the NFT 170 to another of the blockchains. A fee can be collected at the time of transfer to cover any costs related to the transfer. In some examples, the NFT 170 can be associated with a particular identifier that can be used to identify the uniqueness of the NFT 170 when minted on multiple blockchains. In some examples, the payment service servers 102 can associate the particular identifier with a user profile of the buyer 114 and/or seller 116 to manage the uniqueness of the NFT 170.

In the fifth period 160, the payment service servers 102 can verify 162 that the NFT 170 has been successfully minted to the selected blockchain 184. As those skilled in the art can recognize, the verification of successful transfer, minting, or other transaction within a blockchain may take a certain period of time as new blocks should be added to the blockchain to verify that newly added data cannot be altered or removed. Once verified 162, the payment service servers 102 can associate 164 the purchased NFT 170 with the account managed by the payment service application 104 executing on the computing device 106. The buyer 114 can then examine and manage the NFT 170 within their account. In some examples, the NFT 170 can be associated with a collection or gallery of the buyer 114, which can be presented via a user interface as described below. In some examples, as described herein, NFTs can be used as avatars or other representations of users in user profiles, as a payment proxy provided in lieu of payment data when making payments, for providing immersive experiences with other users of a shared ecosystem, or the like.

The initialization of an NFT transaction can occur in a variety of ways. The payment system may provide a plurality of methods of landing on the system for NFT purchases/transfers. For example, a third party may initiate a transfer from a previously generated NFT. In at least one example, the payment system may provide a network to transfer the NFTs in a P2P or POS transaction system. In some examples, a user may request to generate a new NFT and begin the NFT transaction process. In more examples, a merchant may add NFTs as inventory to their digital inventory system. This process of adding NFTs through a digital inventory system can be accomplished via one or more user interfaces and is explained in more detail within the discussion of FIG. 2 below.

Figure 2:
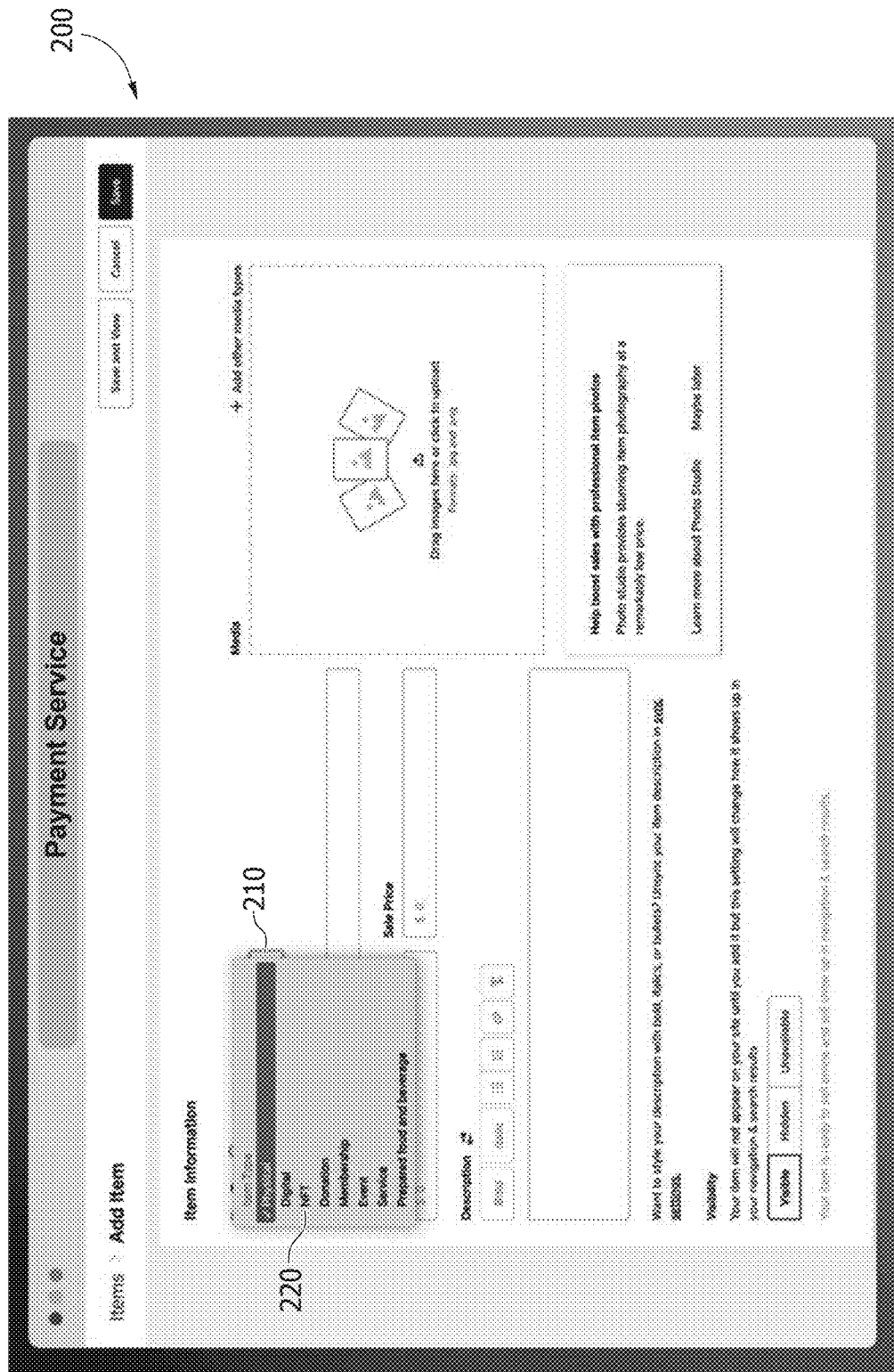
FIG. 2 is an example user interface ("UI") that allows for the generation of NFTs by a seller in accordance with various embodiments of the disclosure.

Referring to FIG. 2, an example user interface ("UI") 200 that allows for the generation of NFTs by a seller in accordance with various embodiments of the disclosure is shown. For instance, the UI 200 may be presented via a display for a seller's computing device in communication with payment service servers that are configured to provide one or more inventory management services, web-development services, webpage editing services, and/or omni-channel presence services. The UI 200 may include one or multiple features, components, and/or functionalities of implementations described herein with reference to FIGS. 1 and 3-19.

According to various examples, the NFT generation form presented by the UI 200 can allow for generating, selecting, or tracking a variety of inventory, including NFTs. In an example, a seller can select an NFT 220 to be added to their inventory. This selection can be done via a dropdown menu 210, or other interactive element, that may indicate what type of inventory is being added to the seller's inventory. However, in certain examples, the selection of an NFT 220 may be done automatically based on determining that an NFT is being generated by other context data or inventory management operations. It should be understood that this example UI 200 is not intended to provide an exhaustive list of item-level information which may be necessary for the generation of an NFT.

Figure 3:
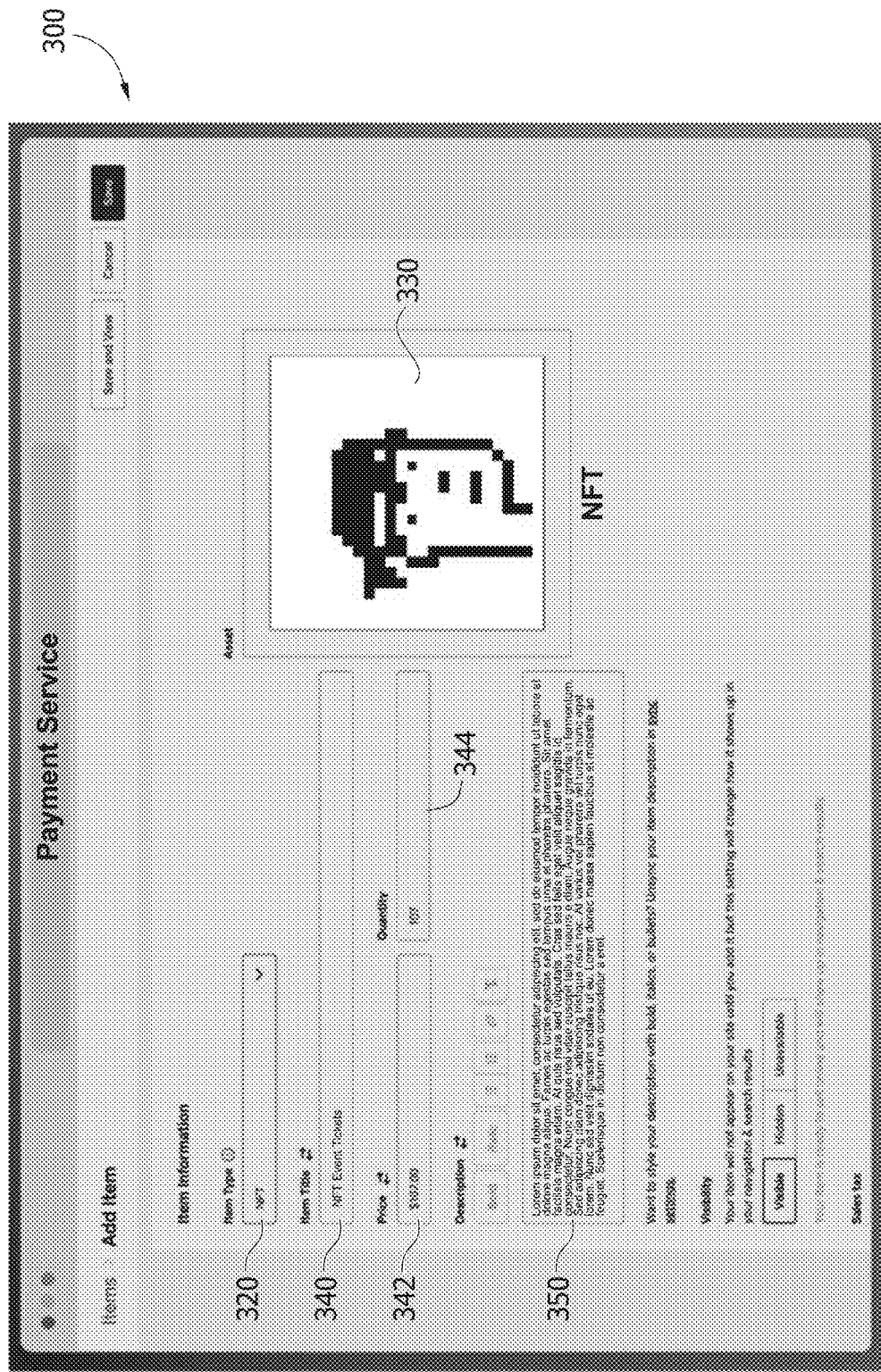
FIG. 3 is an example UI that allows for listing and describing an NFT by a seller in accordance with various embodiments of the disclosure.

Referring to FIG. 3, an example user UI 300 that allows for listing and describing an NFT 330 by a seller in accordance with various embodiments of the disclosure is shown. For instance, the UI 300 may be presented via a display for a seller's computing device in communication with payment service servers that are configured to provide one or more additional inventory management services. The UI 300 may include one or multiple features, components, and/or functionalities of implementations described herein with reference to FIGS. 1-2 and 4-19. The ability to add items to a seller's catalog of merchandise for sale can be done via a form input screen such as that depicted in the UI 300.

In the depicted example, the item type has been selected via the dropdown menu 320 to indicate that the newly added item to the inventory catalog is an NFT 330. The NFT 330 itself can be displayed to indicate what content (including by way of non-limiting example, artistic expression of any medium, pictures, music, GIFs, etc.) may accompany the listing. For digital assets, such as artwork, the artwork itself may be shown. For physical items being tied to an NFT 330, a picture of the physical item may be shown. However, any placeholder graphic may be utilized as needed for various digital assets that are not easily configured for display. In some examples, the representation can be generated using one or more machine learning model(s), which can, for example, be trained on metadata associated with the content, sale listing, or the like.

Other information related to the NFT 330 may be added via the UI 300 including, but not limited to, an item title 340, the cost 342 for the NFT 330, accepted currencies for payment of the cost 342, fees associated with purchasing the NFT 330, the quantity 344 of the NFTs available (for NFTs that are similar but still uniquely different, such as tickets for an event that all have unique seating locations), and a general description 350 about the NFT 330. Typically, the description can be presented on the NFT listing. Further examples may have additional, or fewer items utilized to describe and list the NFT 330 for sale within a seller's inventory. For example, the seller may intend to limit the blockchains available for purchase, limit the areas that the NFT may be purchased or buyers who may purchase the NFT (for example to avoid selling NFTs where they are illegal or where an underage person may not be permitted to own the NFT 330). It should be understood that this example UI 300 is not intended to provide an exhaustive list of item-level information which may be necessary for the adding of an NFT to a seller's inventory.

Figure 4:
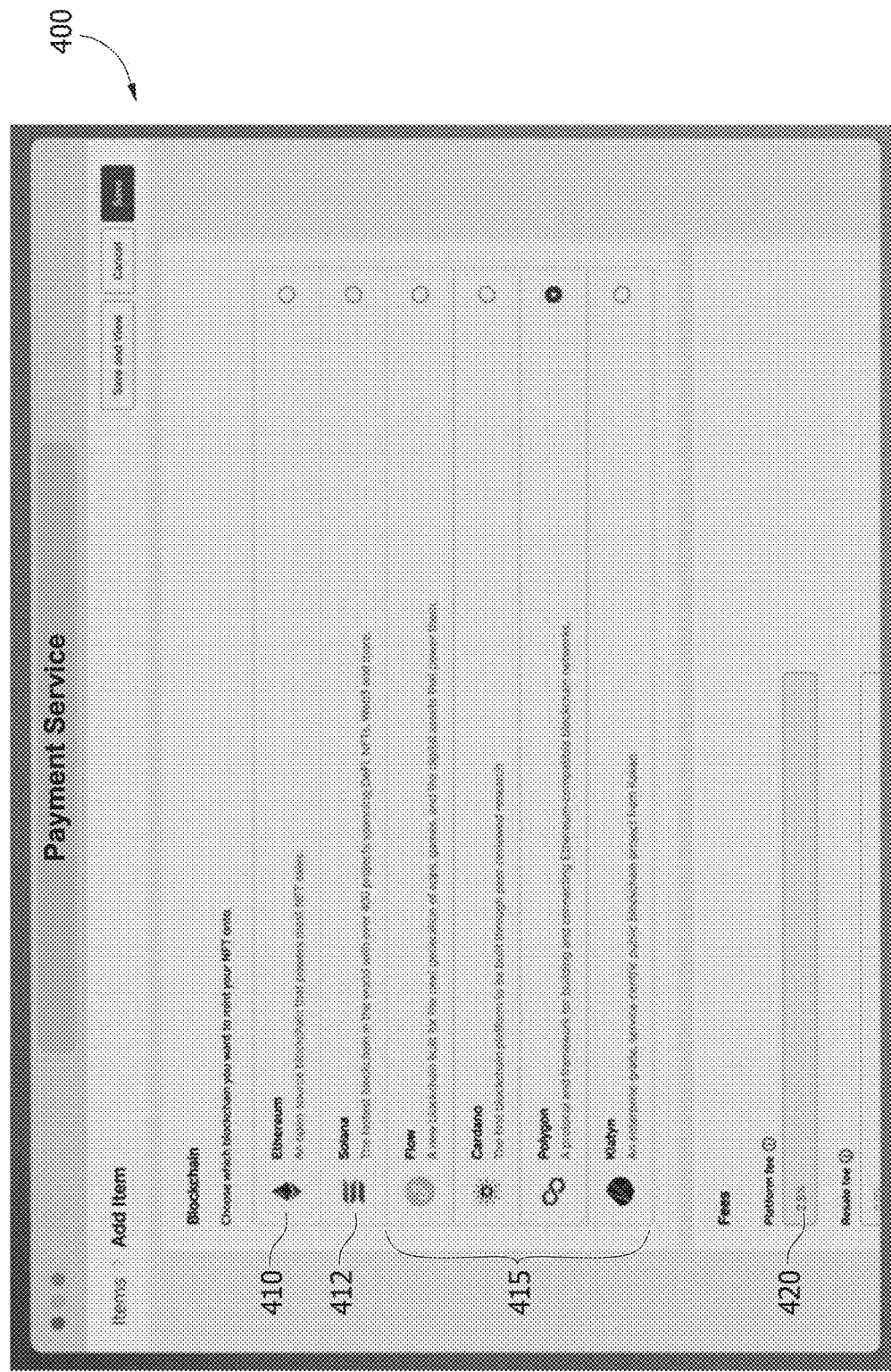
FIG. 4 is an example UI that allows for the selection of a blockchain for minting an NFT by a seller in accordance with various embodiments of the disclosure.

Referring to FIG. 4, an example UI 400 that allows for the selection of blockchain for minting an NFT by a seller in accordance with various embodiments of the disclosure is shown. For instance, the UI 400 may be presented via a display for a seller's computing device in communication with payment service servers that are configured to provide one or more additional inventory management services. The UI 400 may include one or multiple features, components, and/or functionalities of implementations described herein with reference to FIGS. 1-3 and 5-19. The ability to select, prioritize, highlight, or otherwise limit the available blockchains for minting an NFT may be done through a blockchain selection form screen such as that depicted in the UI 400.

In the depicted example, the UI 400 is presenting the seller with a list of available blockchains on which to mint their new NFT. In some examples, the UI 400 can present one or more blockchain selections, which can be determined based on context data, as described above. That is, in some examples, the blockchain selections can be determined to be optimal for the particular NFT. In other examples, the blockchain selections can be a standard set of selections. A first blockchain selection 410 is available, along with a second blockchain selection 412, and a plurality of alternative blockchain selections 415. Although various blockchains are shown within the depicted example UI 400, it should be understood that any sufficient blockchains may be utilized and no preference or endorsement of these networks is implied. In a non-limiting example, the example depicted in UI 400 presents these options as associated with a selection button that includes a short description of each blockchain. It is contemplated that additional information may also be included in the selection button. Additionally, each selection may be highlighted or otherwise changed to indicate various attributes such as past preference, current trends and/or reduced rates, the cheapest option, or selections typically best suited for the type of NFT being generated. In a non-limiting example, the payment service may scan and analyze the previously submitted data associated with the NFT to determine the type of asset being offered and access one or more databases of current or historically best selections for blockchains associated with the determined NFT type. Additional or alternative context data can be used for arranging blockchain selections on the UI 400.

The depicted example UI 400 also includes a listing showing the network fees 420 associated with each selected blockchain. As previously described, each network may require a fee to be paid in order to mint the NFT to the network or to transfer ownership of the NFT to the seller. The network fee can vary on a variety of factors, and is often required to be paid in the form of a cryptocurrency associated with that particular blockchain. For example, users who wish to add transactions to the Ethereum blockchain pay some form of "gas" or cryptocurrency fuel to make that action occur. The cost of this gas can be converted from the current cost of the cryptocurrency associated with the gas into a fiat currency amount which can be displayed as a direct cost in that native cryptocurrency. However, in many examples, such as the depicted example in UI 400, the network fee 420 can be displayed as a percentage of the total transaction. In further examples, the network fee 420 can be displayed as a flat fiat currency amount. Determining the network fees 420 can be based on a predetermined amount, however since cryptocurrency conversion and transaction rates vary often, the payment service may access one or more external services to verify the current transaction rates before displaying a network fee 420 to the seller.

As described above, various examples may allow the seller to sell NFT utilizing lazy minting practices. In these examples, the seller may not necessarily have to select a blockchain to mint to as the buyer may eventually select the blockchain as a condition of the sale. However, the seller may indicate a preference, or in some examples, provide incentives, coupons, or rewards for selecting certain blockchains based on a variety of factors including, but not limited to, previously established business arrangements with the blockchains. Again, it should be understood that this example UI 400 is not intended to provide an exhaustive list of blockchain selection information which may be necessary for the selecting a blockchain for an NFT.

Figure 5:
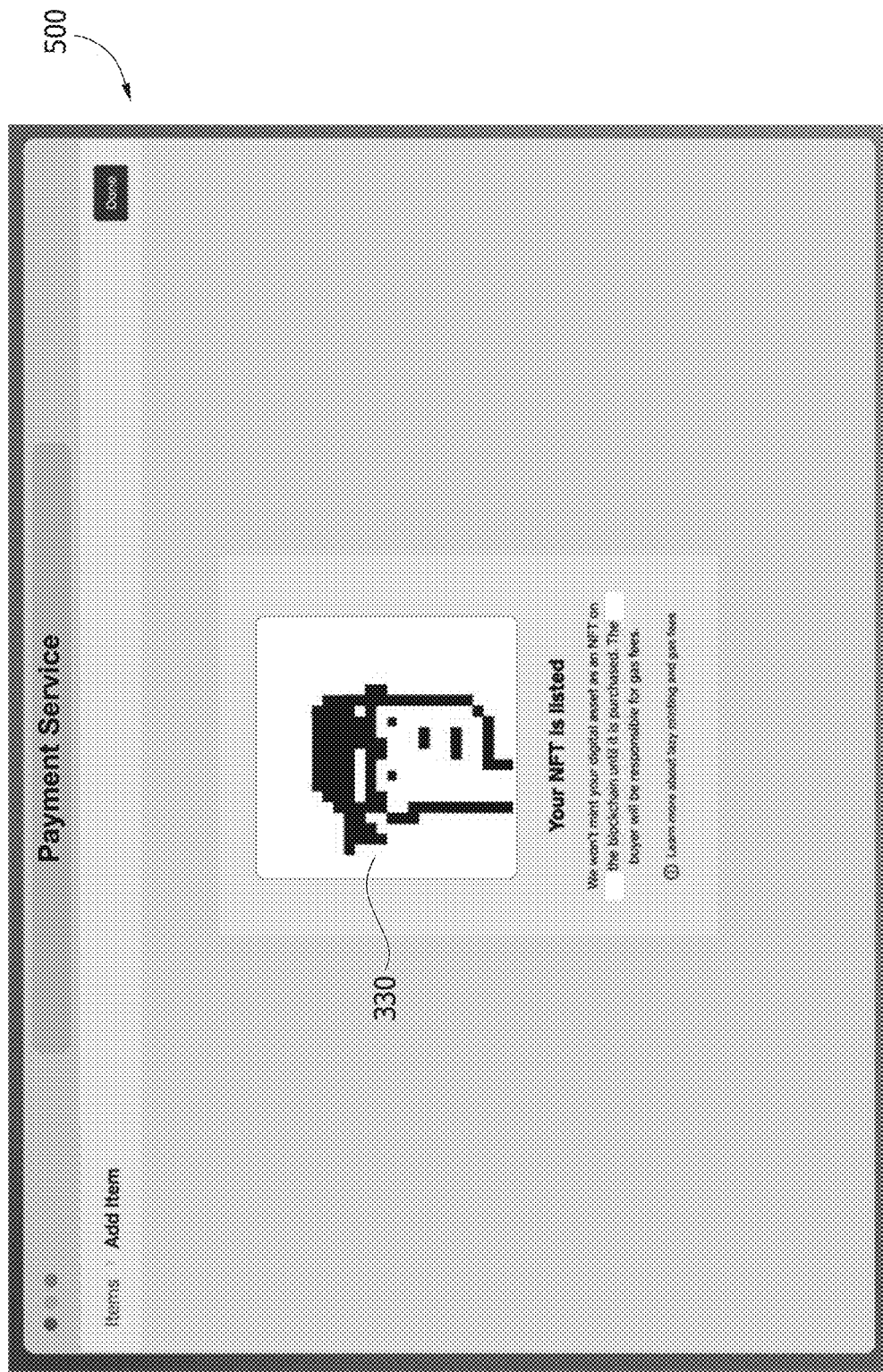
FIG. 5 is an example UI that allows for confirming that an NFT is listed by a seller in accordance with various embodiments of the disclosure.

Referring to FIG. 5, an example UI 500 that allows for confirming that an NFT is listed by a seller in accordance with various embodiments of the disclosure is shown. For instance, the UI 500 may be presented via a display for a seller's computing device in communication with payment service servers that are configured to provide one or more additional inventory management services. The UI 500 may include one or multiple features, components, and/or functionalities of implementations described herein with reference to FIGS. 1-4 and 6-19.

Specifically, once the NFT 330 has been properly documented, the UI 500 may present a listing prompt to notify the seller that the NFT 330 has been listed and is now available for sale. In some examples, the NFT 330 can be minted to at least one blockchain at the time it is listed for sale. In other examples, the NFT 330 can be minted at a later time, for example via a lazy minting procedure. In the depicted example UI 500, the NFT 330 may be minted to a blockchain under a lazy minting procedure and may be minted by the payment service upon authorization of a sale of the NFT 330 by a buyer. In some examples, the payment service pushes the transaction costs related to the minting of the NFT 330 to the selected blockchain to the buyer. In this way, the seller may generate and list for sale a plurality of NFTs without having to incur any upfront costs beyond the costs to maintain the payment service account. In some examples, however, the seller may be responsible for the fees. In some examples, the payment service may cover at least part of the fees on behalf of the seller or the buyer.

Figure 6:
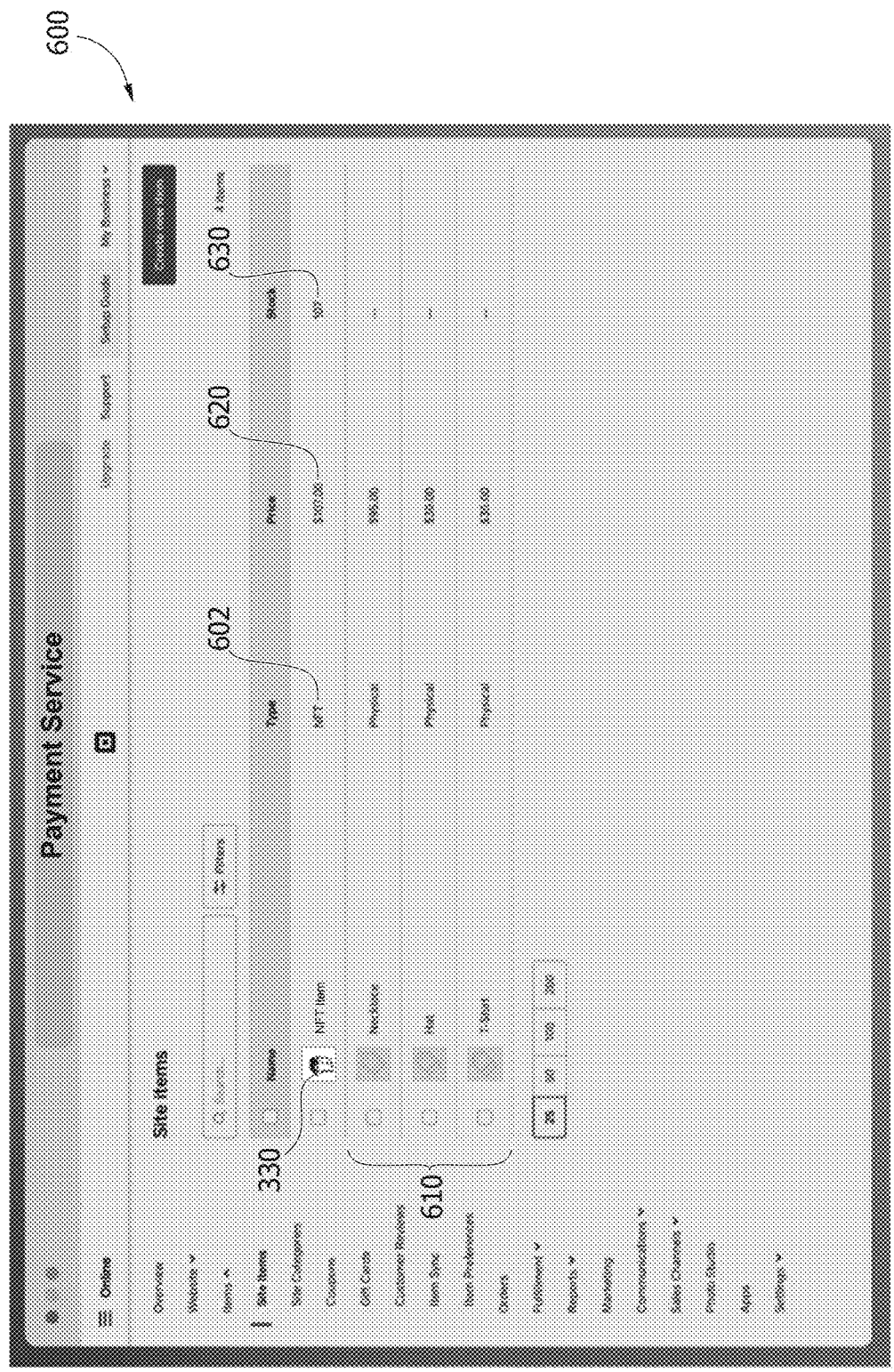
FIG. 6 is an example UI that allows for displaying a seller's inventory list including one or more NFTs in accordance with various embodiments of the disclosure.

Referring to FIG. 6, an example UI 600 that allows for displaying a seller's inventory list including one or more NFTs in accordance with various embodiments of the disclosure is shown. For instance, the UI 600 may be presented via a display for a seller's computing device in communication with payment service servers that are configured to provide one or more additional inventory management services. The UI 600 may include one or multiple features, components, and/or functionalities of implementations described herein with reference to FIGS. 1-5 and 7-19.

The payment service can provide to the seller an inventory management system that can be configured to view, manage, and edit inventory that is available for sale over an online network or via other sales venues such as through a P2P or POS environment. The depicted example UI 600 provides a list of items within the seller's inventory including an NFT 330 along with other physical inventory items 610. The NFT 330 within the inventory list can indicate the type 602 of product (NFT), the current cost 620 of the NFT 330, and the available stock 630 of the NFT. As discussed above, unique but related NFTs, such as those for event tickets, may be minted as unique items (e.g., with different seat numbers) while all retaining similar features (e.g., all NFTs relating to the same event, etc.). This may allow a stock 630 of NFTs to exist and be available for sale.

The depicted example is not meant to be exhaustive and can be configured to show a variety of additional information, such as the current number of stock being purchased, how many have been previously purchased, the blockchains previously selected by buyers, the number of views of the item by potential buyers, etc. It is contemplated that other traditional inventory management processes can apply similarly to NFTs as they do to physical items, such that NFTs may be added, transferred, put on sale, suspended, recalled, and/or packaged together in bundles.

Figure 7:
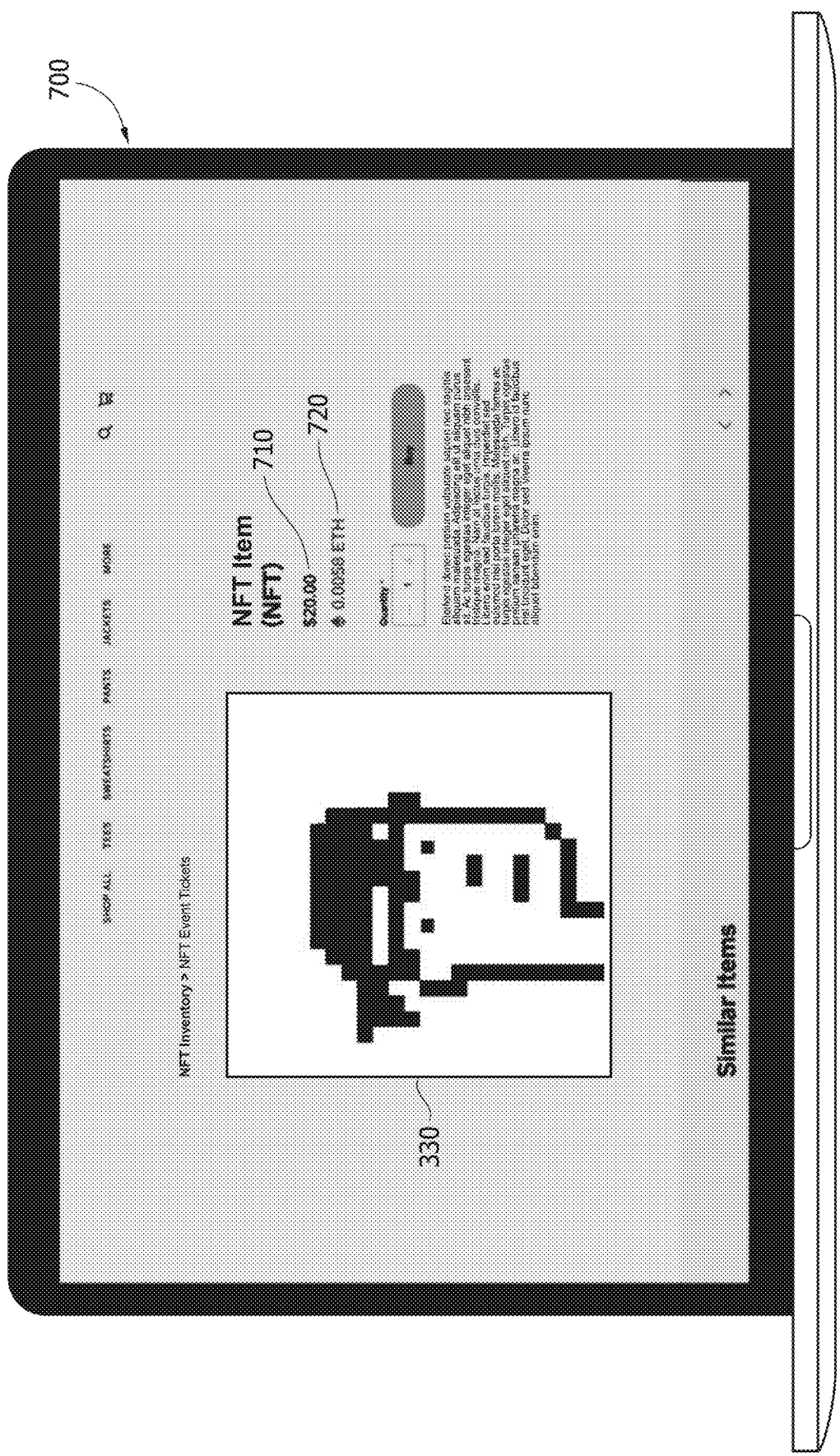
FIG. 7 is an example UI that allows for presenting an offer for sale of an NFT by a seller in accordance with various embodiments of the disclosure.

Referring to FIG. 7, an example UI that allows for presenting an offer for sale of an NFT by a seller in accordance with various embodiments of the disclosure is shown. For instance, the UI 700 may be presented via a display for a buyer's computing device in communication with payment service or other third-party servers that are configured to provide one or more additional web-hosting services. The UI 700 may include one or multiple features, components, and/or functionalities of implementations described herein with reference to FIGS. 1-6 and 8-19.

The depicted example UI 700 is presented as a webpage for purchasing products not unlike traditional physical or digital service products. However, here the NFT 330 is presented for sale and is listed at both a fiat currency cost 710 and a cryptocurrency cost 720. When generating instructions for presentation of the webpage, the payment service or other web-hosting provider may access or otherwise reference a current conversion rate between a fiat currency selected by the seller and the cryptocurrency. Once known, the fiat currency cost 710 may then be used as a reference amount for generation of the cryptocurrency cost 720. In some examples, the UI 700 may list multiple cryptocurrency costs 720. This setting can be selected by the buyer or seller depending on their preferences.

It is contemplated that the UI 700 can be formatted to be displayed on a variety of devices, sizes, and formats. For example, the webpage may be formatted and displayed on a mobile computing device such as a buyer device. In further examples, the seller may allow the potential buyer to experience or otherwise sample the NFT on their device accessing the UI 700. This sample may be in the form of an immersive user experience, but may be limited by the type of NFT or the preferences of the seller and/or buyer. Additionally, the purchase of NFT products from a merchant may be an e-commerce website, or another NFT aggregator website. In at least one example, social media sites may provide links to initiate NFT transactions via sharable content. In still additional examples, the example UI 700 may be formatted for presentation within an application, as described above.

In additional examples, the UI 700 may be presented from a P2P seller which may be another user, such as a user wishing to sell an NFT in their current portfolio. In other examples, the seller may be a merchant who may have a POS environment to conduct the transaction and display the NFT. This may often be in a physical environment where the offer for sale is presented in a physical form and not on a webpage. For example, an art exhibit may provide a physical token, QR code, or scratch-off card that can be purchased as a physical object and utilized as a unique method to initialize an NFT transaction. It should be understood that this example UI 700 is not intended to provide an exhaustive list of formats with which an NFT may be offered for sale within a blockchain-agnostic network.

Figure 8A:
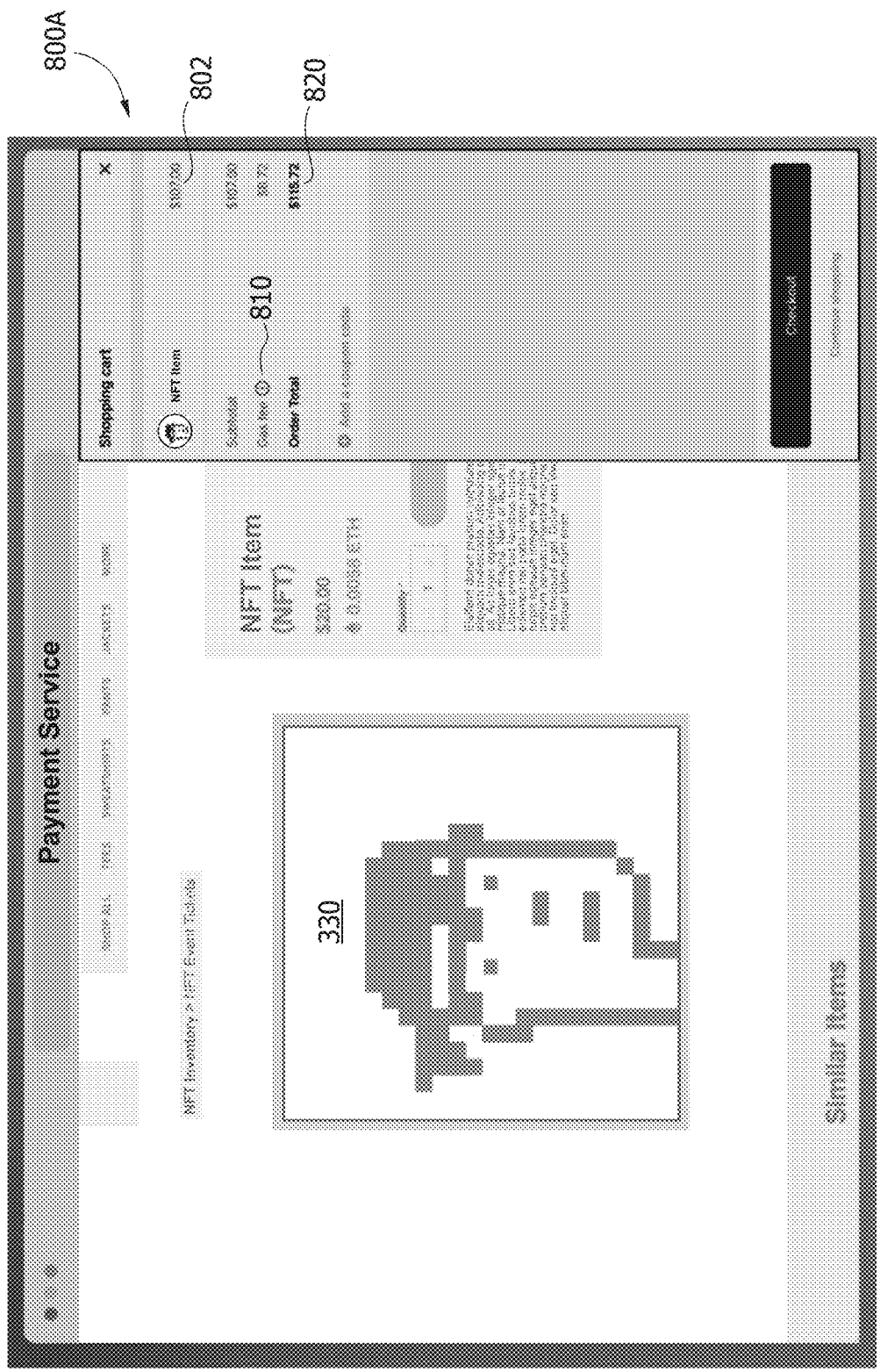
FIG. 8A is an example UI that allows for the selection of one or more NFTs for purchase via a merchant to buyer transaction in accordance with various embodiments of the disclosure.

Referring to FIG. 8A, an example UI 800A that allows for the selection of one or more NFTs for purchase via a merchant to buyer transaction in accordance with various embodiments of the disclosure is shown. For instance, the UI 800A may be presented via a display for a buyer's computing device in communication with payment service or other third-party servers that are configured to provide one or more additional web-hosting services. The UI 800A may include one or multiple features, components, and/or functionalities of implementations described herein with reference to FIGS. 1-7 and 8B-19.

In the depicted example UI 800A, the buyer has selected an NFT for purchase and has added it to their online shopping cart. The shopping cart lists the cost 802 of the NFT, the transaction fee (listed as a gas fee 810), and the order total 820. As is typical of online shopping carts, other data may also be presented in various examples including, but not limited to, applicable taxes, discounts, coupons, additional items within the shopping cart, along with the ability to modify the stock count of the items, including the ability to remove them from the cart. As such, it should be understood that this example UI 800A is not intended to provide an exhaustive list of formats with which an NFT may be purchased within a blockchain-agnostic network. An alternative example of purchase is discussed below.

Figure 8B:
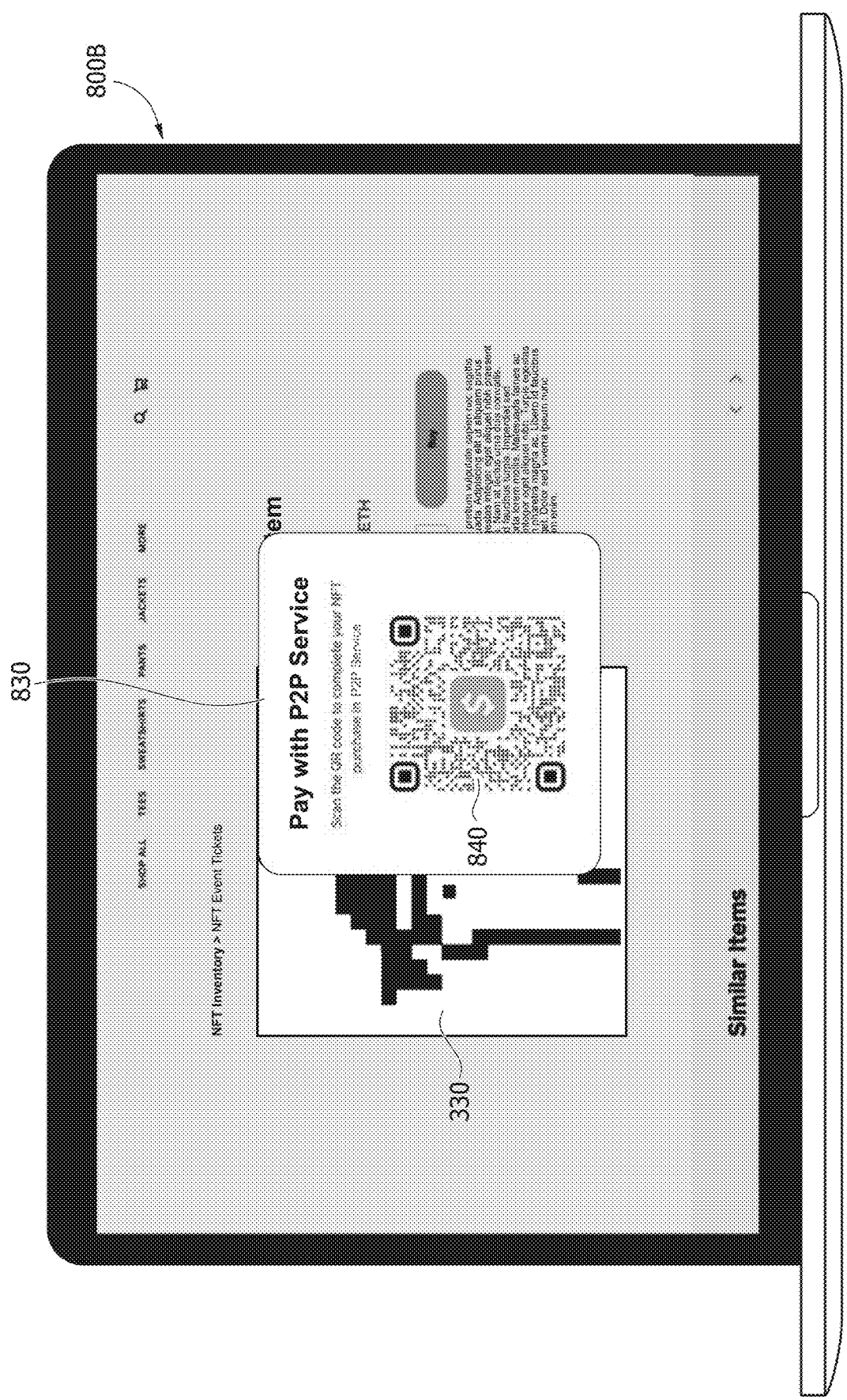
FIG. 8B is an example UI that allows for initializing a peer-to-peer ("P2P") service transaction to purchase an NFT in accordance with various embodiments of the disclosure.

Referring to FIG. 8B, an example UI 800B that allows for initializing a peer-to-peer ("P2P") transaction to purchase an NFT in accordance with various embodiments of the disclosure is shown. For instance, the UI 800B may be presented via a display for a buyer's computing device in communication with payment service or other third-party servers that are configured to provide one or more additional web-hosting services. The UI 800B may include one or multiple features, components, and/or functionalities of implementations described herein with reference to FIGS. 1-8A and 9-19.

In various examples, the buyer may desire to utilize a payment or P2P service to purchase an NFT. In an example, the location of the sale page and the specific item details necessary for a transaction can be transferred to the buyer's computing device. In response, the seller's webpage may provide an alternative checkout method by initializing an alternative payment service or P2P service by providing a payment prompt 830 that can feature the necessary information. In the depicted example UI 800B, the payment prompt 830 includes a quick response ("QR") code 840 can be provided that can quickly allow a buyer with a computing device to pull up the necessary data needed to initiate the transaction on their computing device. It is contemplated that other devices with camera or QR code reading capabilities may also function to initialize similar transactions.

The provider of this QR code for completion of the transaction may be a seller or merchant as in the depicted example UI 800B. However, various examples may allow for other users of the blockchain agnostic NFT network to generate and provide them to other users for the purposes of transferring NFTs between accounts as sales or gifts. Other methods may be utilized to initialize a blockchain agnostic NFT network transaction including, but not limited to, text message links, tweets, private messages, or other conversational commerce methods.

While FIGS. 8A and 8B reference an online transaction, the same or similar techniques or UIs can be implemented via a transaction at a brick-and-mortar store of a seller. That is, in some examples, the same or similar UIs can be presented via seller computing devices to facilitate a transaction at a brick-and-mortar store.

Figure 9:
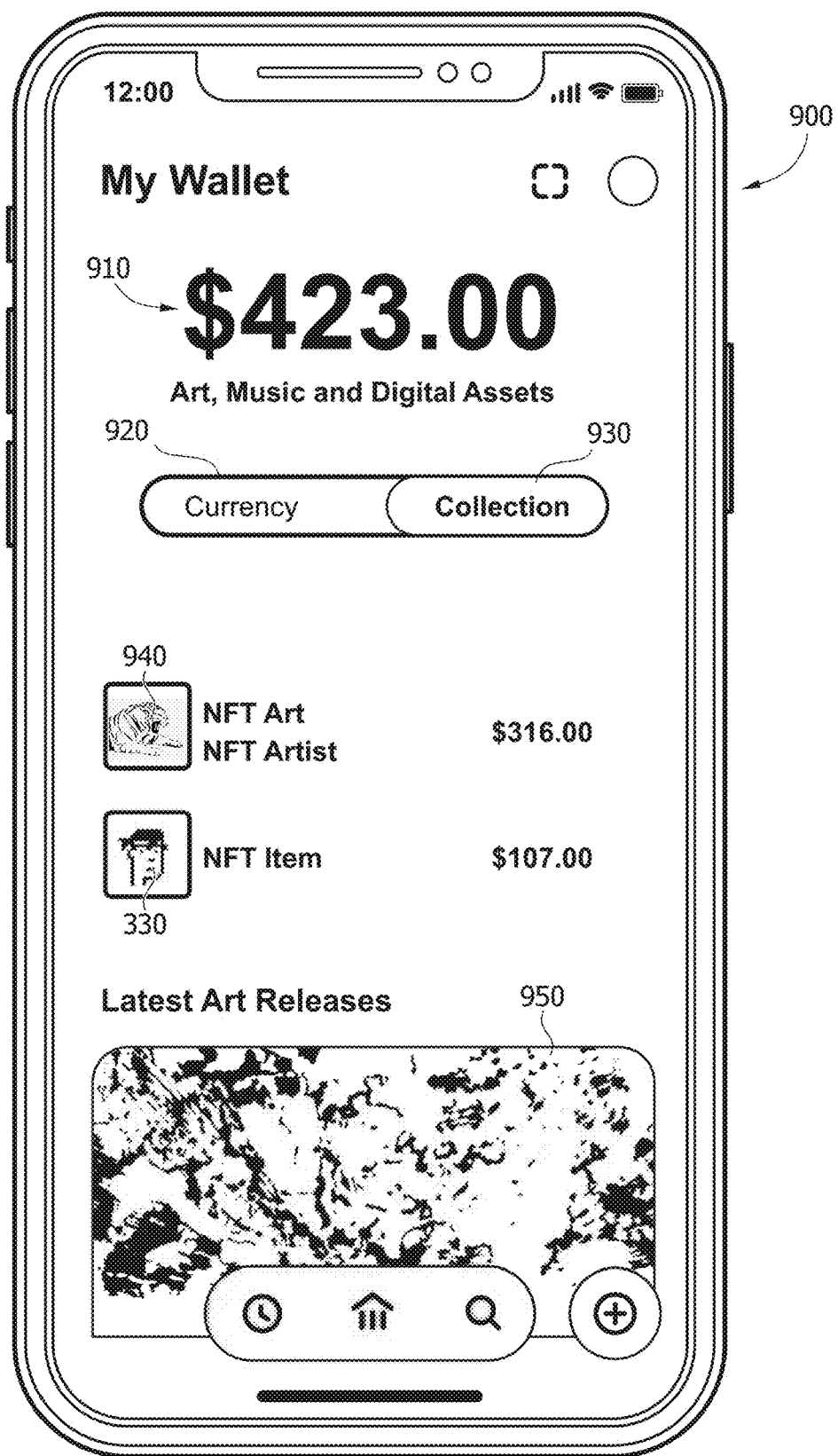
FIG. 9 is an example UI that allows for viewing and managing digital assets including NFTs within a payment service application by the buyer in accordance with various embodiments of the disclosure.

Referring to FIG. 9, an example UI 900 that allows for viewing and managing digital assets including NFTs within a payment service application by the buyer in accordance with various embodiments of the disclosure is shown. For instance, the UI 900 may be presented via a display for a buyer's computing device, such as a smart phone that is executing a payment service application configured to be in communication with the payment service. The UI 900 may include one or multiple features, components, and/or functionalities of implementations described herein with reference to FIGS. 1-8 and 10-19.

In the depicted example UI 900, the payment service application allows a user to see their collection 930 or their account's currency 920. The currency 920 section may allow a user to see their current fiat currency, stock, and/or cryptocurrency balances. The collection 930 section of the payment service application can display the collection's total value 910, along with the listing of recent NFT purchases (shown in the depicted example UI 900 as NFT 330 along with an NFT artwork 940). In some examples, the NFTs associated with the collection 930 can be held in a digital wallet associated with the user account (e.g., with the payment service provider), a digital wallet associated with a blockchain on which it is minted, a third-party service provider, or the like. In some examples, the payment service provider can provide one or more mechanisms (e.g., APIs, SDKs, etc.) to enable integration and/or access to NFTs held in third-party digital wallets. In some examples such as the depicted example UI 900, other assets, such as newly released art 950 may be displayed, however it is contemplated that other promoted NFTs, sales, or other promotions may be presented. In additional examples, the UI 900 may provide the ability for a user to sell or otherwise transfer an NFT from their collection to another user on the payment system as a P2P transaction.

FIGS. 10-14 illustrate flowcharts showing example processes involving techniques as described herein. The processes illustrated are described with reference to components described in the figures for convenience and ease of understanding. For example, individual of the operations illustrated can be performed by the transfer component 108 and/or context component 110 of FIG. 1A. However, the processes illustrated are not limited to being performed using components described the figures and such components are not limited to performing the processes illustrated herein.

Furthermore, the processes described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes can be combined in whole or in part with each other or with other processes.

Figure 10:
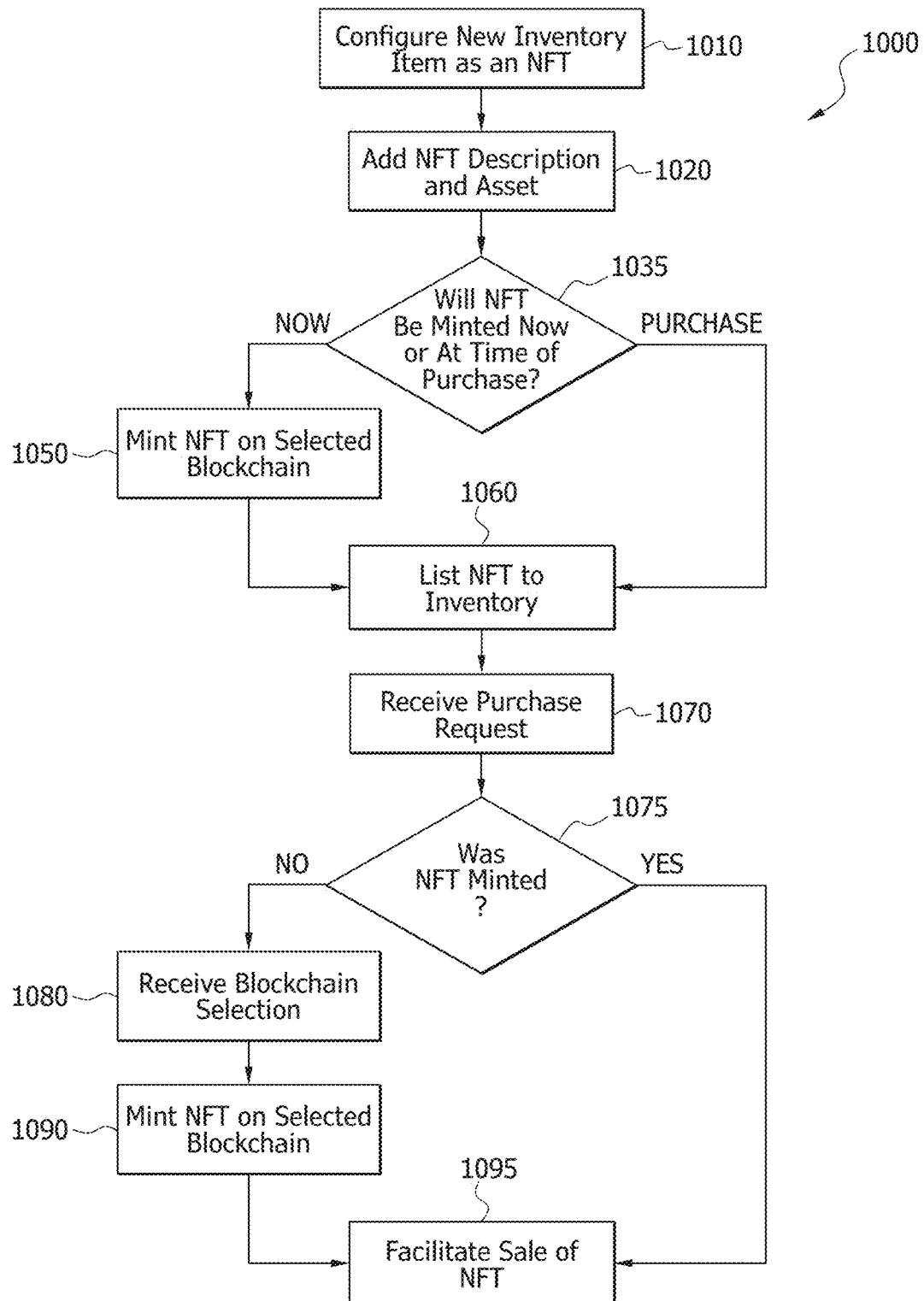
FIG. 10 is a flowchart illustrating an example process for a seller generating and selling an NFT within a blockchain agnostic network in accordance with various embodiments of the disclosure.

Referring to FIG. 10, a flowchart illustrating an example process 1000 for a seller generating and selling an NFT within a blockchain agnostic network in accordance with various embodiments of the disclosure is shown. In some examples, the process 1100 may include one or multiple features, components, and/or functionalities of implementations described herein with reference to FIGS. 1-9 and 11-19.

At 1010, the process 1000 may include a seller (e.g., a merchant), configuring one or more new inventory items as NFTs. This can be similar to the process depicted in FIG. 2, but may also be completed through one or more batch operations. At 1020, the seller can add an NFT description, cost and/or asset to the NFT listing. This can also be similar to the process depicted in FIG. 3.

At 1035, the seller can select, or have previously directed, whether the new NFT should be minted now or at the time of purchase, in a lazy minting. At 1060, when a lazy minting process is desired (e.g., the NFT will be minted at the time of purchase), the new NFT can be listed to the inventory. The adding of the listing of the NFT to the inventory may be configured to automatically list the NFT for sale on one or more digital marketplaces. In some examples, the digital marketplaces can be operated in part by the payment service. However, at 1050, when an NFT is configured to be minted upon creation, minting can be performed on at least a selected blockchain. In at least one example, a blockchain can be selected for minting the NFT. In some examples, this step can be similar to the process depicted in FIG. 4 where a plurality of suitable blockchains are surfaced to the seller for selection. However, in some examples, one or more machine learning model(s) may be utilized by the payment service to automatically select an optimal blockchain, without input by the seller. In at least one example, context data can be used to determine at least one of which blockchains to surface to the seller and/or which blockchain to select (e.g., automatically). In some examples, the NFT can be minted on a plurality of blockchains at the time of creation. Once minted, the NFT can be listed to the inventory at 1060.

The NFTs can remain in inventory and be available for sale or trade until a purchase request is received at 1070. At 1075, upon receiving the purchase request, the process 1000 can determine if the NFT was previously minted or not. If the NFT was previously minted, the payment service can continue to facilitate the sale at 1095. When the NFT was not previously minted, the process 1000 can receive a blockchain selection at 1080. In at least one example, a blockchain can be selected for minting the NFT. In some examples, a plurality of suitable blockchains are surfaced to the buyer or seller for selection. However, in some examples, one or more machine learning model(s) may be utilized by the payment service to automatically select an optimal blockchain, without input by the buyer or seller. In at least one example, context data can be used to determine at least one of which blockchains to surface to the buyer and/or seller and/or which blockchain to select (e.g., automatically). In some examples, information associated with the blockchain(s) (e.g., costs, blockchain data, performance data, etc.) can be surfaced to the user to, for example, provide the user with additional context relating to each of the blockchains. At 1090, the NFT can be minted on at least the selected blockchain. Finally, at 1095, the sale of the NFT can be facilitated by the payment service.

Figure 11:
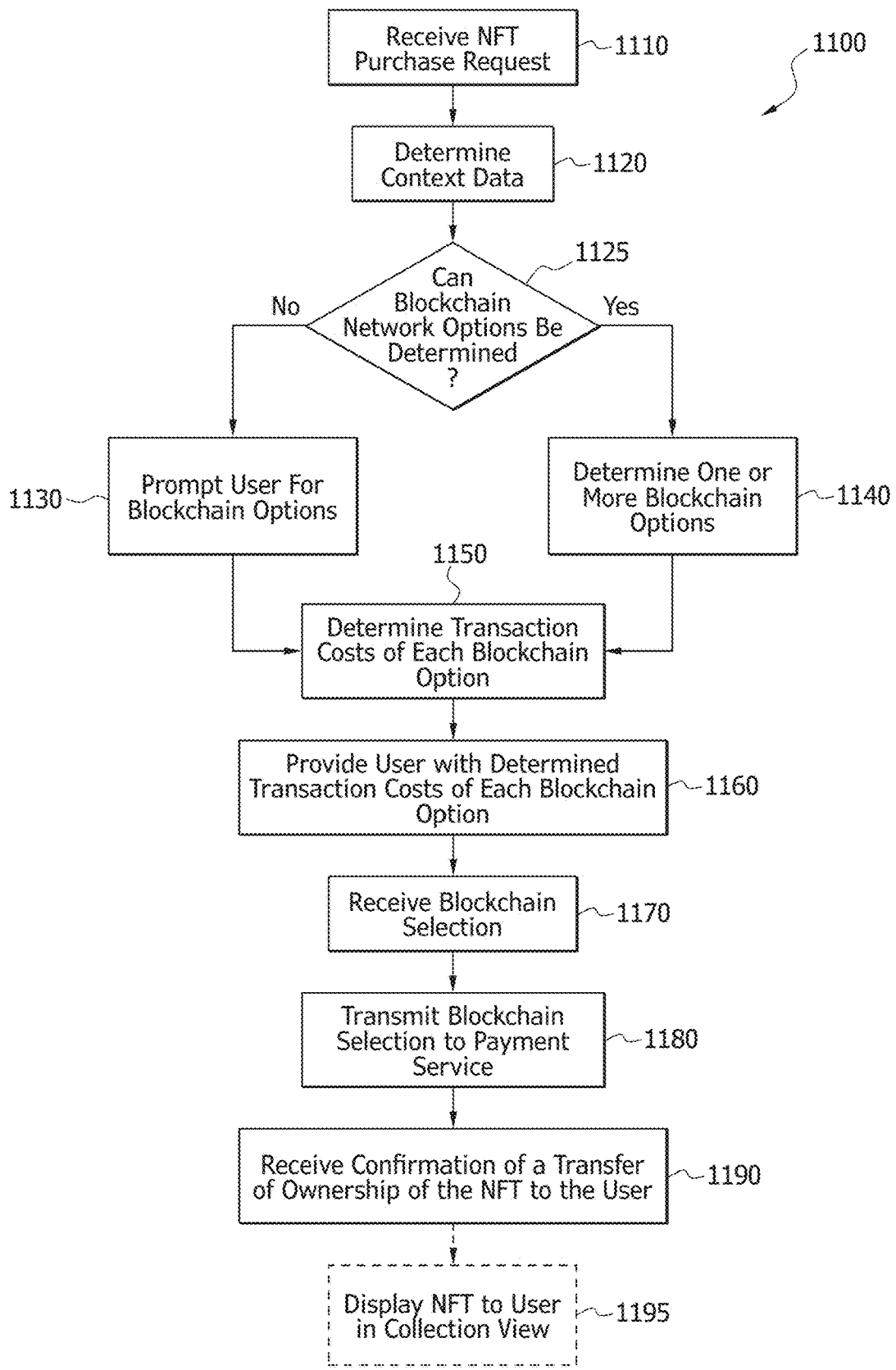
FIG. 11 is a flowchart illustrating an example process for a user purchasing an NFT within a blockchain agnostic network in accordance with various embodiments of the disclosure.

Referring to FIG. 11, a flowchart illustrating an example process 1100 for a user purchasing an NFT within a blockchain agnostic network in accordance with various embodiments of the disclosure is shown. In some examples, the process 1100 may include one or multiple features, components, and/or functionalities of implementations described herein with reference to FIGS. 1-10 and 12-19.

At 1110, the process 1100 may include receiving an NFT purchase request. This purchase request can be issued by the seller of the NFT and may be a request to complete a transaction. The purchase request can be issued at the conclusion of a shopping session on a seller's webpage, online store, or other POS transaction. In some examples, a P2P transaction may occur when another user's device and/or application may issue a purchase request as a result of a privately conducted trade and/or sale of one or more NFTs. For instance, a first user of a payment service application on their computing device desires to sell a currently owned NFT to a second user of a payment service application on their computing device. The payment service application on a first computing device can issue a purchase request that can be received by the payment service application operated on the second user's computing device that requests to conduct a transaction on the blockchain agnostic NFT network. In another instance, a merchant may have a physical store that has NFTs available for sale. A user may be capable of utilizing a payment system application on their computing device to interact with an identifier, such as by scanning a QR code, provided by the merchant that corresponds to a particular NFT for sale. The processing of the scanned QR code can generate a purchase request that is received by the payment service application on the user's computing device to initiate a transaction for that associated NFT.

At 1120, the process 1100 may include determining context data associated with at least one of the buyer, the seller, or the received purchase request. As discussed previously within the depicted example of FIG. 1, context data can be generated from many sources and utilized to make decisions about the current transactions. For instance, the selection of what blockchain on which to mint or transfer the purchased NFT can be selected through the use of context data. Not every blockchain may be compatible with every NFT. Therefore, many examples attempt to determine suitable blockchains for the NFT associated with the purchase request. As described above, the context data can be provided as an input to a machine learning, or other automated, process to determine one or more optimal blockchains for minting or otherwise transferring the purchased NFT.

For example, payment service servers configured to carry out one or more steps within the process 1100, may seek out various available data to generate context data including, but not limited to, determining the type of NFT being transacted, evaluating previously selected blockchains those NFT types were minted to, determining preferences and past transaction histories of the buyer and seller within the transaction, and/or similar transactions conducted by other parties within the buyer and/or seller's available social network contacts. The generated context data can be utilized to parse a list of available blockchains.

At 1125, the process 1100 may analyze whether blockchain options can be determined from the available context data. For example, a list of available blockchains is available and the context data helps to narrow down this list to a subset of one or more optimal blockchains for the NFT associated with the transaction. However, in some examples, the process 1100 can proceed to prompt the user for one or more blockchain options, at 1130. Once prompted, the user may input one or more blockchain options to attempt via name, address, or other input method. Once added by the user, the process 1100 can begin to determine the transaction costs associated with individual of the blockchain(s), at 1150. However, when one or more blockchain options can be determined, at 1125, then the process 1100 can proceed with that blockchain option determination, at 1140. The determination can occur in response to the determined context data being parsed and processed. As described above, in some examples, such determined blockchain options can be determined to be optimal based on context data, as described above.

At 1150, the process 1100 may include determining transaction costs associated with each of the blockchain options. In many examples, the transaction costs include the cost of the NFT itself, the fee needed to facilitate either the minting or transfer of ownership of the NFT to the selected blockchain, a processing fee issued by the payment service for facilitating the transaction, or the like. The cost of the NFT can be a fixed and known amount at the start of each transaction. The processing fee can be a fixed amount or percentage but may also be dynamically adjusted based on a variety of factors including the overall value of the NFT, the blockchain being minted to, or other premium discounts applied to this specific transaction. The facilitation fee can be variable between each blockchain, but also variable over time as the associated cryptocurrency often needed for the minting or ownership transfer changes in value compared to the fiat currency usually utilized in the NFT transactions. In certain examples, the determination of transaction costs may be utilized when determining one or more blockchain options.

At 1160, the process 1100 may include providing the user (or buyer) with the determined transaction costs of each blockchain option. For instance, the payment service application executed on the buyer's computing device may surface (i.e., display) a list of the determined blockchain options, and each option can have an associated transaction cost. The user (or buyer) can then evaluate the overall cost for each blockchain option and select the best option for their needs. In some examples, the transaction cost may be presented as a single cost that covers all applicable fees. In alternative examples, the fees summing to generate the transaction cost can be independently displayed for user comparison. Additional or alternative information can be determined and/or presented in association with individual of the blockchain options.

At 1170, the process 1100 may include receiving a blockchain selection. This selection can be in the form of an input received on the computing device touchscreen indicating a selection for the list of determined blockchains. However, it is contemplated that this selection can be done through any number of user input methods. In certain examples, the buyer may have their preferences set to permit the selection of a single blockchain. In these instances, the process 1100 may not provide a list of determined blockchain options and may not receive a selection. The process 1100 can proceed as if the buyer had directly selected that pre-selected blockchain for each NFT transaction. Further, in some examples, the payment service servers can select an optimal blockchain without input from the user. As described above, context data can be used to determine an optimal blockchain.

At 1180, the process 1100 may include transmitting the blockchain selection to the payment service. For instance, the buyer may be conducting the NFT transaction on a payment service application executed on their computing device. The payment service application has received a blockchain selection. The selection is then transmitted to the payment service servers for further processing. In examples where the payment service servers select the blockchain, the process 1100 can continue to 1190, as described below. That is, in some examples, the process 1100 can omit one or more steps (e.g., 1150-1180) when the payment service servers select the blockchain.

Further processing can include steps undertaken to transfer ownership of the NFT by either adjusting the record of ownership on the current blockchain associated with the NFT, or by minting the NFT on the new and different blockchain selected by the buyer. Once the change in ownership or minting has completed, verification can be obtained prior to completing the transaction. However, in some examples, the blockchain may require a certain period of time to pass before verification can occur. However, in some examples, the payment service can cover or utilize one or more methods to assess the risk of completing the transaction prior to the verification occurring.

At 1190, the process 1100 may include receiving confirmation of a transfer of ownership to the user. This can be verified by reading the updated data in the blockchain. This verification can include a transaction completion prompt as described in more detail above. The buyer can conclude that the transaction is finished upon receiving this confirmation, even though one or more actions are still occurring behind the scenes. At 1195, the process 1100 may optionally include a method to display the purchased NFT to one or more users via display in a collection view of a computing device. Once ownership has been confirmed by the payment service application, the NFT, and especially if they are NFTs associated with digital assets, can be configured to be viewable on the user payment services application.

Figure 12:
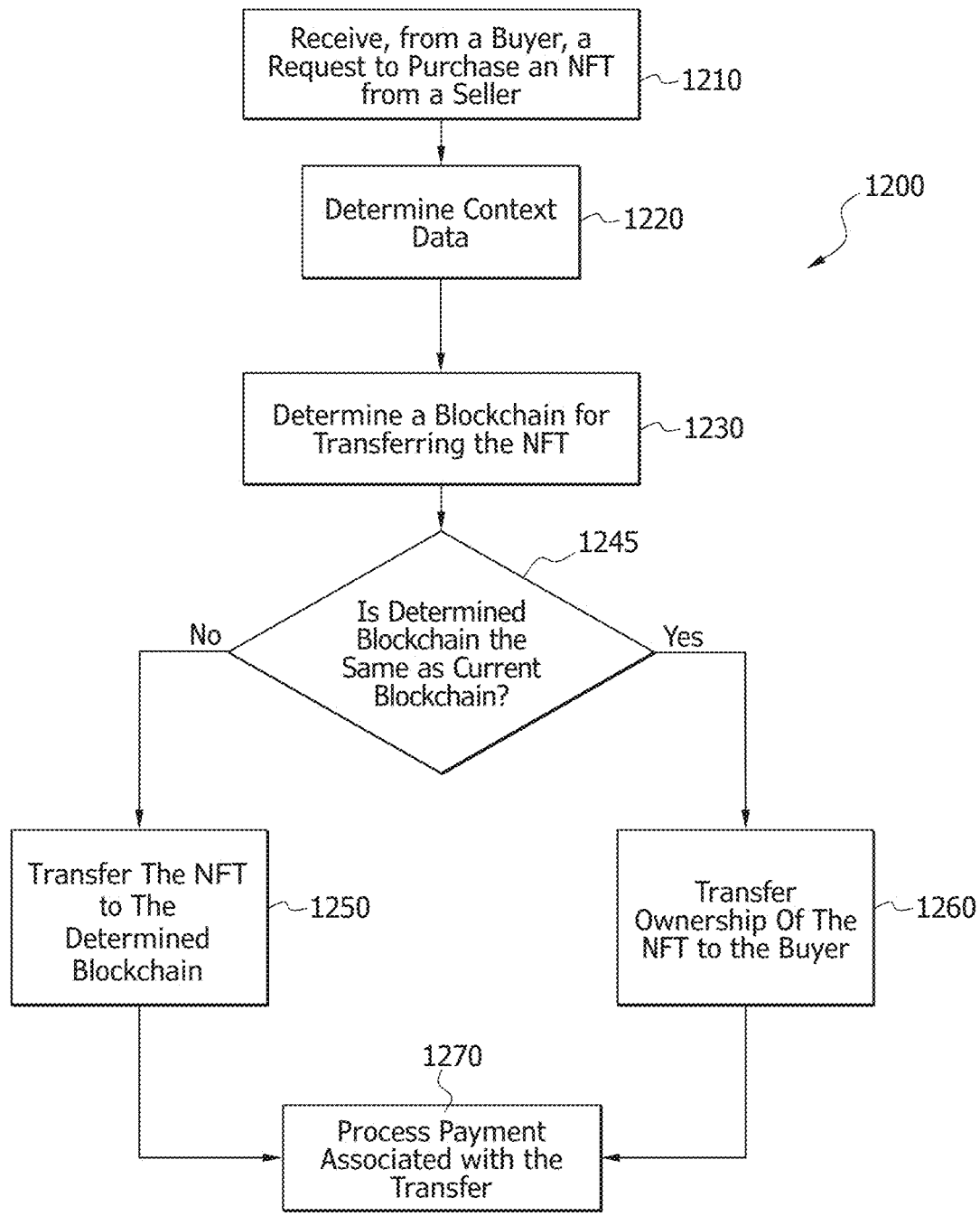
FIG. 12 is a flowchart illustrating an example process for a merchant selling an NFT within a blockchain agnostic network in accordance with various embodiments of the disclosure.

Referring to FIG. 12, a flowchart illustrating an example process 1200 for a merchant selling an NFT within a blockchain agnostic network in accordance with various embodiments of the disclosure is shown. In some examples, the process 1200 may include one or multiple features, components, and/or functionalities of implementations described herein with reference to FIGS. 1-11 and 13-19.

At 1210, the process 1200 may include receiving, from a computing device of a buyer, a request to purchase an NFT from a seller. In at least one example, the NFT can be minted on a blockchain and held in a digital wallet associated therewith. As described above, in some examples, the NFT may not yet be minted and can be minted at a later time (e.g., in association with a transaction). That is, a representation of a to-be-minted NFT can be offered for sale and, in some examples, the request to purchase the NFT can be a request to purchase the to-be-minted NFT. In some examples, the request can be initiated by accessing a resource (e.g., address) associated with an interactive element, such as a hyperlink, a user interacting with an ecommerce website, a user making a purchase in a physical storefront (e.g., a brick-and-mortar store), interacting with a social network or other third-party website. In some examples, the seller can be a merchant, a third-party, or another user of a payment service. In some examples, when the request is associated with a merchant and/or a third-party, the associated transaction can be a point-of-sale transaction completed via a point-of-sale system. In some examples, when the request is associated with another user (e.g., a "peer"), the associated transaction can be a P2P transaction.

At 1220, the process may continue with determining context data associated with at least one of the buyer, the seller, or the NFT. As described above, context data can include, but is not limited to, user data, preference data determined from the user data (e.g., seller preference data, buyer preference data, etc.), transaction trend data determined from user data and/or transaction data, asset data (e.g., associated with the NFT 170), blockchain data, which can be used to determine one or more suitable blockchains for holding NFTs, social connection data, expiration time, or the like.

At 1230, the process 1200 may determine a blockchain for transferring the NFT. In some examples, the payment service servers may receive a selection of an available blockchain option. As described above with respect to the depicted example process 1100 of FIG. 11, the buyer may be presented with a list of available blockchain options that can be utilized to either mint or transfer ownership of the NFT. In some examples, the list of available blockchains can be determined based at least in part on context data associated with the buyer, the seller, the digital asset associated with the NFT, the request, and/or the like. In some examples, the list of available blockchain options can be presented with associated information, such as transaction costs (e.g., costs associated with minting or transferring the NFT, the cost of the NFT, other transaction costs, etc.) or the like. In some examples, the associated transaction costs can be presented in fiat currency, cryptocurrency, a combination of the two, or another asset type. In some examples, the buyer can select a blockchain from the list of available blockchain options. In some examples, the payment service servers can determine a blockchain based at least in part on the selection.

In some examples, the payment service servers can utilize the context data to determine an available blockchain option without input from the buyer (e.g., automatically). That is, the payment service servers can determine one or more blockchains available for holding the NFT based at least in part on the context data. In some examples, such a determination can utilize machine learning processes. That is, the determined blockchain can be determined based at least in part on an output generated by one or more machine learning models operated by the payment service servers. In some examples, the analysis of context data using one or more machine learning models can enable selection of a blockchain using "contextual intelligence." In some examples, as described above, such contextual intelligence can optimize for cost, risk, security, user experience, or the like.

In some examples, the payment service servers can determine if the transaction is approved to proceed. As described in more detail below, the approval process may be done within the payment service itself when both buyer and seller have accounts within the payment service which can have associated accounts and ledgers that can be balanced immediately (e.g., in real-time or near-real-time). In alternative examples, one part of the transaction utilizes another service such as a credit card processing service. The authorization to proceed with the transaction may come from these third-party processing services (acting through one or more third-party payment service servers) or can be internally generated based on data received from these external servers. When the transaction is not approved, the process can end as the transaction cannot proceed further. Prompts indicating this may be generated and provided and/or displayed to the potential buyer and seller.

At 1245, the process 1200 can further determine if the blockchain selected or otherwise determined is the same as the current blockchain associated with the NFT. That is, the payment service servers can determine whether the blockchain selected or otherwise determined is the same blockchain as the blockchain that is currently holding the NFT (e.g., in a digital wallet associated therewith), or a different blockchain. As described above, the payment service servers can determine a blockchain for transferring the NFT. When the blockchain selected by the user is not the current blockchain associated with the NFT, the process 1200 can transfer the NFT to the determined blockchain (at 1250). In such an example, the payment service servers can mint the NFT on the determined blockchain and can designate the owner as the user. The newly minted NFT can be held in a digital wallet associated with the determined blockchain. When the determined blockchain is the same blockchain already associated with the NFT, the process 1200 can transfer ownership of the NFT to the user (at 1260). The transfer of ownership can often be accomplished by editing the NFT metadata stored within the associated blockchain to point to a different owner; the transaction can become part of the blockchain itself.

In some examples, the payment service servers can mint the NFT to the blockchain selected or otherwise determined and one or more other blockchains. In some examples, a determination of whether to mint an NFT on multiple blockchains can be based on an input from a user. In some examples, such a determination can be made by the payment service servers without input from the user. In some examples, a determination of whether to mint an NFT on multiple blockchains and which blockchains can be made based at least in part on context data, as described above. In some examples, such a determination can be made using machine learning processes.

As described above, a duplicate or "mirror" of the NFT can be minted on more than one blockchain such that each of the NFTs is associated with the same digital asset and a format particular to the blockchain on which each NFT is minted. In such an example, each of the blockchains on which the NFT is minted may be associated with a different fee. Nevertheless, the NFT can be minted on multiple blockchains regardless of the standards or formats associated with each. In some examples, as described above, the user can transfer ownership of the NFT to any of the multiple blockchains on which it is minted or can access the NFT from individual of the multiple blockchains on which it is minted in different contexts. For example, if the user is playing a particular game on a gaming platform where a particular blockchain is an optimal blockchain for the gaming platform, the user can access the NFT minted on the particular blockchain, if the NFT has been minted on the particular blockchain. If the user then transitions to a different gaming platform where a different blockchain is an optimal blockchain, the user can access the NFT minted on the different blockchain if the NFT has been minted on the different blockchain. In some examples, the NFT can be minted on a particular blockchain, for a particular context, in response to a request to access the NFT in the particular context. In some examples, NFTs minted on multiple blockchains can be associated with indicators of other "mirrored" NFTs on different blockchains. In some examples, NFTs can be synchronized across the different blockchains.

At 1270, the process 1200 may include processing payment associated with the transfer. In at least one example, the payment service servers can receive or withdraw funds or other assets from an account of the buyer and can deposit or transfer at least a portion of the funds to an account of the seller. In some examples, the payment service servers can perform one or more conversions (e.g., from fiat currency to cryptocurrency, cryptocurrency to fiat currency, etc.) to facilitate the payment. In at least one example, payment can be initiated (e.g., payment data collected) prior to the transfer being effectuated by the payment service servers. In at least one example, payment may be a condition to the payment service servers effectuating the transfer.

In some examples, the payment service servers can transmit confirmation of the completed transfer to the buyer. This confirmation may be data indicating that further operations can occur within the buyer's purchasing processes. The confirmation may also be formatted to indicate that the transfer of ownership was submitted to the blockchain but has not been verified yet. This may occur in instances where verification of the addition to the blockchain occurs at a speed too slow to facilitate normal or real-time transactions. For example, purchasing an NFT at a physical location within a POS environment would be negatively impacted if the transaction couldn't be concluded until blockchain verification could occur. In these instances, the process 1200 may determine when verification is not needed or is not likely to be reversed at a later time.

Figure 13:
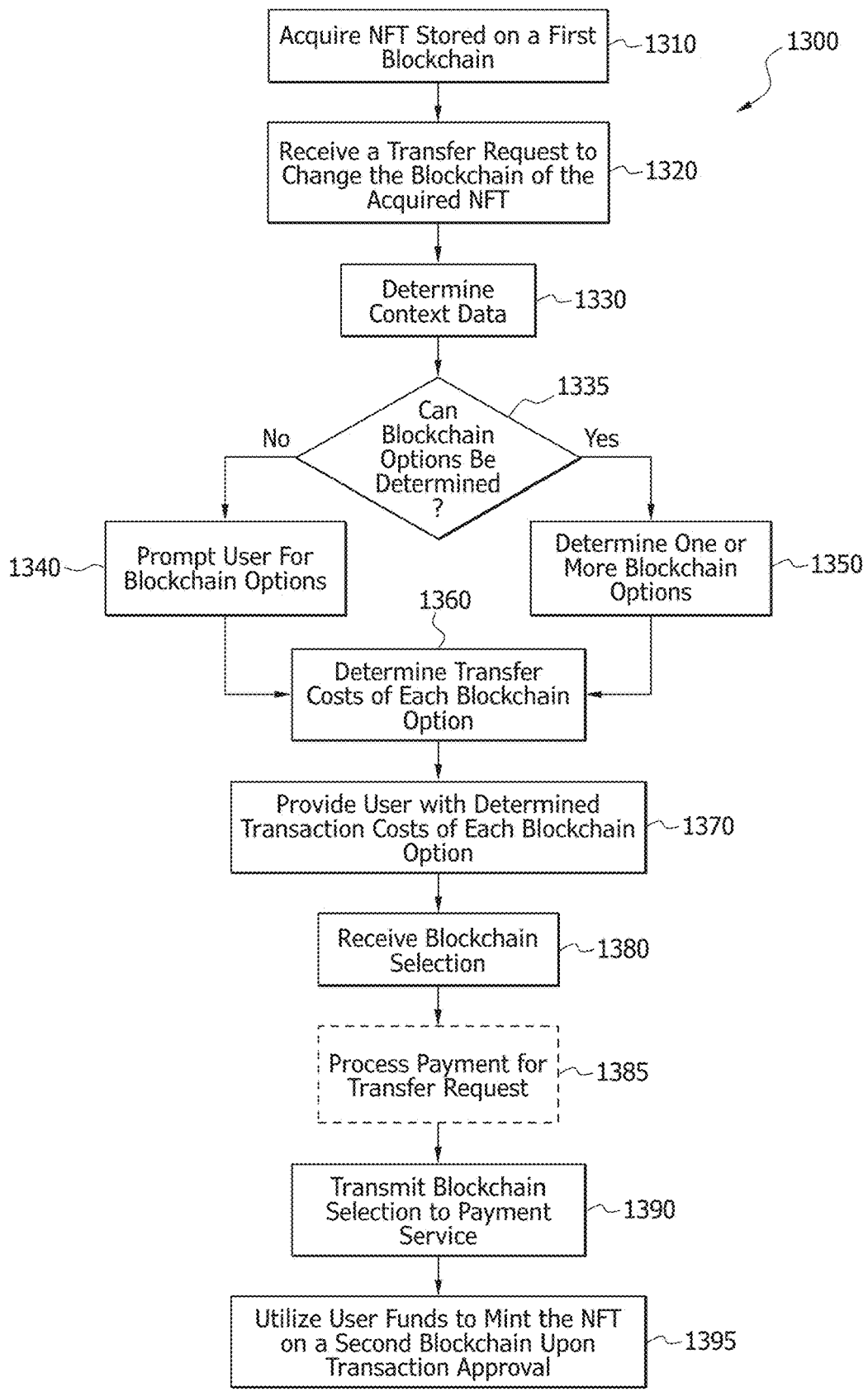
FIG. 13 is a flowchart illustrating an example process for a user changing the blockchain associated with an NFT within a blockchain agnostic network in accordance with various embodiments of the disclosure.

Referring to FIG. 13, a flowchart illustrating an example process for a user changing the blockchain associated with an NFT within a blockchain agnostic network in accordance with various embodiments of the disclosure is shown. In some examples, the buyer or owner of an NFT may desire to switch the associated blockchain of the NFT, even without a direct transaction preceding it. For example, a user may desire to have all of their NFTs on the same blockchain. In further examples, the user may believe that the costs for conducting transactions on the current blockchain are too high, or that the current blockchain is not being properly supported and/or may fall victim to malicious attacks. For virtually any reason, a user may elect to utilize the payment service, typically through a payment service application executing on one or more of the user's devices to transfer their NFT to a new blockchain. The process 1300 may include one or multiple features, components, and/or functionalities of implementations described herein with reference to FIGS. 1-12 and 14-19.

At 1310, the process 1300 may include acquiring an NFT stored on a first blockchain. The NFT may be owned by a user. This acquisition can be done through sales or transfers of assets, as described above. At 1320, the process 1300 may also include receiving a transfer request to change the blockchain of the acquired NFT. The transfer request can often be generated by a user selecting one or more options with a payment service application executing on the user's computing device or being accessed on one or more payment service servers accessed through a webpage or portal. In some examples, the payment service servers can recommend that a user change the blockchain on which the NFT is stored.

At 1330, the process 1300 may include determining context data. As previously described, context data may be generated in a variety of ways utilizing multiple sources of data. In some examples, the user may have a predetermined selection of which blockchain they want to transfer their NFT to. In some examples, the context data can be utilized to determine if any blockchains options can be determined. Consequently, at 1335, the process 1300 may include determining if any blockchain options can be determined. When one or more blockchains cannot be determined, the process 1300 can proceed to prompt the user for one or more blockchain options (at 1340). Once prompted, the user may input one or more blockchain options to attempt via name, address, or other input method. Once added by the user, the process 1300 can begin to determine the transfer costs of that entered blockchain (at 1360). However, when one or more blockchain options can be determined (at 1335), then the process 1300 can proceed with that blockchain option determination (at 1350). The determination can occur in response to the determined context data being parsed and processed.

At 1360, the process 1300 may include determining transfer costs associated with each of the blockchain options. The transfer costs can include the fee needed to facilitate either the minting of the NFT to the selected blockchain, and in certain examples, a processing fee issued by the payment service for facilitating the transfer. The cost of the NFT can be a fixed and known amount at the start of each transaction. The processing fee can be a fixed amount or percentage but may also be dynamically adjusted based on a variety of factors including the overall value of the NFT, or the blockchain being minted to, among others. The remaining facilitation fee is often both variable between each blockchain, but also variable over time as the associated cryptocurrency often needed for the minting changes in value compared to the other currencies usually utilized in the NFT transactions.

At 1370, the process 1300 may include providing the user with the determined transaction costs of each blockchain option. For instance, the payment service application executed on the computing device may surface a list of the determined blockchain options, and each option can have an associated transaction cost. The buyer can then evaluate the overall cost for each blockchain option and select the best one for their needs. In some examples, the transaction cost may be presented as a single cost that covers all applicable fees. At 1380, the process 1300 may include receiving a blockchain selection. This selection can be in the form of a selection received on a computing device touchscreen indicating a choice for the list of determined blockchains. However, it is contemplated that this selection can be done through any number of user input methods.

At 1385, the process 1300 may optionally process payment for the transfer request. As described above, various examples may occur wherein the user is prompted to add or otherwise provide funds to pay for the transfer of NFTs within the payment service. In these examples, the user may add funds to their currency portfolio. In some examples, to facilitate this, the payment service may utilize one or more external services to process the payment. The amount of the payment can be equal to the determined transfer costs provided to the user. In some embodiments, the process 1300 can verify that the user has available funds prior to commencing the transfer process. In some embodiments, the payment service can determine and/or offer the buyer a loan, advance, or other product or service to cover the cost of the payment.

At 1390, the process 1300 may include transmitting the blockchain selection to the payment service. Upon selection, verification of payment, and any other preparatory steps, the process 1300 can be initialized to facilitate an official transfer/minting of an NFT from one blockchain to another. In certain examples, the payment service may be utilized to finalize payment or transfer funds between the user account and its various collections, currencies, or ledgers of the user. At 1395, the process 1300 may include utilizing the provided user funds to mint the NFT on a second blockchain.

However, it is contemplated that other payment method types may occur. In at least one example, the payment service may cover the cost of minting, either as a promotion, or based on other funds received from a party of the transaction previously. In other examples the seller may cover the costs related to minting/transfer either as a sale, or including it in the cost of the NFT (as an implied discount). In still additional examples, the costs may be pooled from one party such as the payment service who has a pooled amount of cryptocurrency that can be utilized for such transactions and is purchased at predetermined times.

Figure 14:
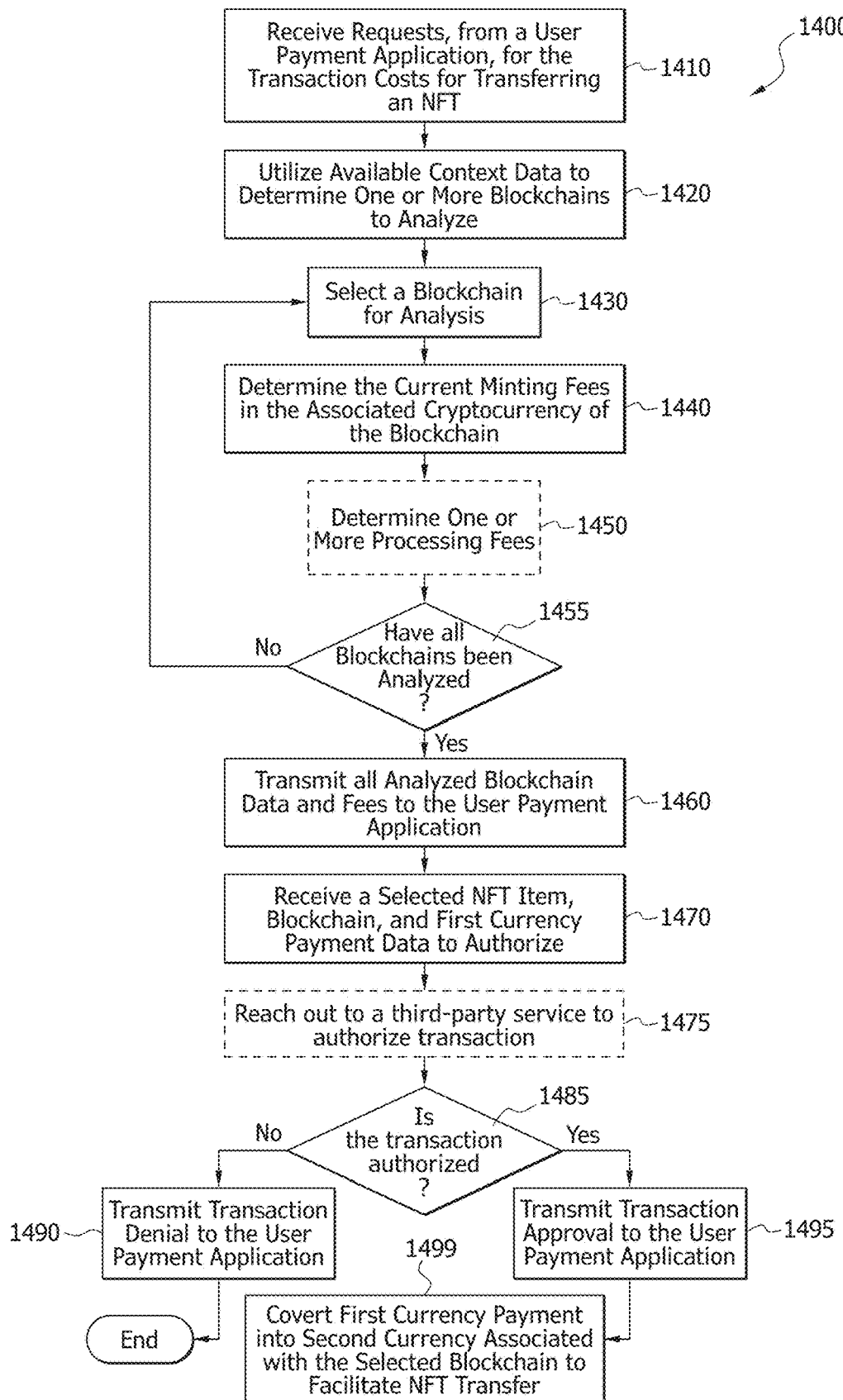
FIG. 14 is a flowchart illustrating an example process for providing a seamless transaction between currencies within a blockchain agnostic network in accordance with various embodiments of the disclosure.

Referring to FIG. 14, a flowchart illustrating an example process 1400 for providing a seamless transaction between currencies within a blockchain agnostic network in accordance with various embodiments of the disclosure is shown. In some examples, the process 1400 may include one or multiple features, components, and/or functionalities of implementations described herein with reference to FIGS. 1-13 and 15-19.

Often, a buyer of an NFT purchases the NFT in a first currency, such as fiat currency from within their payment service application. Likewise, a seller may list their NFT for sale and eventually receive payment in a second type of currency. Additionally, in existing blockchain transfer technologies, almost all blockchains only accept one or more associated cryptocurrencies for minting and/or other processing. The payment service may be capable of providing a seamless transaction experience for both the buyer and the seller by taking care of conversions between currencies and cryptocurrencies, and vice-versa. The example described herein in process 1400 comprises a payment service application on a user computing device communicating with a payment service over a network connection. However, this process 1400 can be utilized within other configurations.

At 1410, the process 1400 may include receiving requests, from a user payment application, for the transaction costs associated with transferring an NFT. The payment service servers can be in communication with a plurality of payment service applications across a network such as the Internet. During a transaction, one of these payment service applications may determine the transaction costs are for minting or transferring ownership to a blockchain.

At 1420, the process 1400 may include utilizing available context data to determine one or more blockchains to analyze. As discussed previously within the depicted example of FIG. 1, context data can be generated from many sources and utilized to request a response from a user by presenting one or more blockchain options. For instance, the selection of what blockchain the purchased NFT can be minted or transferred to can be indicated through the use of context data. Not every blockchain may be compatible with every NFT. Therefore, many examples attempt to determine suitable blockchains for the NFT associated with the purchase request.

For example, payment service servers configured to carry out one or more steps within the process 1400, may seek out various available data to generate context data including, but not limited to, determining the type of NFT being transacted, evaluating previously selected blockchains those NFT types were minted to, determining preferences and past transaction histories of the buyer and seller within the transaction, and/or similar transactions conducted by other parties within the buyer and/or seller's available social network contacts. The generated context data can be utilized to determine and analyze a list of available blockchains.

At 1430, the process 1400 may include selecting a blockchain for analysis. In some examples, each blockchain may be analyzed before delivering the results to the payment service application. At least one of the available blockchains determined from the determined context data can be selected for analysis. At 1440, the process 1400 may include determining the current minting fees in the associated cryptocurrency of blockchain under analysis. As previously discussed, each blockchain typically has an associated cryptocurrency that is accepted to facilitate transactions on the blockchain. The transfer rate between currencies such as non-cryptocurrencies, and other blockchain associated cryptocurrencies can change from moment to moment. Thus, a current verification can be performed by the process 1400 to generate what the exact minting costs may be for that blockchain.

At 1450, the process 1400 may optionally include determining one or more processing fees. In many examples, the payment service can add a processing fee to the transaction costs to cover any costs and profit margin related to processing the transactions. The processing fee may be configured to be a flat rate or percentage for each blockchain. However, in certain examples, the processing fee may be dynamically configured based on a variety of factors including, but not limited to, the overall value of the NFT, or the size/type of the NFT, etc. These processing fees can be added to the transaction costs under analysis or they may be processed and delivered to the user separately.

At 1455, the process 1400 may include determining if all, or more than a threshold number of, blockchains have been analyzed. When there are still more blockchains left to analyze, the process 1400 can continue by selecting another blockchain for analysis (at 1430). However, when all, or the threshold number of, blockchains that are known and selected have been analyzed, the process 1400 can transmit the analyzed blockchain data and fees to the payment service application (at 1460).

At 1470, the process 1400 may include receiving a selected NFT, blockchain selection, and currency payment data to authorize. These pieces of data can be determined, parsed, and otherwise processed to generate an authorization for the transaction to continue. In examples where the buyer and seller both share accounts within the payment service, the authorization for the transaction can occur internally within one or more payment service servers. At 1475, the process 1400 may optionally reach out to one or more third-party services to authorize the transaction. For example, a buyer submits payment information utilizing a credit card which may acquire data from one or more credit card payment servers within a credit card payment network.

At 1485, the process 1400 may include determining if the transaction is authorized. By utilizing the previously analyzed and received NFT, payment, and blockchain data, an authorization may be processed to determine if the transaction can proceed. If the transaction is denied, the process 1400 can transmit a transaction denial to the user payment application (at 1490) which may then prompt the user of the denial. However, if the transaction is approved, the process 1400 can transmit a transaction approval to the user payment application (at 1495). The payment application may then continue finalizing the transaction and/or prompt the user that the transaction was authorized.

At 1499, the process 1400 may include converting one or more currency payments into other currencies, such as the cryptocurrency associated with the selected blockchain for facilitating and finalizing the NFT ownership transfer. As discussed above, each blockchain typically requires a fee to be paid to facilitate the transfer of ownership or minting the NFT. The fee is often paid in the form of a cryptocurrency associated with the blockchain. Because a typical user may not have a currency portfolio containing various cryptocurrencies needed for each transaction, the payment service can seamlessly convert one or more first currencies from the user's portfolio to a second currency, such as the needed cryptocurrency for the NFT transaction. In this way, the payment service is uniquely equipped to provide a seamless purchase and transfer of NFTs without the need to involve a third party with the user as the payment service can utilize one or more exchanges or internally convert the fiat currency to cryptocurrency when the payment service holds a variety of cryptocurrency balances.

Figure 15:
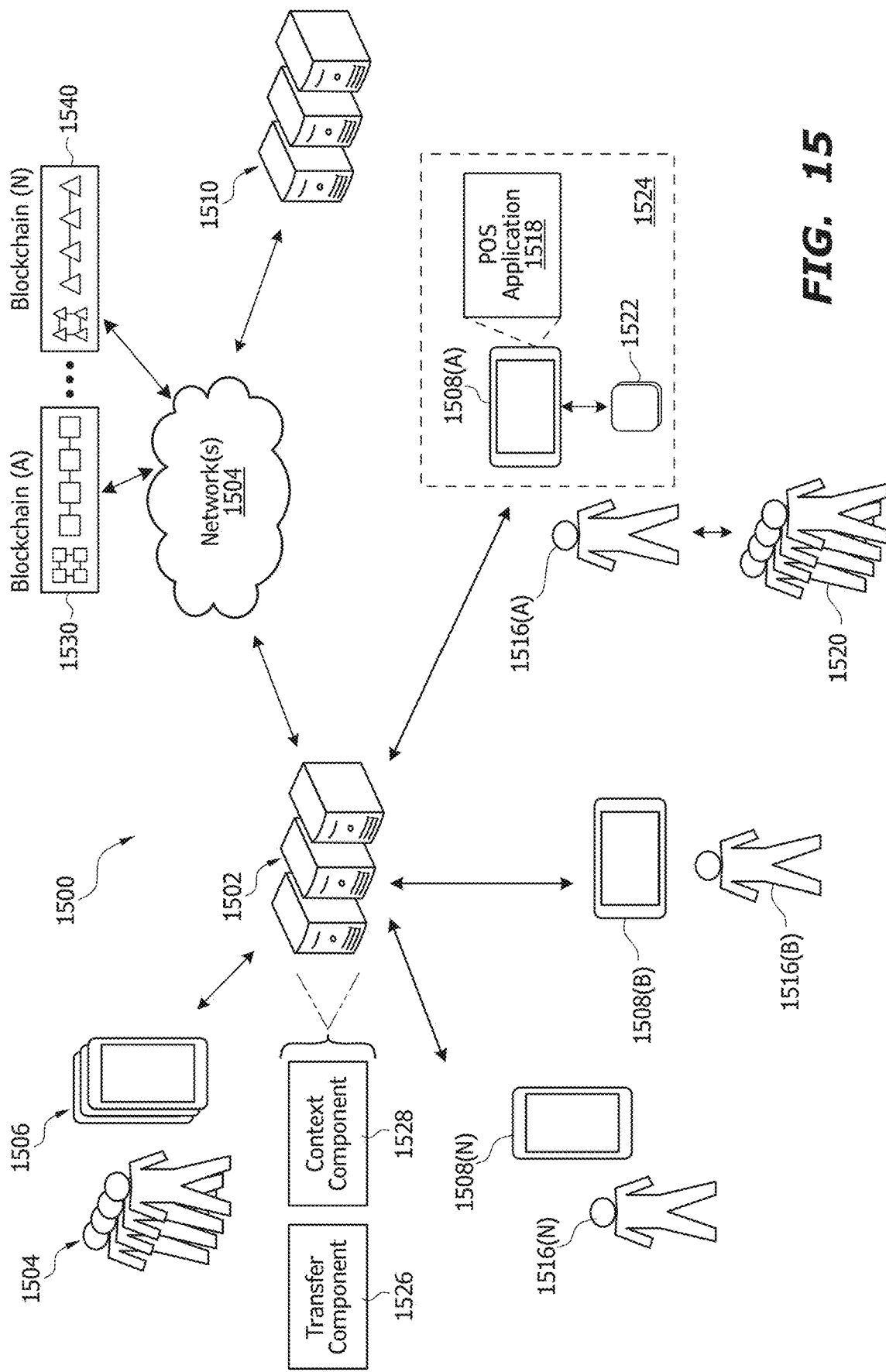
FIG. 15 is an illustration of a merchant environment within a blockchain agnostic network in accordance with various embodiments of the disclosure.

Referring to FIG. 15, an illustration of a merchant environment 1500 within a blockchain agnostic network in accordance with various embodiments of the disclosure. The environment 1500 includes server(s) 1502 that can communicate over a network 1504 with computing devices 1506 (which, in some examples can be computing devices 1508 (individually, 1508(A)-1508(N))) and/or server(s) 1510 associated with third-party service provider(s). The server(s) 1510 can be associated with a service provider that can provide one or more services for the benefit of users 1514, as described below. Actions attributed to the service provider can be performed by the server(s) 1502. In some examples, the server(s) 1502 can include one or more functional components, such as a transfer component 1526 and a context component 1528. In at least one example the server(s) 1502 may be the payment system servers 102 of FIG. 1A and the transfer component 1526 and context component 1528 can correspond to the transfer component 108 and the context component 110 of FIG. 1A. Likewise, the computing devices 1506 could be the computing devices 105, 106 of FIG. 1A.

As discussed previously, the users 1514 can conduct a series of transactions within the environment 1500. Users may, depending on the transaction, be a buyer, seller, or merchant. These transactions can be done through a series of computing devices 1506 which have access to one or more wallets, ledgers, balances, and/or the like that may comprise currency, stock, and cryptocurrency balances as well as a NFT digital asset collection. The users 1514 can utilize the payment service on their computing devices 1506 to conduct transactions utilizing the wallets, ledgers, balances, and/or the like. Likewise, merchants 1516 (individually, 1516(A)-1516(N)) may attempt to generate transactions with the users 1514 throughout the environment 1500. In many embodiments, the merchants may utilize their own wallets, ledgers, balances, and/or the like. The server(s) 1502 facilitating the payment service can execute and complete transactions that require different types of currency using the wallets, ledgers, balances, and/or the like. Likewise, these transactions may also be done in traditional point-of-sale systems 1524.

The server(s) 1502 can be in communication over a network 1504 with one or more blockchains. The depicted environment 1500 comprises a first blockchain 1530 blockchain (A) and a second blockchain 1540 blockchain (N). The blockchains 1530, 1540 can correspond to any of the blockchains 180, 182, 184, 186 in FIG. 1A. More blockchains may be accessible to the server(s) 1502 over the network 1504, but are not shown for simplicity. The blockchains 1530, 1540 can be utilized to mint NFTs from one or more merchants 1516(A)-1516(N) or transfer ownership of a previously owned NFT to another user 1514. This sale and/or transfer can occur over a POS system 1524, through a payment service application executed on a computing device 1508, or a computing device 1506.

The environment 1500 can include a plurality of computing devices 1506, as described above. Each one of the plurality of computing devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the computing devices can be operable by users 1514. The users 1514 can be referred to as customers, buyers, merchants, sellers, borrowers, employees, employers, payors, payees, couriers and so on. The users 914 can interact with the computing devices 1506 via user interfaces presented via the computing devices 1506. In at least one example, a user interface can be presented via a web browser, or the like. In other examples, a user interface can be presented via an application, such as a mobile application or desktop application, which can be provided by the service provider or which can be an otherwise dedicated application. In some examples, individual of the computing devices 1506 can have an instance or versioned instance of an application, which can be downloaded from an application store, for example, which can present the user interface(s) described herein. In at least one example, a user 1514 can interact with the user interface via touch input, spoken input, or any other type of input.

As described above, in at least one example, the users 1514 can include merchants 1516 (individually, 1516(A)-1516(N)). In an example, the merchants 1516 can operate respective computing devices 1508, which can be computing devices 1506 configured for use by merchants 1516. For the purpose of this discussion, a "merchant" can be any entity that offers items (e.g., goods or services) for purchase or other means of acquisition (e.g., rent, borrow, barter, etc.). The merchants 1516 can offer items for purchase or other means of acquisition via brick-and-mortar stores, mobile stores (e.g., pop-up shops, food trucks, etc.), online stores, combinations of the foregoing, and so forth. In some examples, at least some of the merchants 1516 can be associated with a same entity but can have different merchant locations and/or can have franchise/franchisee relationships. In additional or alternative examples, the merchants 1516 can be different merchants. That is, in at least one example, the merchant 1516(A) is a different merchant than the merchant 1516(B) and/or the merchant 1516(N).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each computing device 1508 can have an instance of a POS application 1518 stored thereon. The POS application 1518 can configure the computing device 1508 as a POS terminal, which enables the merchant 1516(A) to interact with one or more customers 1520. The POS application 1518 can correspond to the instance of the payment service application 104 executing on the user device 105 of FIG. 1A. As described above, the users 1514 can include customers, such as the customers 1520 shown as interacting with the merchant 1516(A). For the purpose of this discussion, a "customer" can be any entity that acquires items from merchants. While only four customers 1520 are illustrated in FIG. 15, any number of customers 1520 can interact with the merchants 1516. Further, while FIG. 15 illustrates the customers 1520 interacting with the merchant 1516(A), the customers 1520 can interact with any of the merchants 1516.

In at least one example, interactions between the customers 1520 and the merchants 1516 that involve the exchange of funds (from the customers 1520) for items (from the merchants 1516) can be referred to as "transactions." In at least one example, the POS application 1518 can determine transaction data associated with the POS transactions. Transaction data can include payment information, which can be obtained from a reader device 1522 associated with the computing device 1508(A), user authentication data, purchase amount information, point-of-purchase information (e.g., item(s) purchased, date of purchase, time of purchase, etc.), etc. The POS application 1518 can send transaction data to the server(s) 1502 such that the server(s) 1502 can track transactions of the customers 1520, merchants 1516, and/or any of the users 1514 over time. Furthermore, the POS application 1518 can present a UI to enable the merchant 1516(A) to interact with the POS application 1518 and/or the service provider via the POS application 1518.

In at least one example, the computing device 1508(A) can be a special-purpose computing device configured as a POS terminal (via the execution of the POS application 1518). In at least one example, the POS terminal may be connected to a reader device 1522, which is capable of accepting a variety of payment instruments, such as credit cards, debit cards, gift cards, short-range communication-based payment instruments, and the like, as described below. In at least one example, the reader device 1522 can plug in to a port in the computing device 1508(A), such as a microphone port, a headphone port, an audio-jack, a data port, or other suitable port. In additional or alternative examples, the reader device 1522 can be coupled to the computing device 1508(A) via another wired or wireless connection, such as via a Bluetooth®, BLE, and so on. Additional details are described below with reference to FIG. 17. In some examples, the reader device 1522 can read information from alternative payment instruments including, but not limited to, wristbands and the like.

In some examples, the reader device 1522 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1522, and communicate with the server(s) 1502, which can provide, among other services, a payment processing service. The server(s) 1502 associated with the service provider can communicate with server(s) 1510, as described below. In this manner, the POS terminal and reader device 1522 may collectively process transaction(s) between the merchants 1516 and customers 1520. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1522 of the POS system 1524 are shown as separate devices, in additional or alternative examples, the POS terminal and the reader device 1522 can be part of a single device. In some examples, the reader device 1522 can have a display integrated therein for presenting information to the customers 1520. In additional or alternative examples, the POS terminal can have a display integrated therein for presenting information to the customers 1520. POS systems, such as the POS system 1524, may be mobile, such that POS terminals and reader devices may process transactions in disparate locations across the world. POS systems can be used for processing card-present transactions and card-not-present (CNP) transactions, as described below.

A card-present transaction is a transaction where both a customer 1520 and his or her payment instrument are physically present at the time of the transaction. Card-present transactions may be processed by swipes, dips, taps, or any other interaction between a physical payment instrument (e.g., a card), or otherwise present payment instrument, and a reader device 1522 whereby the reader device 1522 is able to obtain payment data from the payment instrument. A swipe is a card-present transaction where a customer 1520 slides a card, or other payment instrument, having a magnetic strip through a reader device 1522 that captures payment data contained in the magnetic strip. A dip is a card-present transaction where a customer 1520 inserts a payment instrument having an embedded microchip (i.e., chip) into a reader device 1522 first. The dipped payment instrument remains in the payment reader until the reader device 1522 prompts the customer 1520 to remove the card, or other payment instrument. While the payment instrument is in the reader device 1522, the microchip can generate a one-time code which is sent from the POS system 1524 to the server(s) 1510 (which can be associated with third-party service providers that provide payment services, including but not limited to, an acquirer bank, an issuer, and/or a card payment network (e.g., MasterCard®, VISA®, etc.)) to be matched with an identical one-time code. A tap is a card-present transaction where a customer 1520 may tap or hover his or her payment instrument (e.g., card, electronic device such as a smart phone running a payment application, etc.) over a reader device 1522 to complete a transaction via short-range communication (e.g., NFC, RFID, Bluetooth®, BLE, etc.). Short-range communication enables the payment instrument to exchange information with the reader device 1522. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1524, the server(s) 1502, and/or the server(s) 1510 may exchange payment information and transaction data to determine whether transactions are authorized. For example, the POS system 1524 may provide encrypted payment data, user authentication data, purchase amount information, point-of-purchase information, etc. (collectively, transaction data) to server(s) 1502 over the network(s) 1504. The server(s) 1502 may send the transaction data to the server(s) 1510. As described above, in at least one example, the server(s) 1510 can be associated with third-party service providers that provide payment services, including but not limited to, an acquirer bank, an issuer, and/or a card payment network (e.g., MasterCard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1510 associated therewith) can send a fund transfer request to a server computing device of a card payment network (e.g., MasterCard®, VISA®, etc.) to determine whether the transaction is authorized or deficient. In at least one example, the service provider can serve as an acquirer and connect directly with the card payment network.

The card payment network (e.g., the server(s) 1510 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1510 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1510 associated therewith), and a payment authorization message is communicated from the issuer to the POS device via a path opposite of that described above, or via an alternate path.

As described above, the server(s) 1510, which can be associated with payment service provider(s), may determine whether the transaction is authorized based on the transaction data, as well as information relating to parties to the transaction (e.g., the customer 1520 and/or the merchant 1516(A)). The server(s) 1510 may send an authorization notification over the network(s) 1504 to the server(s) 1502, which may send the authorization notification to the POS system 1524 over the network(s) 1504 to indicate whether the transaction is authorized. The server(s) 1502 may also transmit additional information such as transaction identifiers to the POS system 1524. In one example, the server(s) 1502 may include a merchant application and/or other functional components for communicating with the POS system 1524 and/or the server(s) 1510 to authorize or decline transactions.

Based on the authentication notification that is received by the POS system 1524 from server(s) 1502, the merchant 1516(A) may indicate to the customer 1520 whether the transaction has been approved. In some examples, approval may be indicated at the POS system 1524, for example, at a display of the POS system 1524. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1514 can access all of the services of the service provider. In other examples, the users 1514 can have gradated access to the services, which can be based on risk tolerance, IDV outputs, subscriptions, and so on. In at least one example, access to such services can be availed to the merchants 1516 via the POS application 1518. In additional or alternative examples, each service can be associated with its own access point (e.g., application, web browser, etc.).

The service provider can offer payment processing services for processing payments on behalf of the merchants 1516, as described above. For example, the service provider can provision payment processing software, payment processing hardware and/or payment processing services to merchants 1516, as described above, to enable the merchants 1516 to receive payments from the customers 1520 when conducting POS transactions with the customers 1520. For instance, the service provider can enable the merchants 1516 to receive cash payments, payment card payments, and/or electronic payments from customers 1520 for POS transactions and the service provider can process transactions on behalf of the merchants 1516.

As the service provider processes transactions on behalf of the merchants 1516, the service provider can maintain accounts or balances for the merchants 1516 in one or more ledgers. For example, the service provider can analyze transaction data received for a transaction to determine an amount of funds owed to a merchant 1516(A) for the transaction. In at least one example, such an amount can be a total purchase cost less fees charged by the service provider for providing the payment processing services. Based on determining the amount of funds owed to the merchant 1516(A), the service provider can deposit funds into an account of the merchant 1516(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1516(A) to a bank account of the merchant 1516(A) that is held at a bank or other financial institution (e.g., associated with the server(s) 1510). Scheduled deposits can occur at a prearranged time after a POS transaction is funded, which can be a business day after the POS transaction occurred, or sooner or later. In some examples, the merchant 1516(A) can access funds prior to a scheduled deposit. For instance, the merchant 1516(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1516(A) can have a payment instrument that is linked to the stored balance that enables the merchant to access the funds without first transferring the funds from the account managed by the service provider to the bank account of the merchant 1516(A).

In at least one example, the service provider may provide inventory management services. That is, the service provider may provide inventory tracking and reporting. Inventory management services may enable the merchant 1516(A) to access and manage a database storing data associated with a quantity of each item that the merchant 1516(A) has available (i.e., an inventory). Furthermore, in at least one example, the service provider can provide catalog management services to enable the merchant 1516(A) to maintain a catalog, which can be a database storing data associated with items that the merchant 1516(A) has available for acquisition (i.e., catalog management services). In at least one example, the catalog may include a plurality of data items and a data item of the plurality of data items may represent an item that the merchant 1516(A) has available for acquisition. The service provider can offer recommendations related to pricing of the items, placement of items on the catalog, and multi-party fulfillment of the inventory.

In at least one example, the service provider can provide business banking services, which allow the merchant 1516(A) to track deposits (from payment processing and/or other sources of funds) into an account of the merchant 1516(A), payroll payments from the account (e.g., payments to employees of the merchant 1516(A)), payments to other merchants (e.g., business-to-business) directly from the account or from a linked debit card, withdrawals made via scheduled deposit and/or instant deposit, etc. Furthermore, the business banking services can enable the merchant 1516(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1516 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally, and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally, or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1516. The service provider can generate the loan based at least in part on determining that the borrower purchased or intends to purchase the item from the merchant. The loan can be associated with a balance based on an actual purchase cost of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the service provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1514 who are unfamiliar with HTML, XML, JavaScript, CSS, or other web design tools to generate and maintain professional and aesthetically pleasing websites. Some of these web page editing applications allow users to build a web page and/or modify a web page (e.g., change, add, or remove content associated with a web page). Further, in addition to websites, the web-development services can generate and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1516. In at least one example, the service provider can recommend and/or generate content items to supplement omni-channel presences of the merchants 1516. That is, if a merchant of the merchants 1516 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1514 to set schedules for scheduling appointments and/or users 1514 to schedule appointments.

In some examples, the service provider can provide restaurant management services to enable users 1514 to make and/or manage reservations, to monitor front-of-house and/or back-of-house operations, and so on. In such examples, the computing device(s) 1508 and/or server(s) 1502 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1514 who can travel between locations to perform services for a requesting user 1514 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1506.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the network of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1514, voice inputs into a virtual assistant or the like, to determine intents of user(s) 1514. In some examples, the service provider can utilize determined intent to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to determine information and make purchases.

In at least one example, a user 1514 may be new to the service provider such that the user 1514 that has not registered (e.g., subscribed to receive access to one or more services offered by the service provider) with the service provider. The service provider can offer onboarding services for registering a potential user 1514 with the service provider. In some examples, onboarding can involve presenting various questions, prompts, and the like to a potential user 1514 to obtain information that can be used to generate a profile for the potential user 1514. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1514 providing all necessary information, the potential user 1514 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1510). That is, the service provider can offer IDV services to verify the identity of users 1514 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1514 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1510 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1502) and/or the server(s) 1510 via the network(s) 1504. In some examples, the computing device(s) 1508 are not capable of connecting with the service provider (e.g., the server(s) 1502) and/or the server(s) 1510, due to a network connectivity issue, for example. In additional or alternative examples, the server(s) 1502 are not capable of communicating with the server(s) 1510 due to network connectivity issue, for example. In such examples, devices may operate in "offline" mode where at least some payment data is stored (e.g., on the computing device(s) 1508) and/or the server(s) 1502 until connectivity is restored and the payment data can be transmitted to the server(s) 1502 and/or the server(s) 1510 for processing.

In at least one example, the service provider can be associated with a hub, such as an order hub, an inventory hub, a fulfillment hub and so on, which can enable integration with one or more additional service providers (e.g., associated with the additional server(s) 1510). In some examples, such additional service providers can offer additional or alternative services and the service provider can provide an interface or other computer-readable instructions to integrate functionality of the service provider into the one or more additional service providers.

Techniques described herein are directed to services provided via a distributed system of computing devices 1506 that are in communication with one or more server(s) 1502 of the service provider. That is, techniques described herein are directed to a specific implementation—or, a practical application—of utilizing a distributed system of computing devices 1506 that are in communication with one or more server(s) 1502 of the service provider to perform a variety of services, as described above. The unconventional configuration of the distributed system described herein enables the server(s) 1502 that are remotely-located from end-users (e.g., users 1514) to intelligently offer services based on aggregated data associated with the end-users, such as the users 1514 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1514 and computing devices 1506. Furthermore, such features are changed dynamically based on the profiles of the users involved interacting with the GUIs. As such, techniques described herein are directed to improvements to computing systems.

Figure 16:
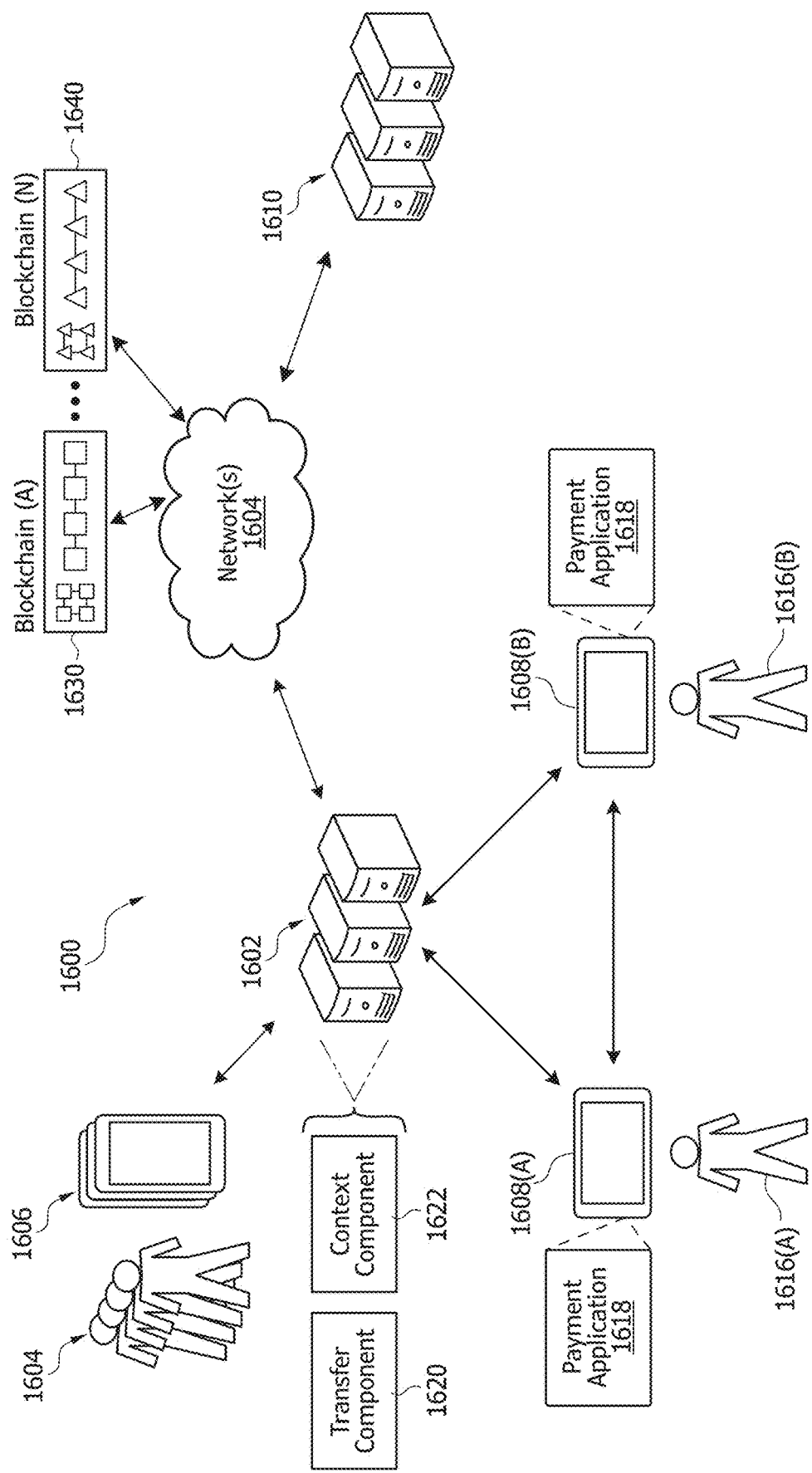
FIG. 16 is an illustration of a peer-to-peer environment within a blockchain agnostic network in accordance with various embodiments of the disclosure.

Referring to FIG. 16, an illustration of a peer-to-peer environment within a blockchain agnostic network in accordance with various embodiments of the disclosure. The environment 1600 includes server(s) 1602 that can communicate over a network 1604 with computing devices 1606 (which, in some examples can be computing devices 1608 (individually, 1608(A), 1608(B)) and/or server(s) 1610 associated with third-party service provider(s). The server(s) 1602 can be associated with a service provider that can provide one or more services for the benefit of users 1614, as described below. Actions attributed to the service provider can be performed by the server(s) 1602. In at least one example, the server(s) 1602 can comprise one or more functional components, such as a transfer component 1620 and a context component 1622. In at least one example the server(s) 1602 may be the payment system servers 102 of FIG. 1A and the transfer component 1620 and context component 1622 can correspond to the transfer component 108 and the context component 110 of FIG. 1A. In some examples, the service provider referenced in FIG. 15 can be the same or different than the service provider referenced in FIG. 16. In at least one example, the computing devices 1606, 1608(A), 1608(B) can correspond to the computing devices 105, 106 of FIG. 1A.

The server(s) 1602 can be in communication over a network 1604 with one or more blockchains. The depicted environment 1600 comprises a first blockchain 1630 blockchain (A) and a second blockchain 1640 blockchain (N). More blockchains may be accessible to the server(s) 1602 over the network 1604 but are not shown for simplicity. The blockchains 1630, 1640 can be utilized to mint or transfer NFTs from one or more computing devices 1606 to another user 1614 with their own computing device. This sale and/or transfer can occur over a P2P system utilizing one or more payment applications 1618 executed on a computing device 1608. In some examples, the blockchains 1630, 1640 can correspond to any of the blockchains 180, 182, 184, 186 as described above with reference to FIG. 1A.

The environment 1600 can include a plurality of computing devices 1606, as described above. Each one of the plurality of computing devices 1606 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the computing devices can be operable by users 1614.

The users 1614 can be referred to as customers, buyers, merchants, sellers, borrowers, employees, employers, payors, payees, couriers and so on. The users 1614 can interact with the computing devices 1606 via user interfaces presented via the computing devices 1606. The computing devices 1606 may be utilized to execute a payment service application. The payment service application can be configured to provide the user access to one or more virtual portfolios. As described below, the virtual portfolios can allow for conducting transactions such as with other users/peers.

In at least one example of the payment service application, a user interface can be presented via a web browser, or the like. In other examples, a user interface can be presented via an application, such as a mobile application or desktop application, which can be provided by the service provider, or which can be an otherwise dedicated application. In some examples, individual of the computing devices 1606 can have an instance or versioned instance of an application, which can be downloaded from an application store, for example, which can present the user interface(s) described herein. In at least one example, a user 1614 can interact with the user interface via touch input, spoken input, or any other type of input.

In at least one example, the service provider can provide a peer-to-peer payment service that enables peer-to-peer payments between two or more users 1614. Two users, user 1616(A) and user 1616(B) are illustrated in FIG. 16 as "peers" in a peer-to-peer payment. In at least one example, the service provider can communicate with instances of a payment application 1618 (or other access point) installed on computing devices 1606 configured for operation by users 1614. In at least one example, the payment application 1618 can correspond to an instance of the payment service application 104 on the computing device 106, as described above with reference to FIG. 1A. In an example, an instance of the payment application 1618 executing on a first computing device 1608(A) operated by a payor (e.g., user 1616(A)) can send a request to the service provider to transfer an asset (e.g., fiat currency, non-fiat currency, cryptocurrency, securities, gift cards, and/or related assets) from the payor to a payee (e.g., user 1616(B)) via a peer-to-peer payment. In some examples, assets associated with an account of the payor are transferred to an account of the payee. In some examples, assets can be held at least temporarily in an account of the service provider prior to transferring the assets to the account of the payee.

In a number of embodiments, the payor user 1616(A) and the payee user 1616(B) each have a virtual portfolio. Payment between these peers may occur, even if each user utilizes a different fiat currency, or even different asset types. For example, the payor user 1616(A) may have a virtual portfolio that includes a wallet in dollars, while the payee user 1616(B) has a virtual portfolio that includes a wallet in pesos. The payor user 1616(A) may also have an additional stablecoin balance in their portfolio. The payee user 1616(B) may send a payment request in pesos. Then, the requested amount appears in dollars on the payor users 1616(A) interface. The payor user 1616(A) approves this payment and the payment service can determine which is the best method for payment. In certain situations, the dollar balance may have the best conversion rate, while the stablecoin balance may have a better conversion rate currently. Therefore, the payment service deducts, converts, and credits the necessary currencies without further input from either of the users 1616(A), 1616(B).

Figure 17:
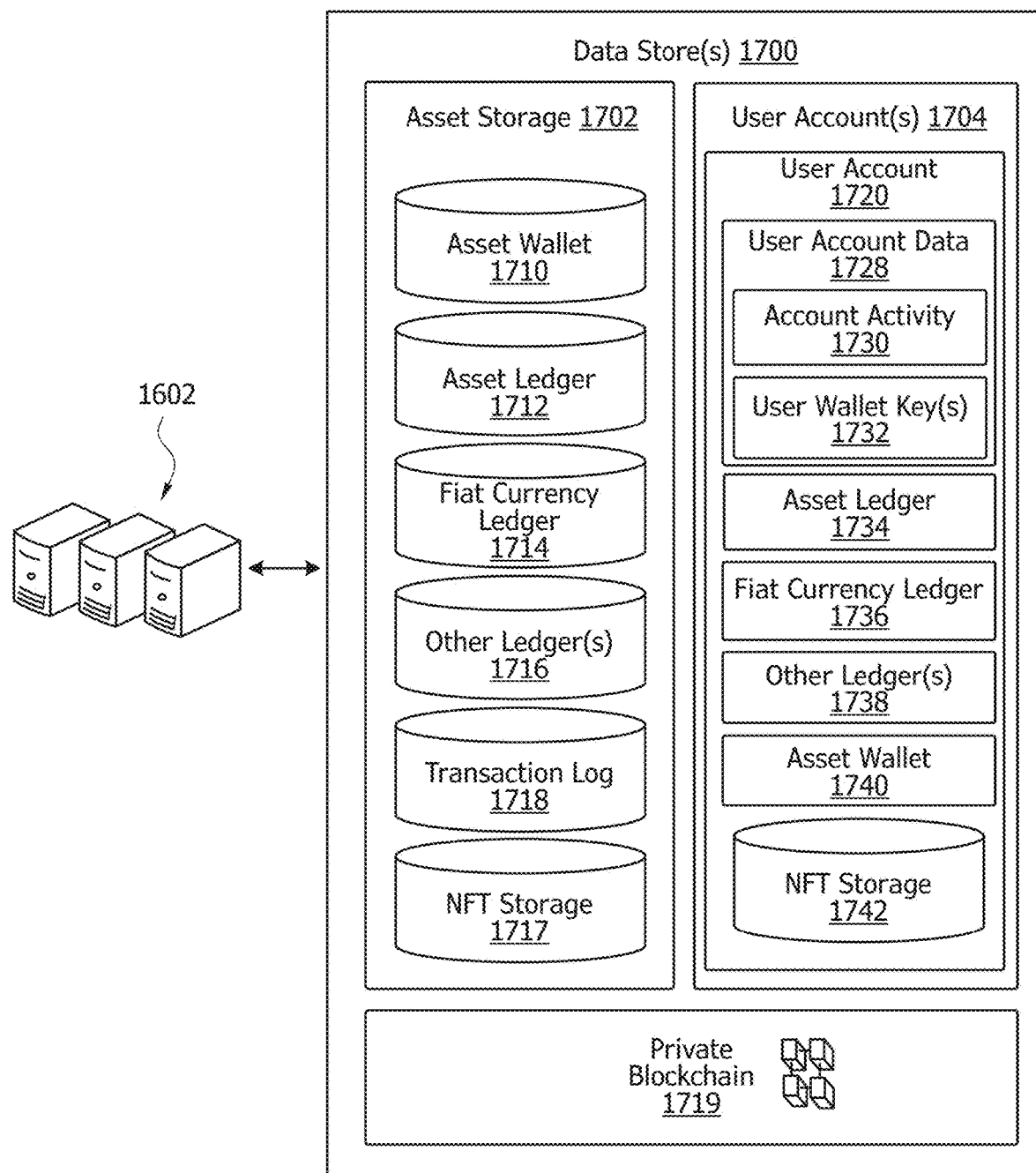
FIG. 17 is a block diagram of a data store that can be associated with one or more payment service servers in accordance with various embodiments of the disclosure.

In some examples, the service provider can utilize a ledger system to track transfers of assets between users 1616(A) and 1616(B). FIG. 17, below, provides additional details associated with such a ledger system. The ledger system can enable users 1616(A) and 1616(B) to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1618 executing on computing device(s) of payee(s). As an example, the service provider can transfer assets from an account of user 1616(A) to an account of the user 1616(B) and can send a notification to the computing device 1606(B) of the user 1616(B) for presentation via a user interface. The notification can indicate that a transfer is in process, a transfer is complete, or the like. In some examples, the service provider can send additional or alternative information to the instances of the payment application 1618 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1602 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1618 executing on the computing devices 1606. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 16 or a third-party service provider associated with the server(s) 1610. In examples where the content provider is a third-party service provider, the server(s) 1610 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 16. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication.

The messaging application can be executed on a computing device 1606 (e.g., mobile device or conventional personal computer (PC)) based on instructions transmitted to and from the server(s) 1602 (which, in such an example can be called a "messaging server"). In some instances, the messaging application can include a payment application with messaging capability that enables users of the payment application to communicate with one another. In such instances, the payment application can be executed on a computing device 1606 based on instructions transmitted to and from the server(s) 1602 (e.g., the payment service discussed in this description or another payment service that supports payment transactions). In some examples, the messaging application can be provided by a third-party service provider associated with the server(s) 1610. In examples where the messaging application is a third-party service provider, the server(s) 1610 can be accessible via one or more APIs or other integrations.

As described above, the service provider can facilitate peer-to-peer transactions, which can enable users 1616(A) and 1616(B) to transfer fiat currency, non-fiat currency, cryptocurrency, securities, or other assets, or portions thereof, to other users 1616(A) and 1616(B). In at least one example, individual users can be associated with user accounts. Additional details associated with user accounts and the transfer of assets between users 1616(A) and 1616 (B) are described below with reference to FIG. 17.

Furthermore, the service provider of FIG. 16 can enable users 1616(A) and 1616(B) to perform banking transactions via instances of the payment application 1618. For example, users can configure direct deposits or other deposits for adding assets to their various ledgers/balances. Further, users 1616(A) and 1616(B) can configure bill pay, recurring payments, and/or the like using assets associated with their accounts. In addition to sending and/or receiving assets via peer-to-peer transactions, users 1616(A) and 1616(B) buy and/or sell assets via asset networks such as cryptocurrency networks, securities networks, and/or the like.

Referring to FIG. 17, a block diagram of a data store that can be associated with one or more payment service servers in accordance with various embodiments of the disclosure is shown. In at least one example, the data store(s) 1700 can store assets in an asset storage 1702, as well as data in user account(s) 1704, merchant account(s), and/or customer account(s). In at least one example, the asset storage 1702 can be used to store assets managed by the service provider of FIG. 16. In at least one example, the asset storage 1702 can be used to record whether individual of the assets are registered to users. For example, the asset storage 1702 can include an asset wallet 1710 for storing records of assets owned by the service provider of FIG. 16, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1510 can be associated therewith. In some examples, the asset wallet 1710 can communication with the asset network via one or more components associated with the server(s) 1602.

The asset wallet 1710 can be associated with one or more addresses and can vary addresses used to acquire assets (e.g., from the asset network(s)) so that its holdings are represented under a variety of addresses on the asset network. In examples where the service provider of FIG. 16 has its own holdings of cryptocurrency (e.g., in the asset wallet 1710), a user can acquire cryptocurrency directly from the service provider of FIG. 16. In some examples, the service provider of FIG. 16 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1702 may contain ledgers that store records of assignments of assets to users 1506. Specifically, the asset storage 1702 may include asset ledger 1712, fiat currency ledger 1714, and other ledger(s) 1716, which can be used to record transfers of assets between users 1506 of the service provider and/or one or more third parties (e.g., merchant network(s), payment card network(s), ACH network(s), equities network(s), the asset network, securities networks, etc.). In doing so, the asset storage 1702 can maintain a running balance of assets managed by the service provider of FIG. 16. The ledger(s) of the asset storage 1702 can further indicate some of the running balance for each of the ledger(s) stored in the asset storage 1702 is assigned or registered to one or more user account(s) 1704. In additional examples, the asset storage 1702 may include an NFT storage 1717 which can be configured to store data related to various NFTs that have been added to one or more inventories available on various marketplaces.

In at least one example, the asset storage 1702 can include transaction logs 1718, which can include records of past transactions involving the service provider of FIG. 16. In at least one example, transaction data, as described herein, can be stored in association with the transaction logs 1718.

In some examples, the data store(s) 1700 can store a private blockchain 1719. A private blockchain 1719 can function to record sender addresses, recipient addresses, public keys, values of cryptocurrency transferred, and/or can be used to verify ownership of cryptocurrency tokens to be transferred. In some examples, the service provider of FIG. 16 can record transactions taking place within the service provider of FIG. 16 involving cryptocurrency until the number of transactions has exceeded a determined limit (e.g., number of transactions, storage space allocation, etc.). Based at least in part on determining that the limit has been reached, the service provider of FIG. 16 can publish the transactions in the private blockchain 1719 to a public blockchain (e.g., associated with the asset network), where miners can verify the transactions and record the transactions to blocks on the public blockchain. In at least one example, the service provider of FIG. 16 can participate as miner(s) at least for its transactions to be posted to the public blockchain.

In at least one example, the data store(s) 1700 can store and/or manage accounts, such as user account(s) 1704, merchant account(s), and/or customer account(s). In at least one example, the user account(s) 1704 may store records of user accounts associated with the users 1506. In at least one example, the user account(s) 1704 can include a user account 1720, which can be associated with a user (of the users 1506). Other user accounts of the user account(s) 1704 can be similarly structured to the user account 1720, according to some examples. In other examples, other user accounts may include more or less data and/or account information than that provided by the user account 1720. In at least one example, the user account 1720 can include user account data 1728, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1728 can include account activity 1730 and user wallet key(s) 1732. The account activity 1730 may include a transaction log for recording transactions associated with the user account 1720. In some examples, the user wallet key(s) 1732 can include a public-private key-pair and a respective address associated with the asset network or other asset networks. In some examples, the user wallet key(s) 1732 may include one or more key pairs, which can be unique to the asset network or other asset networks.

In addition to the user account data 1728, the user account 1720 can include ledger(s) for account(s) managed by the service provider of FIG. 16, for the user. For example, the user account 1720 may include an asset ledger 1734, a fiat currency ledger 1736, and/or one or more other ledgers 1738. The ledger(s) can indicate that a corresponding user utilizes the service provider of FIG. 16 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 16.

In some examples, the asset ledger 1734 can store a balance for each of one or more cryptocurrencies (e.g., Bitcoin, Ethereum, Litecoin, etc.) registered to the user account 1720. In at least one example, the asset ledger 1734 can further record transactions of cryptocurrency assets associated with the user account 1720. For example, the user account 1720 can receive cryptocurrency from the asset network using the user wallet key(s) 1732. In some examples, the user wallet key(s) 1732 may be generated for the user upon request. User wallet key(s) 1732 can be requested by the user in order to send, exchange, or otherwise control the balance of cryptocurrency held by the service provider of FIG. 16 (e.g., in the asset wallet 1710) and registered to the user. In some examples, the user wallet key(s) 1732 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 16 and the value is credited as a balance in asset ledger 1734), by purchasing currency in the form associated with the account using currency in a different form (e.g., buying a value of cryptocurrency from the service provider of FIG. 16 using a value of fiat currency reflected in fiat currency ledger 206, and crediting the value of cryptocurrency in asset ledger 1734), or by conducting a transaction with another user (customer or merchant) of the service provider of FIG. 16 wherein the account receives incoming currency (which can be in the form associated with the account or a different form, in which the incoming currency may be converted to the form associated with the account). In some examples, the user account data 1728 can include preferences for maintaining balances of individual of the ledgers. For example, the service provider of FIG. 16 can automatically debit the fiat currency ledger 1736 to increase the asset ledger 1734, or another account associated with the user whenever the cryptocurrency balance (e.g., of the asset ledger 1734) falls below a stated level (e.g., a threshold). Conversely, in some embodiments, the service provider of FIG. 16 can automatically credit the fiat currency ledger 1736 to decrease the asset ledger 1734 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 1610)

unrelated to the service provider of FIG. 16 (i.e., an external account). In at least one example, the user can transfer all or a portion of a balance of the cryptocurrency stored in the third-party cryptocurrency wallet to the service provider of FIG. 16. Such a transaction can require the user to transfer an amount of the cryptocurrency in a message signed by user's private key to an address provided by the service provider of FIG. 16. In at least one example, the transaction can be sent to miners to bundle the transaction into a block of transactions and to verify the authenticity of the transactions in the block. Once a miner has verified the block, the block is written to a public, distributed blockchain where the service provider of FIG. 16 can then verify that the transaction has been confirmed and can credit the user's asset ledger 1734 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 16. As described above, in some examples, the service provider of FIG. 16 can acquire cryptocurrency from a third-party source (e.g., associated with the third-party server(s) 118). In such examples, the asset wallet 1710 can be associated with different addresses and can vary addresses used to acquire cryptocurrency so that its holdings are represented under a variety of addresses on a blockchain. When the service provider of FIG. 16 has their own holdings of cryptocurrency, users can acquire cryptocurrency directly from the service provider of FIG. 16. In some examples, the service provider of FIG. 16 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 16 has its own cryptocurrency assets, cryptocurrency transferred in a transaction (e.g., data with address provided for receipt of transaction and a balance of cryptocurrency transferred in the transaction) can be stored in the asset wallet 1710. In at least one example, the service provider of FIG. 16 can credit the asset ledger 1734 of the user. Additionally, while the service provider of FIG. 16 recognizes that the user retains the value of the transferred cryptocurrency through crediting the asset ledger 1734, any person that inspects the blockchain can see the cryptocurrency as having been transferred to the service provider of FIG. 16. In some examples, the asset wallet 1710 can be associated with many different addresses. In such examples, any person that inspects the blockchain may not easily associate all cryptocurrency stored in asset wallet 1710 as belonging to the same entity. It is this presence of a private ledger that is used for real-time transactions and maintained by the service provider of FIG. 16, combined with updates to the public ledger at other times, that allows for extremely fast transactions using cryptocurrency to be achieved. In some examples, the "private ledger" can refer to the asset ledger 1712, which in some examples, can utilize the private blockchain 1719, as described herein. The "public ledger" can correspond to a public blockchain associated with the asset network.

In at least one example, a user's asset ledger 1734, fiat currency ledger 1736, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1734. In some examples, a user can receive fiat currency or another currency in the form of payment for a transaction with another user. In at least one example, at least a portion of such funds can be converted into cryptocurrency by the service provider of FIG. 16 and used to fund the asset ledger 1734 of the user.

As addressed above, in some examples, users can also have other accounts maintained by the service provider of FIG. 16. For example, a user can also have an account in U.S. dollars, which can be tracked, for example, via the fiat currency ledger 1736. Such an account can be funded by transferring money from a bank account at a third-party bank to an account maintained by the service provider of FIG. 16 as is conventionally known. In some examples, a user can receive fiat currency in the form of payment for a transaction with another user. In such examples, at least a portion of such funds can be used to fund the fiat currency ledger 1736.

In some examples, a user can have one or more internal payment cards registered with the service provider of FIG. 16. Internal payment cards can be linked to one or more of the accounts associated with the user account 1720. In some embodiments, options with respect to internal payment cards can be adjusted and managed using an application (e.g., the payment application 1018).

In at least one example, as described above, each ledger can correspond to an account of the user that is managed by the service provider of FIG. 16. In at least one example, individual of the accounts can be associated with a wallet or a stored balance for use in payment transactions, peer-to-peer transactions, payroll payments, etc.

In at least one example, the user account 1720 can be associated with an asset wallet 1740. The asset wallet 1740 of the user can be associated with account information that can be stored in the user account data 1728 and, in some examples, can be associated with the user wallet key(s) 1732. In at least one example, the asset wallet 1740 can store data indicating an address provided for receipt of a cryptocurrency transaction. In at least one example, the balance of the asset wallet 1740 can be based at least in part on a balance of the asset ledger 1734. In at least one example, funds availed via the asset wallet 1740 can be stored in the asset wallet 1740 or the asset wallet 1710. Funds availed via the asset wallet 1710 can be tracked via the asset ledger 1734. The asset wallet 1740, however, can be associated with additional cryptocurrency funds.

In at least one example, the user account 1720 can comprise an NFT storage 1742 that can store data related to various NFTs that the user account 1720 controls. In some examples, the NFT storage 1742 may store copies or "mirrors" of the NFTs that are stored in the blockchain. In some examples, the NFT storage 1742 may be configured to store the data linked to an NFT on the blockchain. A user may wish to see their collection of NFTs, which may be stored in NFT storage 1742 and displayed to the user on one or more user interfaces configured to display NFT collections. In further examples, the NFT storage 1742 may be configured to store cached data relating to previously examined NFTs for purchase, optimal blockchain preferences and/or context data related to that specific user.

In at least one example, when the service provider of FIG. 16 includes a private blockchain 1719 for recording and validating cryptocurrency transactions, the asset wallet 1740 can be used instead of, or in addition to, the asset ledger 1734. For example, at least one example, a merchant can provide the address of the asset wallet 1740 for receiving payments. In an example where a customer is paying in cryptocurrency and the customer has their own cryptocurrency wallet account associated with the service provider of FIG. 16, the customer can send a message signed by its private key including its wallet address (i.e., of the customer) and identifying the cryptocurrency and value to be transferred to the merchant's asset wallet 1740. The service provider of FIG. 16 can complete the transaction by reducing the cryptocurrency balance in the customer's cryptocurrency wallet and increasing the cryptocurrency balance in the merchant's asset wallet 1740. In addition to recording the transaction in the respective cryptocurrency wallets, the transaction can be recorded in the private blockchain 1719 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 1734 and/or asset wallet 1740 are each described above with reference to cryptocurrency, the asset ledger 1734 and/or asset wallet 1740 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 16 is an aspect of the technology disclosed that enables technical advantages of increased processing speed and improved security.

Figure 18:
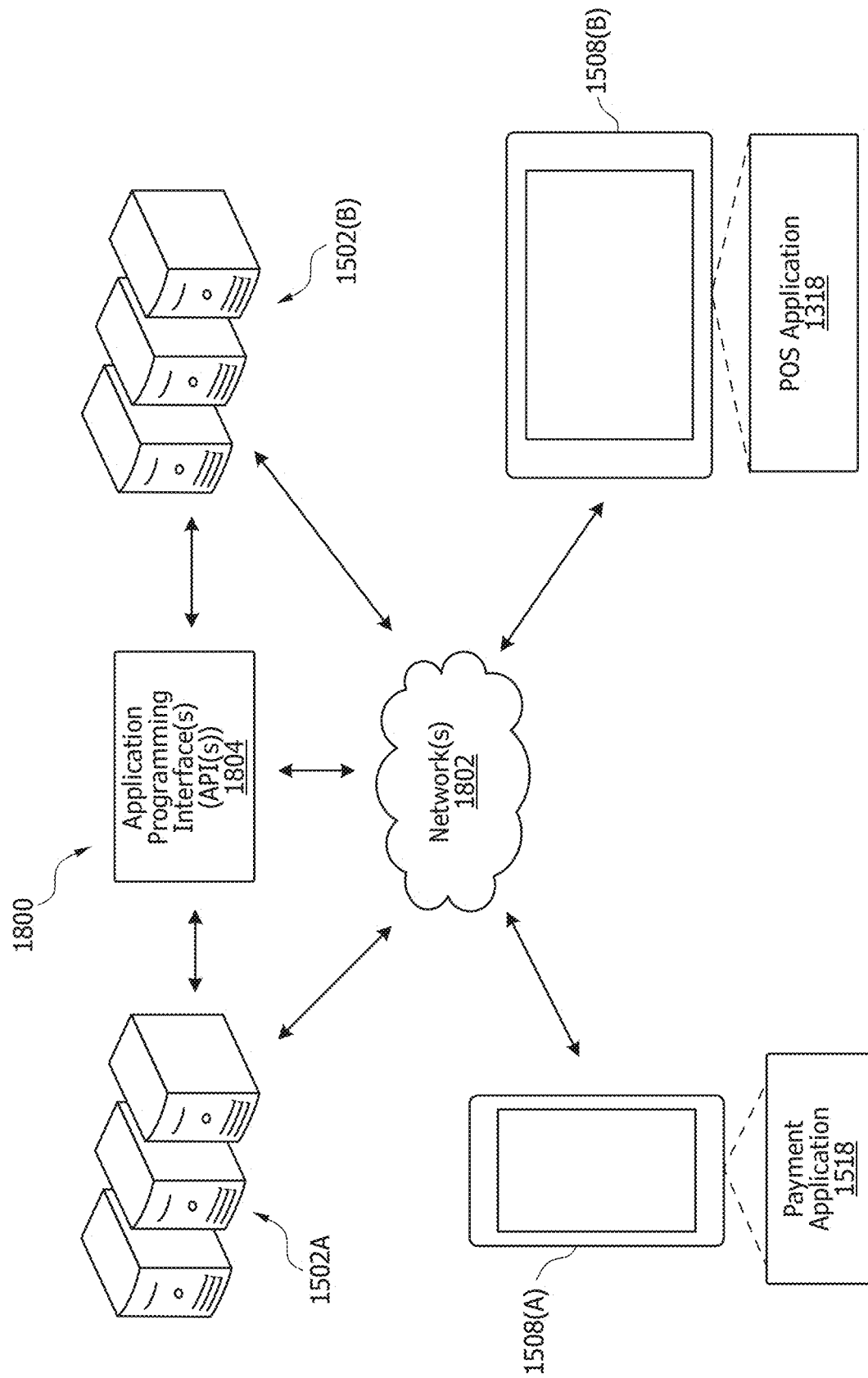
FIG. 18 is an illustration of an integrated transaction environment configured to enable point-of-sale transactions utilizing peer-to-peer assets in accordance with various embodiments of the disclosure.

Referring to FIG. 18 an illustration of an integrated transaction environment configured to enable point-of-sale transactions utilizing peer-to-peer assets in accordance with various embodiments of the disclosure is shown. In many embodiments, the environment 1800 provides that the environment 1500 and the environment 1800 can be integrated to enable payments at the point-of-sale using assets associated with user accounts in the peer-to-peer environment of FIG. 10. As illustrated, each of the components can communicate with one another via one or more networks 1802. In some examples, one or more APIs 1804 or other functional components can be used to facilitate such communication.

In at least one example, the example environment 1800 can enable contactless payments, via integration of peer-to-peer payment, or other payment making, network(s) and payment processing platform(s), are described herein. For the purpose of FIG. 18, the environment 1800 can refer to a payment processing platform and the environment 1800 can refer to a peer-to-peer payment, or payment making, platform. In an example, such an integration can enable a customer to participate in a transaction via their own computing device instead of interacting with a computing device of a merchant, such as the computing device 1508(A). In such an example, the POS application 1318, associated with a payment processing platform and executable by the computing device 1508(A) of the merchant, can present a Quick Response (QR) code, or other code that can be used to identify a transaction (e.g., a transaction code), in association with a transaction between the customer and the merchant. The QR code, or other transaction code, can be provided to the POS application 1318 via an API associated with the peer-to-peer payment platform. In an example, the customer can utilize their own computing device, such as the computing device 1508(A), to capture the QR code, or the other transaction code, and to provide an indication of the captured QR code, or other transaction code, to server(s) 1502(A) and/or server(s) 1502(B).

Based at least in part on the integration of the peer-to-peer payment and the payment processing (e.g., via the API), the server(s) 1502(A) and/or 1502(B) associated with each can exchange communications with each other—and with a payment application 1518 associated with the peer-to-peer payment and/or the POS application 1318—to process payment for the transaction using a peer-to-peer payment where the customer is a first "peer" and the merchant is a second "peer." In at least one example, the peer-to-peer payment can transfer funds from an account of the customer, maintained by the peer-to-peer payment, to an account of the merchant, maintained by the payment processing, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment and payment processing (which can be a first- or third-party integration) such that a QR code, or other transaction code, specific to the transaction can be used for providing transaction details, location details, customer details, or the like to a computing device of the customer, such as the computing device 1506, to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the computing device 1808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1818 and the payment application 1818, as described herein, can process a payment transaction by routing information input via the merchant application to the payment application for completing a "frictionless" payment. This can be referred to as "in-application payment." In another example of "in-application payment," the payment application described herein can be generated or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the computing device 1808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1818, associated with a payment processing, on the computing device 1508(A). In an example, the merchant can use the payment processing to process payments, and the payment processing can process payments for the merchant, as well as other merchants. That is, the payment processing can be an aggregator. After adding the first item, or otherwise providing an indication to start a transaction, a display of the computing device 1808(A) can present a QR code, or other transaction code, that can be associated with a peer-to-peer payment. The customer can use a camera associated with the computing device 1808(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1818, associated with a payment processing platform, on the computing device 1808(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1818 can cause a text message with a resource locator (e.g., uniform resource locator (URL)) that can be associated with a peer-to-peer payment platform to be sent to the computing device 1808 (A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the computing device 1808(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer", and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1818 of a computing device 1808(A) at a brick-and-mortar store of a merchant to a payment application 1818 of a computing device 1808(A) of a customer to enable the customer to participate in a transaction via their own computing device. For instance, in a "scan to pay" example as described above, based at least in part on capturing the QR code, or other transaction code, via the computing device 1808(A), the payment processing platform can provide transaction data to the peer-to-peer payment platform for presentation via the payment application 1818 on the computing device 1808(A). In some examples, the customer can watch items being added to their cart (e.g., via a user interface presented via the payment application). As an item is added to a virtual cart by the merchant—via the POS application 1818 on the computing device 1808(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1818 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the computing device 1808(A) during or after payment of the transaction.

In some examples, based at least in part on capturing the QR code, or other transaction code, the payment processing platform can provide transaction data to the peer-to-peer payment platform for presentation via the payment application 1818 on the computing device of the customer, such as the computing device 1808(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1818 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1818, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip.

That is, in such examples, fewer data transmissions are required and thus, techniques described herein can conserve bandwidth and reduce platform congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1818 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a computing device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 19:
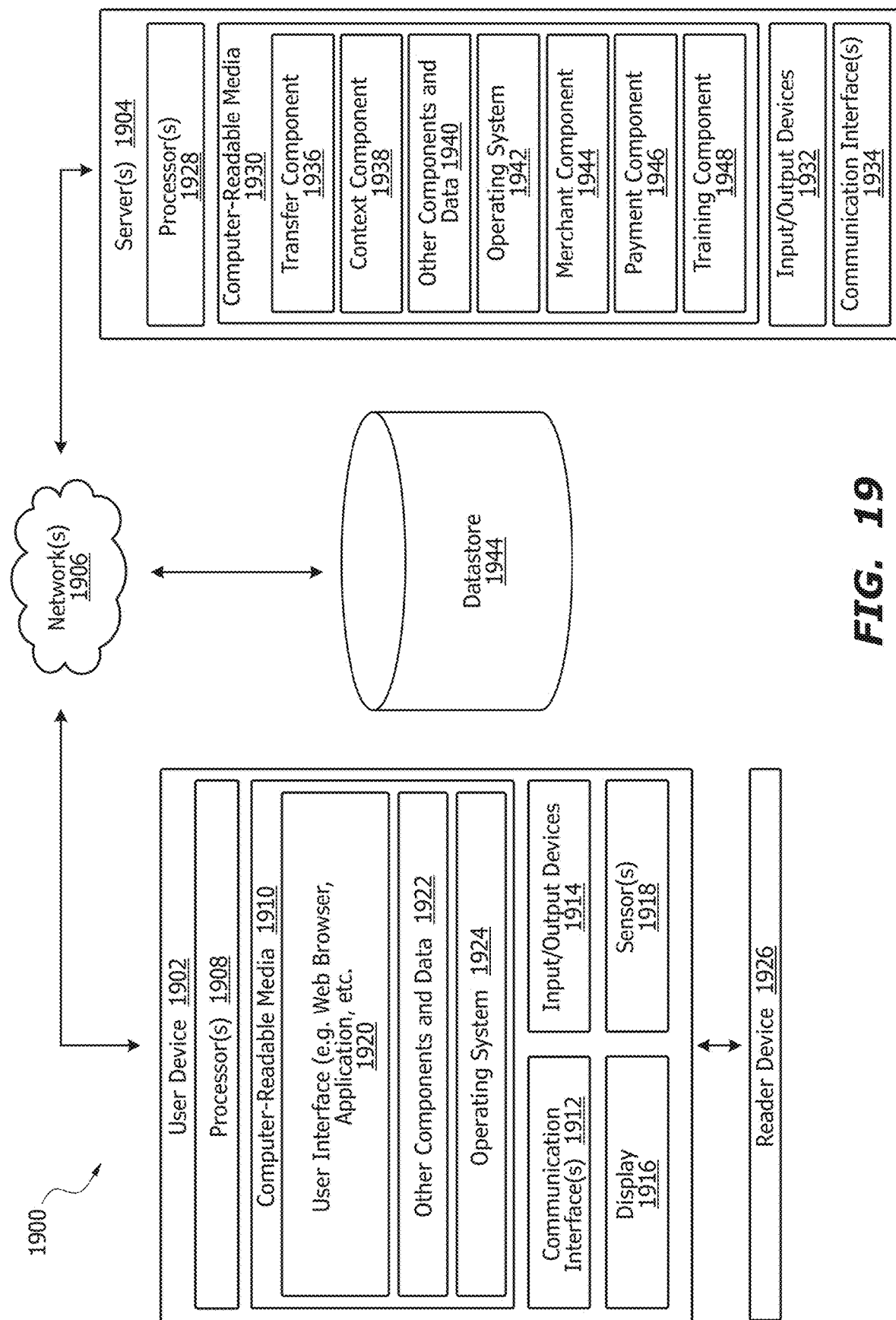
FIG. 19 is a block diagram of a device configured to facilitate blockchain agnostic network transactions in accordance with various embodiments of the disclosure.

Referring to FIG. 19, a block diagram of a device configured to facilitate blockchain agnostic network transactions in accordance with various embodiments of the disclosure is shown. The system 1900 includes a user device 1902, that communicates with server computing device(s) (e.g., server(s) 1904) via network(s) 1906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1902 is illustrated, in additional or alternate examples, the system 1900 can have multiple computing devices, as described above with reference to FIG. 16.

The computer-readable media 1910 of the user device 1902 can also include a payment service application that can be stored internally as an application or may be accessible via a web-portal to the server(s) 1904. The computer-readable media 1930 of the server(s) 1904 may also comprise one or more applications configured to determine context data, find blockchains for analysis, and facilitate the transfer and/or minting of NFTs. These NFTs may then be associated with an account associated with a user or user device 1902.

In at least one example, the user device 1902 can be any suitable type of computing device, e.g., portable, semi-portable, semi-stationary, or stationary. Some examples of the user device 1902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1902 can be any computing device capable of sending communications and performing the functions according to the techniques described herein. The user device 1902 can include devices, e.g., payment card readers, or components capable of accepting payments, as described below.

In the illustrated example, the user device 1902 includes one or more processors 1908, one or more computer-readable media 1910, one or more communication interface(s) 1912, one or more input/output (I/O) devices 1914, a display 1916, and sensor(s) 1918.

In at least one example, each processor 1908 can itself comprise one or more processors or processing cores. For example, the processor(s) 1908 can be implemented as one or more microprocessors, microcomputers, microcontrollers, digital signal processors, central processing units, state machines, logic circuitries, and/or any devices that manipulate signals based on operational instructions. In some examples, the processor(s) 1908 can be one or more hardware processors and/or logic circuits of any suitable type specifically programmed or configured to execute the algorithms and processes described herein. The processor(s) 1908 can be configured to fetch and execute computer-readable processor-executable instructions stored in the computer-readable media 1910.

Depending on the configuration of the user device 1902, the computer-readable media 1910 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1910 can include, but is not limited to, RAM, ROM, EEPROM, flash memory, solid-state storage, magnetic disk storage, optical storage, and/or other computer-readable media technology. Further, in some examples, the user device 1902 can access external storage, such as RAID storage systems, storage arrays, network attached storage, storage area networks, cloud storage, or any other medium that can be used to store information and that can be accessed by the processor(s) 1908 directly or through another computing device or network. Accordingly, the computer-readable media 1910 can be computer storage media able to store instructions, components or components that can be executed by the processor(s) 1908. Further, when mentioned, non-transitory computer-readable media exclude media such as energy, carrier signals, electromagnetic waves, and signals per se.

The computer-readable media 1910 can be used to store and maintain any number of functional components that are executable by the processor(s) 1908. In some implementations, these functional components comprise instructions or programs that are executable by the processor(s) 1908 and that, when executed, implement operational logic for performing the actions and services attributed above to the user device 1902. Functional components stored in the computer-readable media 1910 can include a user interface 1920 to enable users to interact with the user device 1902, and thus the server(s) 1904 and/or other ed devices. In at least one example, the user interface 1920 can be presented via a web browser, or the like. In other examples, the user interface 1920 can be presented via an application, such as a mobile application or desktop application, which can be provided by a service provider associated with the server(s) 1904, or which can be an otherwise dedicated application. In some examples, the user interface 1920 can display NFTs within a user's portfolio, or NFTs available for sale from a merchant or other user. Furthermore, the user interface 1920 may also be configurable to display and select various blockchain options for selecting a home for an NFT within the user's portfolio or subject to an upcoming sale. In at least one example, a user can interact with the user interface via touch input, spoken input, gesture, or any other type of input. The word "input" is also used to describe "contextual" input that may not be directly provided by the user via the user interface 1920. For example, user's interactions with the user interface 1920 are analyzed using, e.g., natural language processing techniques, to determine context or intent of the user, which may be treated in a manner similar to "direct" user input.

Depending on the type of the user device 1902, the computer-readable media 1910 can also optionally include other functional components and data, such as other components and data 1922, which can include programs, drivers, etc., and the data used or generated by the functional components. In addition, the computer-readable media 1910 can also store data, data structures and the like, that are used by the functional components. Further, the user device 1902 can include many other logical, programmatic and physical components, of which those described are merely examples that are related to the discussion herein.

In at least one example, the computer-readable media 1910 can include additional functional components, such as an operating system 1924 for controlling and managing various functions of the user device 1902 and for enabling basic user interactions.

The communication interface(s) 1912 can include one or more interfaces and hardware components for enabling communication with various other devices, such as over the network(s) 1906 or directly. For example, communication interface(s) 1912 can enable communication through one or more network(s) 1906, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known to those skilled in the art.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1902 can further include one or more input/output (I/O) devices 1914. The I/O devices 1914 can include speakers, a microphone, a camera, and various user controls (e.g., buttons, a joystick, a keyboard, a keypad, etc.), a haptic output device, and so forth. The I/O devices 1914 can also include attachments that leverage the accessories (audio-jack, USB-C, Bluetooth, etc.) to connect with the user device 1902.

In at least one example, user device 1902 can include a display 1916. Depending on the type of computing device(s) used as the user device 1902, the display 1916 can employ any suitable display technology. For example, the display 1916 can be a liquid crystal display, a plasma display, a light emitting diode display, an OLED (organic light-emitting diode) display, an electronic paper display, or any other suitable type of display able to present digital content thereon. In at least one example, the display 1916 can be an augmented reality display, a virtually reality display, or any other display able to present and/or project digital content. In some examples, the display 1916 can have a touch sensor associated with the display 1916 to provide a touchscreen display configured to receive touch inputs for enabling interaction with a graphic interface presented on the display 1916. Accordingly, implementations herein are not limited to any particular display technology. Alternatively, in some examples, the user device 1902 may not include the display 1916, and information can be presented by other means, such as aurally, haptically, etc.

In addition, the user device 1902 can include sensor(s) 1918. The sensor(s) 1918 can include a GPS device able to indicate location information. Further, the sensor(s) 1918 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 614 and/or for sending users 614 notifications regarding available appointments with merchant(s) located proximate to the users 614. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1902 can include various other components that are not shown, examples of which include removable storage, a power source, such as a battery and power control unit, a barcode scanner, a printer, a cash drawer, and so forth.

In addition, in some examples, the user device 1902 can include, be connectable to, or otherwise be coupled to a reader device 1926, for reading payment instruments and/or identifiers associated with payment objects. In some examples, as described above, the reader device 1926 can plug in to a port in the user device 1902, such as a microphone port, a headphone port, an audio-jack, a data port, or other suitable port. In additional or alternative examples, the reader device 1926 can be coupled to the user device 1902 via another wired or wireless connection, such as via a Bluetooth®, BLE, and so on. The reader device 1926 can include a read head for reading a magnetic strip of a payment card, and further can include encryption technology for encrypting the information read from the magnetic strip. Additionally, or alternatively, the reader device 1926 can be an EMV payment reader, which in some examples, can be embedded in the user device 1902. Moreover, numerous other types of readers can be employed with the user device 1902 herein, depending on the type and configuration of the user device 1902.

The reader device 1926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1926 may include hardware implementation, such as slots, magnetic tracks, and rails with one or more sensors or electrical contacts to facilitate detection and acceptance of a payment instrument. That is, the reader device 1926 may include hardware implementations to enable the reader device 1926 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally, or optionally, the reader device 1926 may also include a biometric sensor to receive and process biometric characteristics and process them as payment instruments, given that such biometric characteristics are registered with the payment service system 100 and connected to a financial account with a bank server.

The reader device 1926 may include processing unit(s), computer-readable media, a reader chip, a transaction chip, a timer, a clock, a network interface, a power supply, and so on. The processing unit(s) of the reader device 1926 may execute one or more components and/or processes to cause the reader device 1926 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1926, the computer-readable media may include volatile memory (such as RAM), non-volatile memory (such as ROM, flash memory, miniature hard drive, memory card, or the like), or some combination thereof. In at least one example, the computer-readable media of the reader device 1926 may include at least one component for performing various functions as described herein.

The reader chip may perform functionalities to control the operations and processing of the reader device 1926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1926, which may provide a clock signal indicating a time. Furthermore, the reader chip may perform functionality to control the network interface, which may interface with the network(s) 1906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1902, which can be a POS terminal, and the reader device 1926 are shown as separate devices, in additional or alternative examples, the user device 1902 and the reader device 1926 can be part of a single device, which may be a battery-operated device. In such an example, components of both the user device 1902 and the reader device 1926 may be associated with the single device. In some examples, the reader device 1926 can have a display integrated therewith, which can be in addition to (or as an alternative of) the display 1916 associated with the user device 1902.

The server(s) 1904 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1904 can be located together or separately, and organized, for example, as virtual servers, server banks and/or server farms. The described functionality can be provided by the servers of a single merchant or enterprise or can be provided by the servers and/or services of multiple different customers or enterprises.

In the illustrated example, the server(s) 1904 can include one or more processors 1928, one or more computer-readable media 1930, one or more I/O devices 1932, and one or more communication interfaces 1934. Each processor 1928 can be a single processing unit or a number of processing units and can include single or multiple computing units or multiple processing cores. The processor(s) 1928 can be implemented as one or more microprocessors, microcomputers, microcontrollers, digital signal processors, central processing units, state machines, logic circuitries, and/or any devices that manipulate signals based on operational instructions. For example, the processor(s) 1928 can be one or more hardware processors and/or logic circuits of any suitable type specifically programmed or configured to execute the algorithms and processes described herein. The processor(s) 1928 can be configured to fetch and execute computer-readable instructions stored in the computer-readable media 1930, which can program the processor(s) 1928 to perform the functions described herein.

The computer-readable media 1930 can include volatile and nonvolatile memory and/or removable and non-removable media implemented in any type of technology for storage of information, such as computer-readable instructions, data structures, program components, or other data. Such computer-readable media 1930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1904, the computer-readable media 1930 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1930 can be used to store any number of functional components that are executable by the processor(s) 1928. In many implementations, these functional components comprise instructions or programs that are executable by the processors 1928 and that, when executed, specifically configure the one or more processors 1928 to perform the actions attributed above to the service provider and/or payment processing service. Functional components stored in the computer-readable media 1930 can optionally include a transfer component 1936 that can be configured to facilitate minting and transfer operations between various blockchains, context component 1938 which can be configured to utilize context data to determine available and/or viable blockchain options, and one or more other components and data 1940. Additional details associated with the transfer component 1936 and the context component 1938 are described above with reference to the transfer component 108 and context component 110, of FIG. 1A. The one or more other components and data 1940 can include programs, drivers, etc., and the data used or generated by the functional components.

Further, the server(s) 1904 can include many other logical, programmatic and physical components, of which those described above are merely examples that are related to the discussion herein. For example, the operating system 1942 can be configured for controlling and managing various functions of the server(s) 1904. The merchant component 1944 can be utilized to receive transaction data from POS systems such as the POS system 1524 described above with reference to FIG. 15. The merchant component 1944 can transmit requests (e.g., authorization, capture, settlement, etc.) to payment service server computing device(s) to facilitate POS transactions between merchants and customers. The merchant component 1944 can communicate the successes or failures of the POS transactions to the POS systems.

The payment component 1946 can be used to process transaction data related to P2P services. These P2P transactions may be facilitated via a P2P payment service application or from an external service. The payment component 1946 can transmit requests for payment transfer authorization between account when both peers operate within the same payment service. The payment component 1946 can also initiate data transfer such that the funds are properly deducted, converted, and credited to the proper accounts.

The training component 1948 can be configured to train one or more machine learning model(s) and/or models within the payment service system. This training can be in the form of a static model that is accessed by the machine learning model(s). In other examples, the training component 1948 can be updated over time based on newly received trends and/or context data. The training component 1948 may also be configured to provide deployable copies of itself for installation on payment service applications for the ability to generate machine learning outputs while offline.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally, or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1930 can additionally include an operating system 1942 for controlling and managing various functions of the server(s) 1904.

The communication interface(s) 1934 can include one or more interfaces and hardware components for enabling communication with various other devices, such as over the network(s) 1906 or directly. For example, communication interface(s) 1934 can enable communication through one or more network(s) 1906, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known to those skilled in the art.

The server(s) 1904 can further be equipped with various I/O devices 1932. Such I/O devices 1932 can include a display, various user interface controls (e.g., buttons, joystick, keyboard, mouse, touch screen, biometric or sensory input devices, etc.), audio speakers, connection ports and so forth.

In at least one example, the system 1900 can include a datastore 1944 that can be configured to store data that is accessible, manageable, and updatable. In some examples, the datastore 1944 can be integrated with the user device 1902 and/or the server(s) 1904. In other examples, as shown in FIG. 19, the datastore 1944 can be located remotely from the server(s) 1904 and can be accessible to the server(s) 1904. The datastore 1944 can comprise multiple databases and/or servers connected locally and/or remotely via the network(s) 1906.

In at least one example, the datastore 1944 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1944 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1944 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present disclosure and may be included in more than one example of the present disclosure. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it can be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The following description is not to be taken in a limiting sense but is made merely for the purpose of describing the general principles of example embodiments. Reference throughout this specification to "one embodiment," "an embodiment," or similar language means that a particular feature, structure, or characteristic that is described in connection with the referenced embodiment is included in at least the referenced embodiment. Likewise, reference throughout this specification to "some embodiments" or similar language means that particular features, structures, or characteristics that are described in connection with the referenced embodiments are included in at least the referenced embodiments. Thus, appearances of the phrases "in one embodiment," "in an embodiment," "in some embodiments," and similar language throughout this specification can, but do not necessarily, all refer to the same embodiment.

Further, the described features, structures, or characteristics of the present disclosure can be combined in any suitable manner in one or more embodiments. In the description, numerous specific details are provided for a thorough understanding of embodiments of the disclosure. One skilled in the relevant art can recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure.

In the description, certain terminology is used to describe features of the disclosure. For example, in certain situations, the term "logic" is representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage mediums may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition may occur only when a combination of elements, functions, steps or acts are in some way inherently mutually exclusive.

A. A method implemented at least in part by a computing device of a payment service, comprising receiving, via a user interface of a payment application provided by the payment service and executing on a computing device of a first user, a request to purchase a non-fungible token (NFT) minted on a blockchain from a second user; determining, based at least in part on context data associated with at least one of the first user, the second user, or a digital asset associated with the NFT, a plurality of blockchains available for holding the NFT; surfacing, via the user interface, a plurality of transaction costs associated with holding the NFT on the plurality of blockchains; receiving, via the user interface, a selection of one of the plurality of blockchains, wherein the selected blockchain is different than the blockchain on which the NFT is minted; transferring, based at least in part on the selection, the NFT to the selected blockchain; and associating the NFT with a user account, wherein the NFT is viewable on the selected blockchain via the user interface and further transferable to any of the plurality of blockchains via the payment service.

B. The method of clause A, wherein the second user is at least one of a merchant or a third-party and the transaction is completed within a point-of-sale system.

C. The method of clause A or B, wherein the transaction is a peer-to-peer transaction.

D. The method of any of clauses A-C, wherein the plurality of transaction costs are surfaced in fiat currency, the method further comprising: receiving fiat currency from the user for transaction costs associated with the selected blockchain; and converting the received fiat currency into cryptocurrency for use in transferring the NFT.

E. The method of any of clauses A-D, wherein the context data is at least one of preference data, social connection data, expiration time, transaction data, or a list, determined by the payment service, of suitable blockchains for holding the NFT.

F. A method implemented at least in part by a computing device of a payment service, comprising: receiving, via a user interface of an application provided by the payment service and executing on a computing device of a user, a request to purchase a non-fungible token (NFT) from a seller; determining, based at least in part based at least in part on context data associated with at least one of the user, the seller, or a digital asset associated with the NFT, a blockchain of a plurality of blockchains for transferring the NFT; based at least in part on a determination that the determined blockchain is different than a current blockchain on which the NFT is minted, transferring the NFT to the determined blockchain; associating the NFT, held on the determined blockchain, with an account designated by the user; and processing payment associated with the transfer via the payment service upon completion of the transfer of the NFT.

G. The method of clause F, wherein the method further comprises: determining the plurality of blockchains available for transferring the NFT based at least in part on the context data; surfacing, via the user interface, the plurality of blockchains available for transferring the NFT and information associated with each of the plurality of blockchains; receiving a selection of the determined blockchain, wherein the determined blockchain is determined based at least in part on the selection; and collecting payment for the NFT and associated costs for minting to the determined blockchain prior to transferring the NFT to the determined blockchain.

H. The method of clause F or G, wherein the method further comprises determining the determined blockchain automatically without input from the user.

I. The method of any of clauses F-H, wherein the determined blockchain is determined based at least in part upon an output generated by one or more machine learning models operated by the payment service.

J. The method of clause I, wherein the context data is analyzed by the one or more machine learning models to make the determination.

K. The method of clause J, wherein the seller is a second user and processing the payment comprises withdrawing funds from an account of the user to transfer to an account of the second user.

L. The method of clause K, wherein an amount of the withdrawn funds is based at least in part on one or more of: a fee associated with transferring the NFT to the user; a royalty fee to a creator associated with an NFT; and a fee to the second user.

M. The method of any of clauses F-L, wherein the seller is a merchant and processing the payment comprises withdrawing funds from an account of the user to transfer to an account of the merchant.

N. The method of clause M, wherein an amount of the withdrawn funds is based at least in part on one or more of: a fee associated with transferring the NFT to the user; a royalty fee to a creator associated with an NFT; and a fee to the merchant.

O. The method of any of clauses F-N, wherein creating the plurality of NFTs for purchase includes: adding a description, cost, and asset; selecting an optimal blockchain to mint the NFT on; and minting the NFT on the optimal blockchain.

P. The method of clause O, wherein the selection of an optimal blockchain is performed by the payment service automatically.

Q. The method of any of clauses F-P, wherein the method further includes adding the generated NFTs to an inventory system of the seller.

R. The method of any of clauses F-Q, wherein the request to purchase is initiated by any of: accessing an address associated with a presented hyperlink, a user interacting with an e-commerce site, a user making a purchase in a physical storefront, or interacting with a social network or third party web site.

S. The method of any of clauses F-R, further comprising: minting the NFT to multiple blockchains of the plurality of blockchains; providing the user with the ability to transfer ownership of the NFT to any of the multiple blockchains; and collecting a fee to cover the cost of transferring ownership between the multiple blockchains.

T. A non-transitory computer readable medium storing a program causing a computer to execute a process of transferring a non-fungible token (NFT), the process comprising: receiving, via a user interface of a payment application provided by the payment service and executing on a computing device of a user, a request to purchase a non-fungible token (NFT) minted on a blockchain from a seller, wherein the seller comprises a merchant, another user, or a third-party; determining, based at least in part on context data associated with at least one of the user, the seller, or a digital asset associated with the NFT, a blockchain for holding the NFT, wherein the determined blockchain is different than the blockchain on which the NFT is minted; minting the NFT on the determined blockchain; and associating the NFT with a user account, wherein the NFT is viewable on the determined blockchain via the user interface.

While the example clauses above are describe with reference to methods and non-transitory computer-readable medium, any of clauses A-T can be performed as methods or by systems, devices, or processor(s) executing instructions stored by one or more computer-readable media to perform particular operations associated therewith.

What is claimed is:

1. A method implemented at least in part by a computing device of a payment service, comprising:
   receiving, via a user interface of a payment application provided by the payment service and executing on a computing device of a first user, a request to purchase a non-fungible token (NFT) minted on a blockchain from a second user;
   determining, based at least in part on context data associated with at least one of the first user, the second user, or a digital asset associated with the NFT, a plurality of blockchains available for holding the NFT;
   surfacing, via the user interface, a plurality of transaction costs associated with holding the NFT on the plurality of blockchains;
   receiving, via the user interface, a selection of one of the plurality of blockchains, wherein the selected blockchain is different than the blockchain on which the NFT is minted;

transferring, based at least in part on the selection, the NFT to the selected blockchain; and associating the NFT with a user account, wherein the NFT is viewable on the selected blockchain via the user interface and further transferable to any of the plurality of blockchains via the payment service.

2. The method of claim 1, wherein the second user is at least one of a merchant or a third-party and the transaction is completed within a point-of-sale system.

3. The method of claim 1, wherein the transaction is a peer-to-peer transaction.

4. The method of claim 1, wherein the plurality of transaction costs are surfaced in fiat currency, the method further comprising:
receiving fiat currency from the user for transaction costs associated with the selected blockchain; and
converting the received fiat currency into cryptocurrency for use in transferring the NFT.

5. The method of claim 1, wherein the context data is at least one of preference data, social connection data, expiration time, transaction data, or a list, determined by the payment service, of suitable blockchains for holding the NFT.

6. A method implemented at least in part by a computing device of a payment service, comprising:
receiving, via a user interface of an application provided by the payment service and executing on a computing device of a user, a request to purchase a non-fungible token (NFT) from a seller;
determining, based at least in part based at least in part on context data associated with at least one of the user, the seller, or a digital asset associated with the NFT, a blockchain of a plurality of blockchains for transferring the NFT;
based at least in part on a determination that the determined blockchain is different than a current blockchain on which the NFT is minted, transferring the NFT to the determined blockchain;
associating the NFT, held on the determined blockchain, with an account designated by the user; and
processing payment associated with the transfer via the payment service upon completion of the transfer of the NFT.

7. The method of claim 6, wherein the method further comprises:
determining the plurality of blockchains available for transferring the NFT based at least in part on the context data;
surfacing, via the user interface, the plurality of blockchains available for transferring the NFT and information associated with each of the plurality of blockchains;
receiving a selection of the determined blockchain, wherein the determined blockchain is determined based at least in part on the selection; and
collecting payment for the NFT and associated costs for minting to the determined blockchain prior to transferring the NFT to the determined blockchain.

8. The method of claim 6, wherein the method further comprises determining the determined blockchain automatically without input from the user.

9. The method of claim 8, wherein the determined blockchain is determined based at least in part upon an output generated by one or more machine learning models operated by the payment service.

10. The method of claim 9, wherein the context data is analyzed by the one or more machine learning models to make the determination.

11. The method of claim 6, wherein the seller is a second user and processing the payment comprises withdrawing funds from an account of the user to transfer to an account of the second user.

12. The method of claim 11, wherein an amount of the withdrawn funds is based at least in part on one or more of:
a fee associated with transferring the NFT to the user;
a royalty fee to a creator associated with an NFT; and
a fee to the second user.

13. The method of claim 6, wherein the seller is a merchant and processing the payment comprises withdrawing funds from an account of the user to transfer to an account of the merchant.

14. The method of claim 13, wherein an amount of the withdrawn funds is based at least in part on one or more of:
a fee associated with transferring the NFT to the user;
a royalty fee to a creator associated with an NFT; and
a fee to the merchant.

15. The method of claim 6, wherein creating the plurality of NFTs for purchase includes:
adding a description, cost, and asset;
selecting an optimal blockchain to mint the NFT on; and
minting the NFT on the optimal blockchain.

16. The method of claim 15, wherein the selection of an optimal blockchain is performed by the payment service automatically.

17. The method of claim 6, wherein the method further includes adding the transferred NFTs to an inventory system of the seller.

18. The method of claim 6, wherein the request to purchase is initiated by any of: accessing an address associated with a presented hyperlink, a user interacting with an e-commerce site, a user making a purchase in a physical storefront, or interacting with a social network or third party web site.

19. The method of claim 6, further comprising:
minting the NFT to multiple blockchains of the plurality of blockchains;
providing the user with an ability to transfer ownership of the NFT to any of the multiple blockchains; and
collecting a fee to cover a cost of transferring ownership between the multiple blockchains.

20. A non-transitory computer readable medium storing a program causing a computer to execute a process of transferring a non-fungible token (NFT), the process comprising:
receiving, via a user interface of a payment application provided by a payment service and executing on a computing device of a user, a request to purchase a non-fungible token (NFT) minted on a blockchain from a seller, wherein the seller comprises a merchant, another user, or a third-party;
determining, based at least in part on context data associated with at least one of the user, the seller, or a digital asset associated with the NFT, a blockchain for holding the NFT, wherein the determined blockchain is different than the blockchain on which the NFT is minted;
minting the NFT on the determined blockchain; and
associating the NFT with a user account, wherein the NFT is viewable on the determined blockchain via the user interface.

* * * * *